US008068154B2

(12) United States Patent
Jacob et al.

(10) Patent No.: US 8,068,154 B2
(45) Date of Patent: Nov. 29, 2011

(54) DIGITAL CAMERA WITH NON-UNIFORM IMAGE RESOLUTION

(76) Inventors: Eliezer Jacob, Kiryat Tivon (IL); Itzhak Pomerantz, Kfar Saba (IL); Gideon Miller, Jerusalem (IL)

(*) Notice: Subject to any disclaimer, the term of this patent is extended or adjusted under 35 U.S.C. 154(b) by 1786 days.

(21) Appl. No.: 11/117,731

(22) Filed: Apr. 29, 2005

(65) Prior Publication Data

US 2005/0259158 A1 Nov. 24, 2005

Related U.S. Application Data

(60) Provisional application No. 60/521,471, filed on May 1, 2004, provisional application No. 60/522,743, filed on Nov. 2, 2004.

(51) Int. Cl.
| H04N 3/14 | (2006.01) |
| H04N 5/335 | (2006.01) |
| H04N 7/18 | (2006.01) |
| H04N 5/228 | (2006.01) |
| H04N 5/225 | (2006.01) |

(52) U.S. Cl. .... 348/294; 348/143; 348/218; 348/208.14
(58) Field of Classification Search .............. 348/218.1, 348/294, 143–146, 169, 157, 166, 201–202, 348/241, 333, 208.14; 382/103; 280/236; 356/612
See application file for complete search history.

(56) References Cited

U.S. PATENT DOCUMENTS

| 4,712,142 | A | * | 12/1987 | Tomita et al. ................ 358/468 |
| 5,063,525 | A | * | 11/1991 | Kurakake et al. ............ 345/626 |
| 5,262,871 | A | * | 11/1993 | Wilder et al. ................ 348/307 |
| 5,541,654 | A | * | 7/1996 | Roberts ......................... 348/301 |
| 5,822,392 | A | * | 10/1998 | Hedengren ................... 378/98.8 |
| RE37,282 | E | | 7/2001 | Smitt |
| 6,320,618 | B1 | * | 11/2001 | Aoyama ........................ 348/335 |
| 6,455,831 | B1 | * | 9/2002 | Bandera et al. ............. 250/208.1 |
| 6,754,369 | B1 | * | 6/2004 | Sazawa ......................... 382/105 |
| 6,757,008 | B1 | * | 6/2004 | Smith ............................ 348/143 |
| 6,839,452 | B1 | * | 1/2005 | Yang et al. .................... 382/103 |
| 7,106,374 | B1 | * | 9/2006 | Bandera et al. .............. 348/308 |
| 7,362,355 | B1 | * | 4/2008 | Yang et al. ................. 348/222.1 |
| 7,408,572 | B2 | * | 8/2008 | Baxter et al. ............. 348/208.14 |
| 2002/0018600 | A1 | * | 2/2002 | Lyon et al. .................... 382/305 |
| 2003/0231804 | A1 | | 12/2003 | Bacarella |
| 2004/0201677 | A1 | * | 10/2004 | Bronson ....................... 348/207.1 |
| 2005/0259158 | A1 | | 11/2005 | Jacob et al. |
| 2010/0271493 | A1 | * | 10/2010 | Ohmura et al. ............. 348/207.2 |

FOREIGN PATENT DOCUMENTS

WO 02093117 11/2002

OTHER PUBLICATIONS

Singapore—Invitation to respond to Written Opinion dated May 24, 2010.

* cited by examiner

*Primary Examiner* — Timothy J Henn
*Assistant Examiner* — Tuan Le
(74) *Attorney, Agent, or Firm* — Greenberg Traurig LLP

(57) ABSTRACT

The invention provides a system for isolating digital data representative of portions of a field of view. The system, which may be provided in the form of a digital camera, includes an array of sensor cells adapted to provide digital representations corresponding to at least a portion of the field of view, and a selector adapted to isolate a non-uniformly distributed subset of the digital representations provided by the array. The isolation may be performed based upon a set of values programmed in a programmable lookup table. A buffer is provided for holding the isolated digital representations.

32 Claims, 37 Drawing Sheets

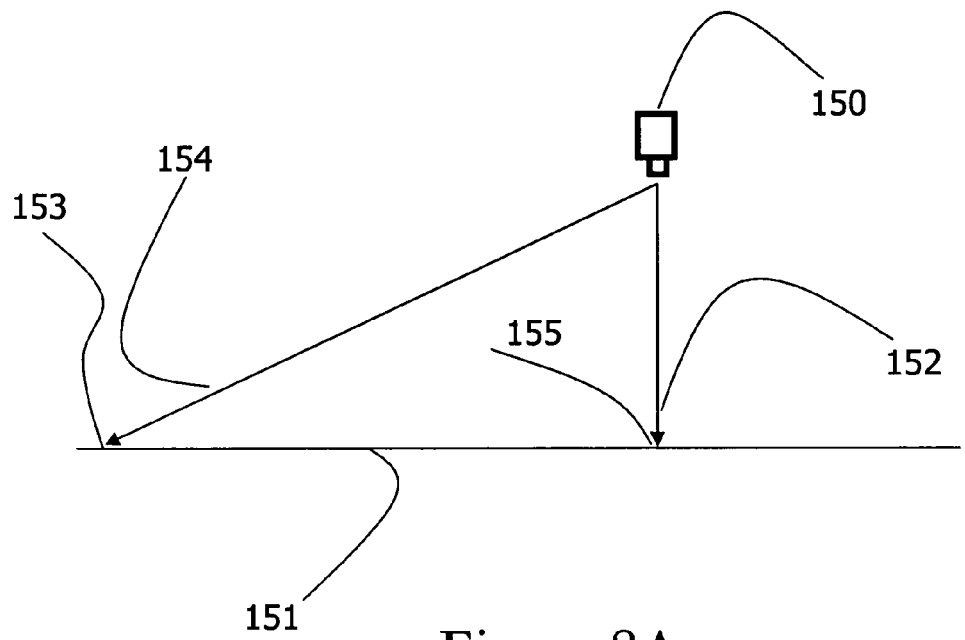
Figure 8A
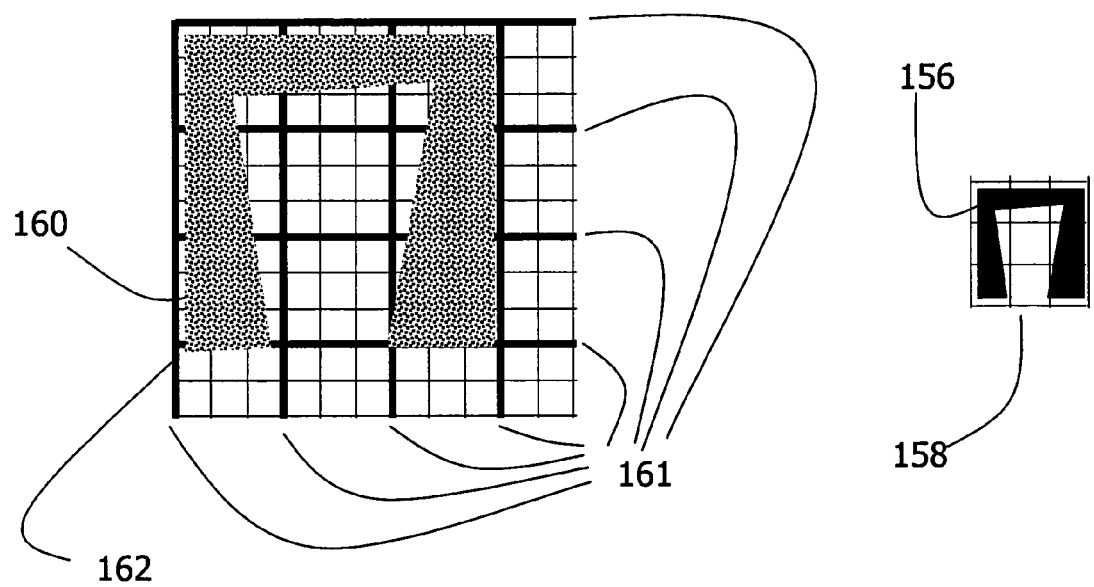
Figure 8C
Figure 8B

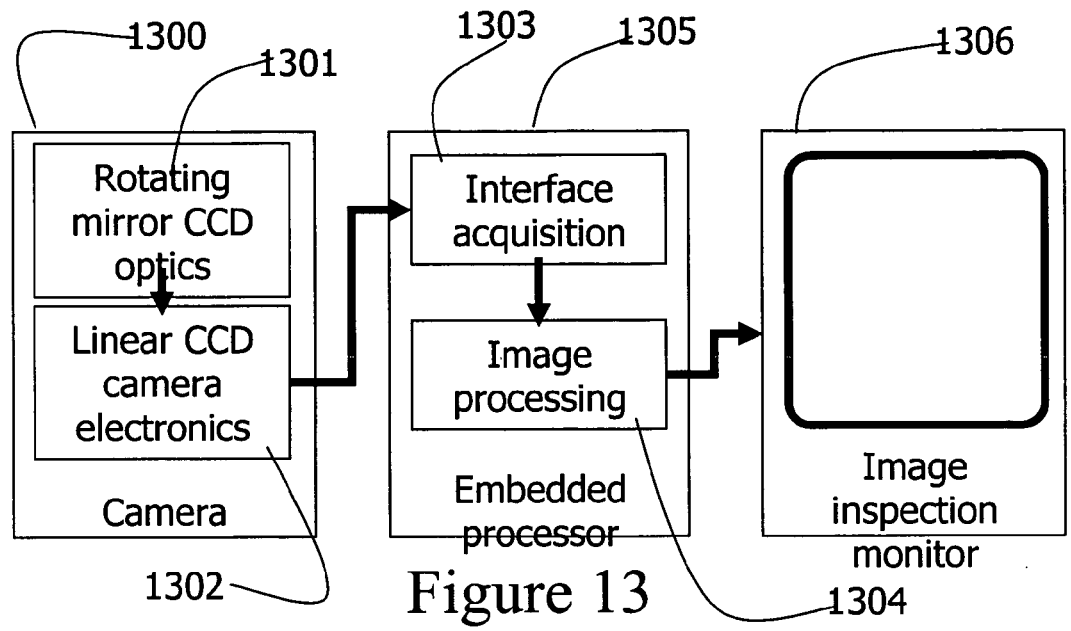
Figure 13
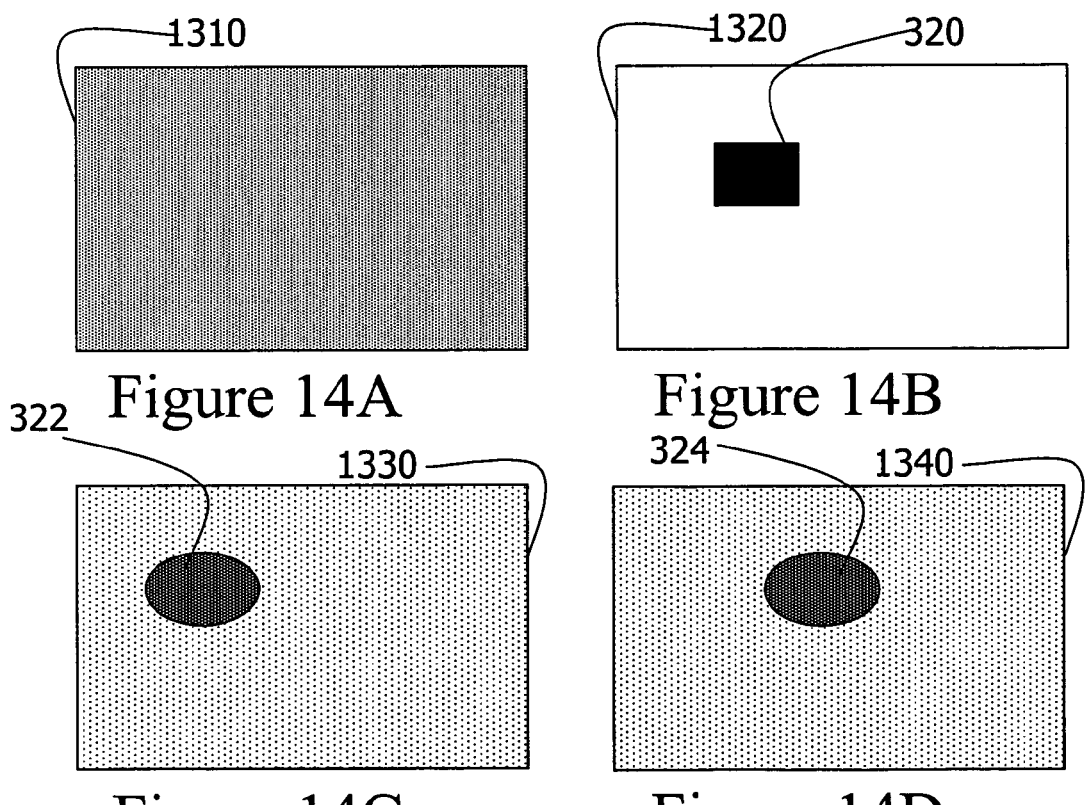
Figure 14A
Figure 14B
Figure 14C
Figure 14D

DIGITAL CAMERA WITH NON-UNIFORM IMAGE RESOLUTION

PRIORITY CLAIM

This application claims priority to U.S. Patent Application No. 60/521,471 filed May 1, 2004, the entire disclosure of which is incorporated herein by reference. This application further claims priority to U.S. Patent Application Ser. No. 60/522,743, filed Nov. 2, 2004, which is hereby incorporated by reference in its entirety.

FIELD OF THE INVENTION

The present invention relates to the field of digital imaging, and in particular to digital cameras for capturing a scene in a given field of view.

BACKGROUND OF THE INVENTION

A camera is a device that captures an image or scene by optically projecting it onto a sensing device in a focal plane. A film camera exposes a light-sensitive film placed on the focal plane to the projected image for a period of time in order to record the image. Over the years, both still and moving film cameras have used a variety of film sizes and aspect ratios. Although in the early days of cameras, film was often cut to size, most film today is provided in film strips which are advanced inside the camera to place an unused portion in the focal plane. A masking device inside the camera prevents the light from a projected image from exposing film outside the mask. Substantially all of the masks (and the cut film before that) are rectangular or square.

Newer digital cameras use a photosensitive array of photocells in a manner similar to that of film. As with film, the array is located on the focal plane and exposed to the projected image for a period of time in order to capture the image. Unlike film, however, the array may remain stationary. Once the image is captured using the array, it can be stored in a computer memory and recorded on any digital media.

Arrays of photocells are typically manufactured as rectangles, with a typical ratio of 3:4 between the long and short edges. Images of interest, however, may not be 3:4 rectangles, and are often nonrectangular at all. Conventional film and digital cameras capture non-rectangular images of interest by using only part of the frame for the image, and essentially wasting the remainder of the frame (e.g., film or memory) on the portion thereof that is not of interest.

Existing cameras typically have photocells comprising over 1 million pixels, and often 5 million or more. Even in the consumer market today, it is not uncommon to find still cameras having over 10 million pixels. Each pixel can provide a single point of color or black-and-white resolution, and often each pixel is capable of representing one of many millions of colors. Accordingly, in a raw format, a six mega-pixel photocell with 24-bits per pixel can require as much as 18 megabytes of data per frame of captured image.

Some existing cameras can programmably change the resolution of the image by diluting the pixels or by combining adjacent pixels. Data compression techniques, are available for reducing the amount of data required for each frame. For example, for moving pictures, MPEG, which stands for Moving Picture Experts Group, is the name of family of standards used for coding audio-visual information (e.g., movies, video, music) in a digital compressed format. For still pictures, the JPEG format is available. JPEG compresses graphics of photographic color depth, which makes the images smaller. With either of these techniques, the image deteriorates in quality as one adds compression.

In any event, JPEG and MPEG type compression requires substantial data processing power. Thus, in order to capture an image of interest at a desired resolution, a camera requires a large memory and large bandwidth data transport for storing frame data in that memory. Alternatively, where some (often programmable) loss of resolution or clarity is acceptable, the camera still requires substantial data processing power for compression that is continuously available at the maximum frame rate of the camera.

What is needed is a camera that can reduce the memory and bandwidth required, but still provide an image of interest without undesired loss of clarity.

SUMMARY OF THE INVENTION

The invention in one embodiment provides a system for isolating digital data representative of portions of a field of view. The system includes an array of sensor cells adapted to provide digital representations corresponding to at least a portion of the field of view, and a selector adapted to isolate a non-uniformly distributed subset of the digital representations provided by the array. A buffer is provided for holding the isolated digital representations. The invention may have an asymmetric distribution of active pixels in a frame, and the distribution of active pixels in a frame may be non-contiguous and/or programmable.

In another embodiment of the invention, a system for isolating digital data representative of parts of a field of view that change over time includes an array of sensor cells which provide a plurality of digital representations corresponding to at least a portion of the field of view at a given moment in time and a selector for isolating a non-uniformly distributed subset of the plurality of the digital representations provided by the array at a given moment in time, the isolation being performed based upon a set of values programmed in a programmable lookup table.

In another embodiment, the invention provides a method of acquiring a digital image with a non-uniform resolution, including the steps of providing an array having uniformly spaced photoelectric sensor cells, exposing the array, causing the array to provide a digital representation for each of the uniformly spaced photoelectric sensor cells, and selecting from a first region of the array a first subset of the digital representations for the sensor cells within the first region, wherein the first subset has a first average resolution over the first region that is less than the maximum resolution. A second subset of the digital representations for the sensor cells within a second region of the array is then selected, the second subset having a second average resolution over the second region. In this configuration, the first average resolution is not equal to the second average resolution.

The invention may further be practiced using a mirror and a linear array of photoelectric sensor cells by rotating the mirror, or alternatively moving the array, thereby causing a field of view to become incident on the linear array over time. A plurality of sets of values are acquired from the array while the mirror is rotating, each set of values including a quantity of digital representations which is less than the number of uniformly spaced photoelectric sensor cells of the linear array. At least two of the plurality of sets of values from the array include digital representations of light incident upon different sensors. In this embodiment, dilution may vary between mirror revolutions, or array movements, to dynamically modify the local resolution of the image. Parts of the field of view that are not in focus may be sampled at higher density than parts of the field of view that are in focus, and the defocusing blur may be at least partially corrected by averaging. The revolving mirror may be double-sided and centered above the rotation axis. The optical path may be folded by at least one planar mirror to prevent obstruction of the frontal field of view by the linear array. The revolving mirror may be a polyhedral prism revolving around its axis. The mirror may be positioned to reflect part of the field of view to capture a stationary scene in the proximity of the camera, and known fixed items located in the local scene may be used for purposes of calibration and distortion correction. The revolving mirror embodiment may further be practiced by providing a pair of cameras each having a revolving mirror, the two revolving mirrors sharing the same motor and axis of rotation, and one camera being offset by 90 degrees with respect to the other. The linear array and rotation axes in the revolving mirror embodiment may be generally horizontal. In this respect, the camera may be installed on a moving vehicle and used to inspect the area in front of the vehicle. The revolving mirror embodiments of the invention may be used to provide a stereoscopic camera by providing two mirrors behind the camera that sequentially reflect a pair of stereoscopic images onto the revolving mirror.

The invention may be provided in the form of a digital camera having at least one sensor adapted to provide a digital representation of a portion of a field of view. The camera includes an optical system which causes locations within the field of view to become incident on the sensor. A mask having a programmable value corresponding to each of the locations is provided, the value being programmable to be an accept value or a reject value. A selector is adapted to accept a digital representation if the value corresponding to the location is programmed to be an accept value, and to reject a digital representation if the value corresponding to the location is programmed to be a reject value. A buffer is provided for storing each accepted digital representation, the accepted digital representations representing locations within the field of view that are not uniformly spaced from each other.

A digital camera according to the invention may include a mechanism to sample a linear array at a variable resolution, so that at least some of the scan lines are diluted from processing. Dilution of pixels within a scan line and dilution of scan-lines within the image may be synchronized to define a desirable two-dimensional pixel density of at least one sub-area of the image. The dilution may be controlled by information taken from a binary lookup table that specifies the lines to be acquired and the pixels to be acquired in each line. The dilution may correspond to a pre-determined level of interest in sub-areas of the scene. The contents of the lookup table may correspond to the expected distance between the camera and the scene at any given elevation angle and azimuth. The contents of the lookup table may be at least partially determined by the image contents of preceding images, and may correspond to the results of a video motion detection system. The correspondence of the binary lookup table to the geometry of the scene may be based on a preliminary image analysis of the scene and estimation of distances to objects from their angular size in the field of view. The lookup table may be modified between frames to maintain at least one moving object in the scene under higher resolution.

The digital camera of the invention may further include multiple linear arrays that are staggered in a generally collinear arrangement to produce an array having a higher number of pixels. Errors in linearity and contiguity of staggering the linear arrays may be compensated by calibration offset in a calibration table.

The camera of the invention can be used in various applications. For example, it may be used to monitor airport take-off and landing strips by scanning the strips with the camera, positioned above at least one end of the strip, with the lookup table programmed to cover the generally trapezoidal appearance of the strip in generally uniform resolution. The camera can further be used for automatic optical inspection of a product in a production line. Still further, the camera of the invention may be used as a traffic control digital camera that zooms on at least one of the license plate and driver's head following a prediction of their expected position in the field of view. The camera of the invention may be used to acquire a video image of a sports speed contest where competitors are contending in parallel lanes along a straight line, with the lanes imaged as parallel vertical stripes having uniform width and a linear vertical scale. It may be used in a video ball tracking system where the resolution of the ball area increases as the distance from the camera to the ball increases. The camera may further be used in an illumination system for a revolving mirror scanning camera, wherein a narrow vertical beam of light is synchronized with the direction of the scanning line. The vertical beam of light may be generated by a linear light source, a lens, and a revolving mirror that is mechanically linked to a revolving mirror of the camera. The invention may be used to provide a light reflector having a grid of at least three corner mirror reflectors and means for optically blocking at least one of said corner reflectors to create a variety of identifiable reflection patterns. The digital camera of the invention may be used to provide a visual surveillance system for delivery of high resolution images of a partial feature of an object. In such surveillance systems the digital camera may be used to repeatedly image a field of view at a first resolution. An image processing system may then be used to recognize objects in the images, and a context analysis system my be provided for predicting where, in the geometrical context of the objects, is the expected position of partial features. A programmable lookup table may then be programmed to assign high resolution at the expected position of those features in the forthcoming image. The objects recognized by such surveillance system may be human bodies and the features may be faces. Alternatively, the objects recognized may be vehicles and the features may be license plates. The camera of the invention may further be used to provide a system for assisting a user to visually find items in a field of view. In such embodiments, the system may further include, in addition to the camera, a programmable visual pointing device installed in the vicinity of the camera and a pattern recognition system capable of recognizing the appearance of the items in the image of the camera. A pointing controller may be provided for programming the visual pointing device to visually mark the recognized items. The items may be, e.g., components of an assembly and the field of view is an assembly in front of the user. The items may alternatively be printed words, and the field of view a printed document in front of the user. In this respect, the camera and the pointer may be packaged within the head of a desk lamp.

It is to be understood that both the foregoing general description and the following detailed description are exemplary and explanatory and are intended to provide further explanation of the invention as claimed. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least an embodiment of the invention.

In the drawings:

FIG. 8A is a plan view of a camera acquiring an image having a mid-field and peripheral object.

FIG. 8B is a representation of an object viewed on the periphery of the image of FIG. 8A.

FIG. 8C is a representation of an objected viewed in the mid-field of the image of FIG. 8A.

FIG. 13 is a high level block diagram of the electronic circuitry according to an embodiment of the invention.

FIGS. 14A-14D show different schemes of resolution distribution according to an embodiment of the invention.

DETAILED DESCRIPTION OF THE PREFERRED EMBODIMENT

Reference will now be made in detail to the preferred embodiments of the present invention, examples of which are illustrated in the accompanying drawings. For clarity, corresponding features are consistently labeled across the various views of the invention provided in the figures.

Figure 1A:
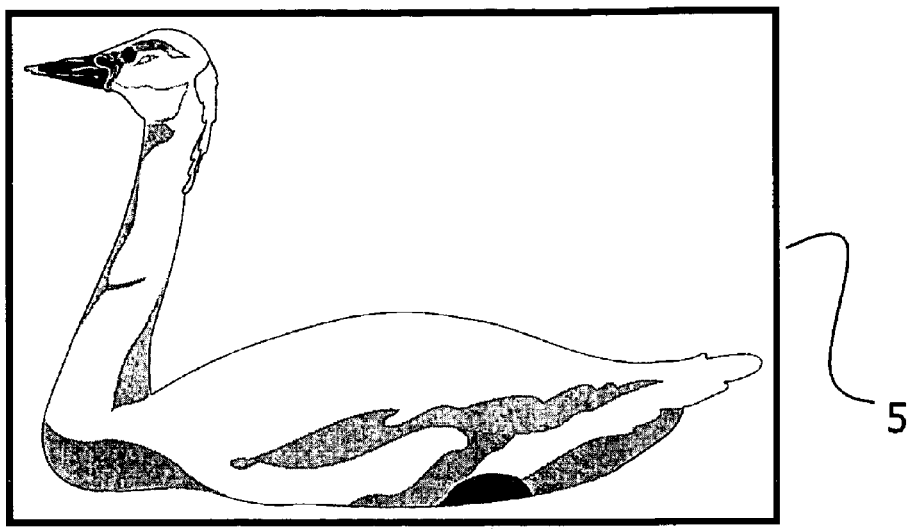
FIG. 1A shows a landscape type of rectangular image.
Figure 1B:
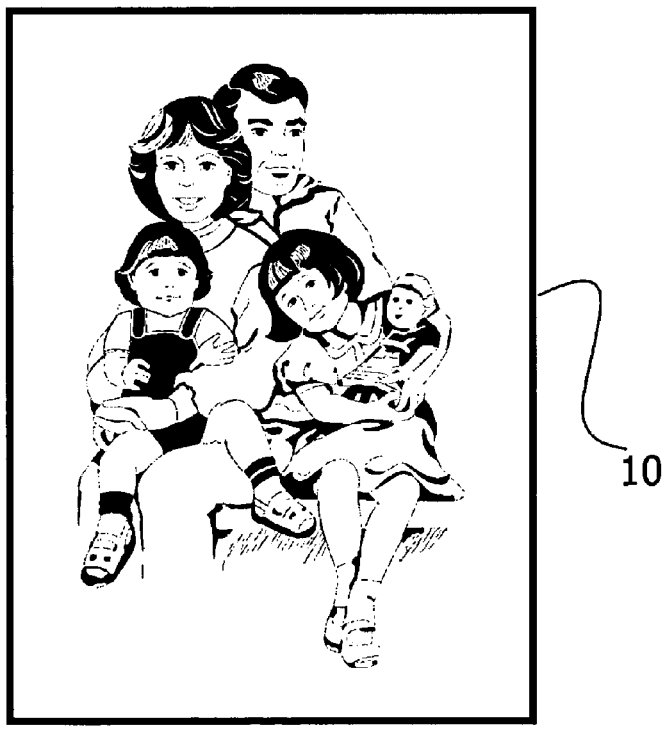
FIG. 1B shows a portrait type of rectangular image.

Turning to FIG. 1A. A rectangular scene with proportions of 3:4 is shown. The frame 5 is in horizontal or landscape orientation. This is the common proportion of images, and many cameras are built to provide a frame in this proportion. FIG. 2 shows another rectangular scene, this time with proportions of 4:3. The frame 10 is in vertical or portrait orientation. The choice between portrait and landscape is the only choice of field shape that is typically available using a conventional camera.

Figure 2A:
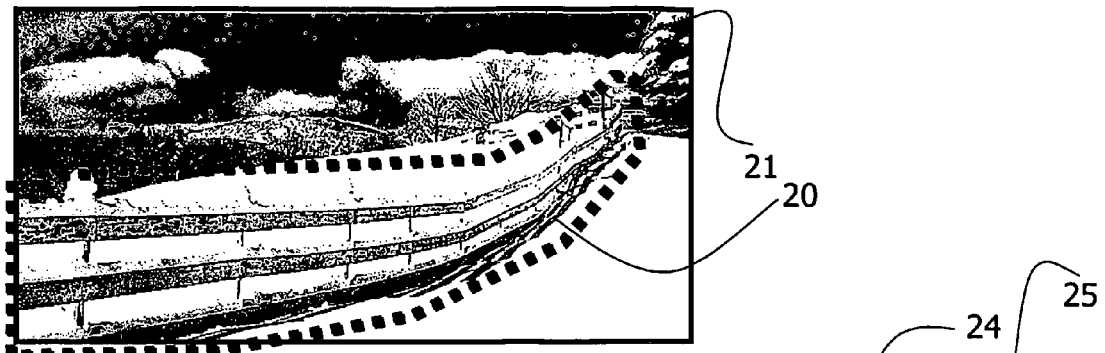
FIG. 2A shows a non-rectangular scene of a fence.

Turning now to FIG. 2A, a scene comprising a fence 20 is shown. The fence 20 takes a relatively small portion of frame 21. If the fence 20 were the only image of interest in the frame 21 (such as if the view were from a security camera surveilling only the fence), pixels within the frame 21 corresponding to the field of view 22 would be necessary, but pixels within the frame 21 not corresponding to the field of view 22 would be extraneous.

Figure 2B:
FIG. 2B shows a non-rectangular scene of a road.

In FIG. 2B, a scene comprising a road 24 going from the bottom of frame 25 to the horizon is shown. The road 24 takes a relatively small portion of the frame 25. If the road 24 were the only image of interest in the frame 25 (such as if the view were from a traffic camera monitoring only the road), pixels within the frame 25 corresponding to the field of view 26 would be necessary, but pixels within the frame 25 not corresponding to the field of view 26 would be extraneous.

Figure 2C:
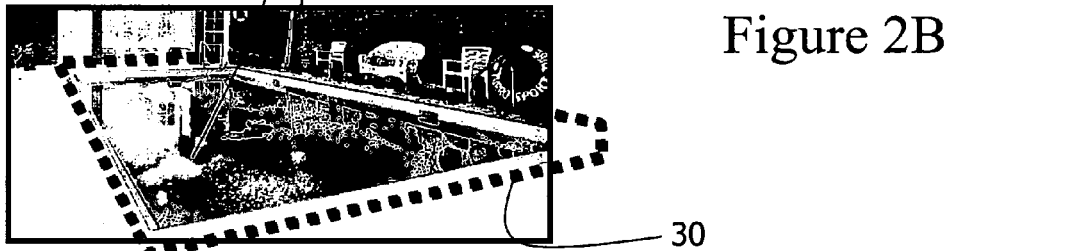
FIG. 2C shows a non-rectangular scene of a swimming pool.

Turning to FIG. 2C, a scene comprising a swimming pool 28 taken from an arbitrarily place camera is shown. The pool 28 takes a portion of the frame 29. If the pool 28 were the only image of interest in the frame 29 (such as if the view were from a camera used to monitor swimmers), pixels within the frame 29 corresponding to the field of view 30 would be necessary, but pixels within the frame 29 not corresponding to the field of view 30 would be extraneous.

Figure 2D:
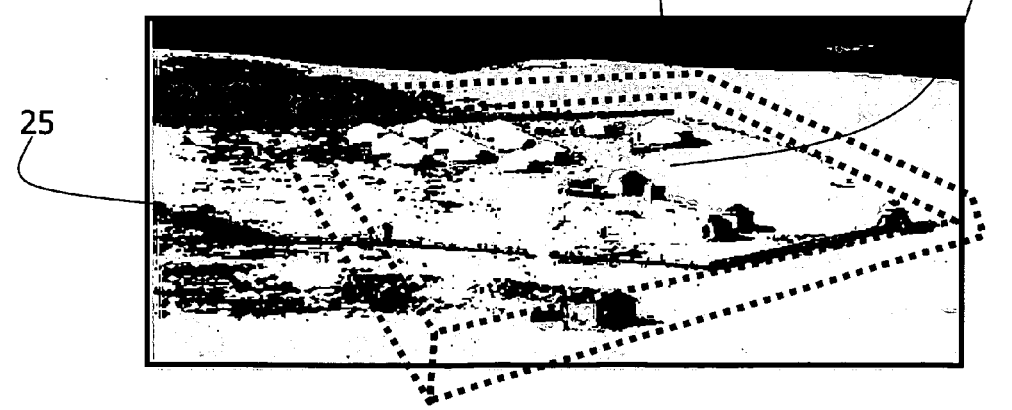
FIG. 2D shows a non-rectangular scene of a military camp perimeter.
Figure 3A:
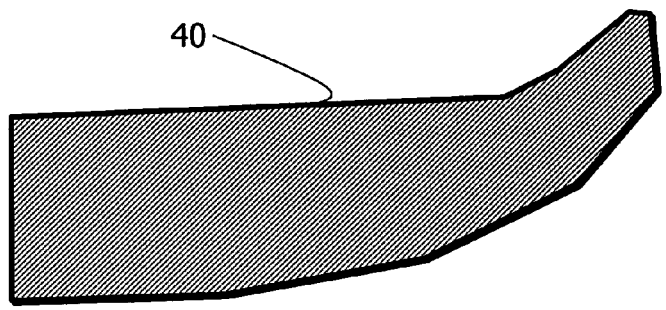
FIG. 3A-3D shows mask corresponding to the image of interest FIGS. 2A-2D according to an embodiment of the invention.
Figure 3B:
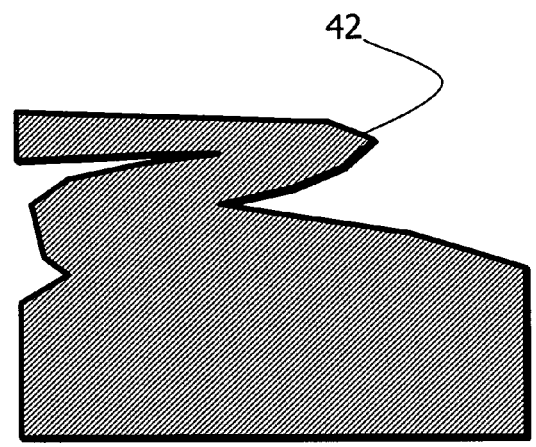
Figure 3C:
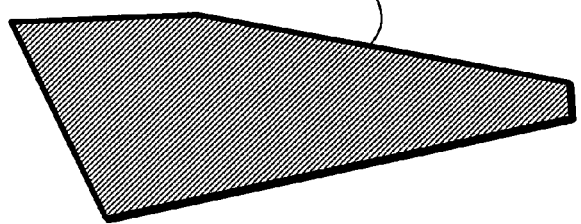
Figure 3D:
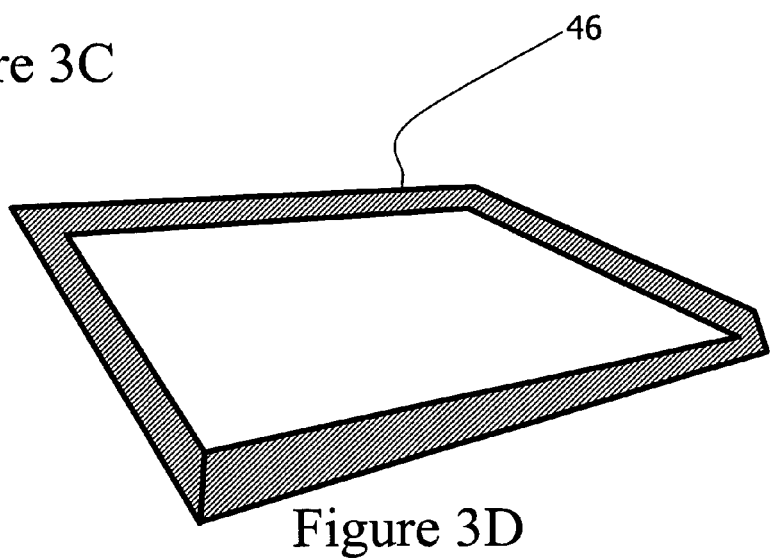

In FIG. 2D, a scene comprising a camp 32 in the desert is shown. An arbitrary perimeter of the camp 32 takes only a small part of the field of view. If the perimeter of the camp 32 were the only image of interest in the frame 33 (such as if the view were from a security camera used to monitor the camp 32 perimeter), pixels within the frame 33 corresponding to the field of view 34 would be necessary, but pixels within the frame 33 not corresponding to the field of view 34 would be extraneous.

Turning to FIGS. 3A-3D, masks are shown corresponding to the four images of interest in the scenes of FIGS. 2A-2D.

Figure 4A:
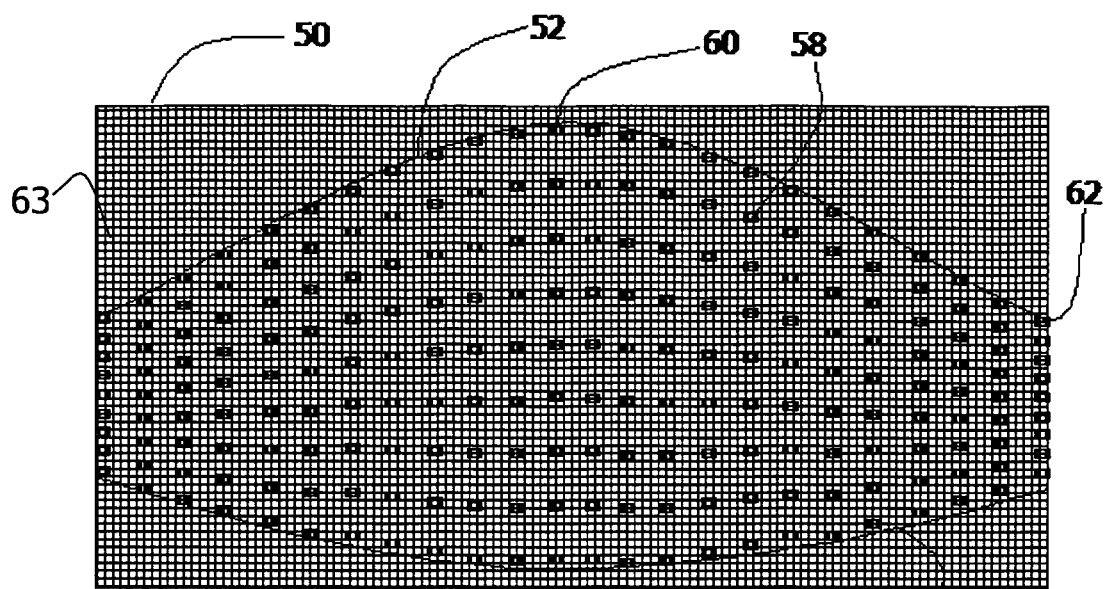
FIG. 4A shows a diagram of a lookup table for a frontal fence scene with uniform dilution according to an embodiment of the invention.

Turning now to FIG. 4A, a diagrammatic representation of a look up table 50 is shown. Each cell in the table 50 represents an azimuth and an elevation in the field of view. In one embodiment, each cell in the lookup table 50 corresponds to one or more cells in a linear CCD array. The maximum vertical resolution of elevation is determined by the resolution of the linear CCD array, and the maximum horizontal resolution of azimuth is determined by the resolution of the shaft encoder of the reflecting mirror (described in more detail below). In accordance with an embodiment of the present invention, the lookup table is configured to accommodate for the perspective caused by viewing a straight fence with an imaging system of the present invention. Lines 52, 54 show the lower and upper edges of the fence, as seen by an imaging system. Perspective causes the center of the image 60 (and thus the center of the fence) to appear largest. Similarly, perspective causes that and the edge of the image 62, 63 (and the portions of the straight fence viewed from the imaging system) to be smaller. The lookup table has a plurality of the pixels marked for processing (shown by outlining the pixels). For illustrative purposes, 9 pixels in each of 24 evenly spaced columns are marked for processing. The result of lookup table 50 is to provide an image that is processed to provide a uniform resolution view of a fence (in this illustrative example, 9 pixels high), despite the perspective view from the imaging system.

It should be noted that the logical size of the linear array is not limited to the resolution of a single linear array component. Two or more arrays can be cascaded or staggered to extend the resolution, or to accelerate the response. Moreover, the staggered arrays do not need to be physically co-linear or contiguous, as the electronics can adjust for slight differences in their position through offset calibration.

Figure 4B:
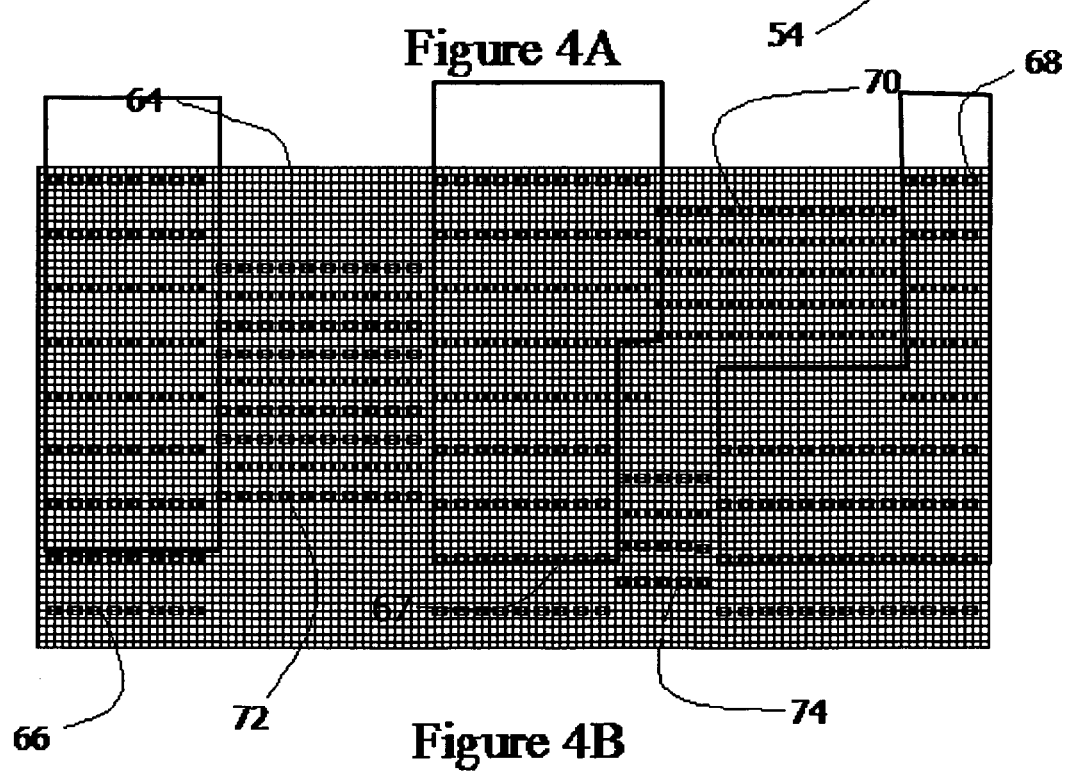
FIG. 4B shows the lookup table for a frontal fence scene with non-uniform dilution according to an embodiment of the invention.

Turning now to FIG. 4B, another lookup table 64 is shown for a linear array. The number of columns and the number of pixels per column in lookup table 64 is the same as the number of columns and pixels per column in lookup table 50 of FIG. 4A. Unlike FIG. 4A, however, the density of columns and the distribution of pixels along each column are not uniform in FIG. 4B. In this illustrative embodiment, certain areas in the field of view 70, 72, 74, have higher density and, as will be discussed in more detail below, offer a "zoom" into certain elements in the scene while other areas of the scene, 66, 67, 68, serve as "background" of the scene and have uniform resolution. Note that the areas 66, 67, 68, 70, 72, 74 may, but need not have rectangular shapes. Lookup table 64 will result in an image that is processed to provide specific zoom areas despite the uniform (i.e., unzoomed) resolution of the imaging system. It should be noted that there is no need for every column of pixels to be used, nor for the number of pixels used in any column to be constant.

Figure 5A:
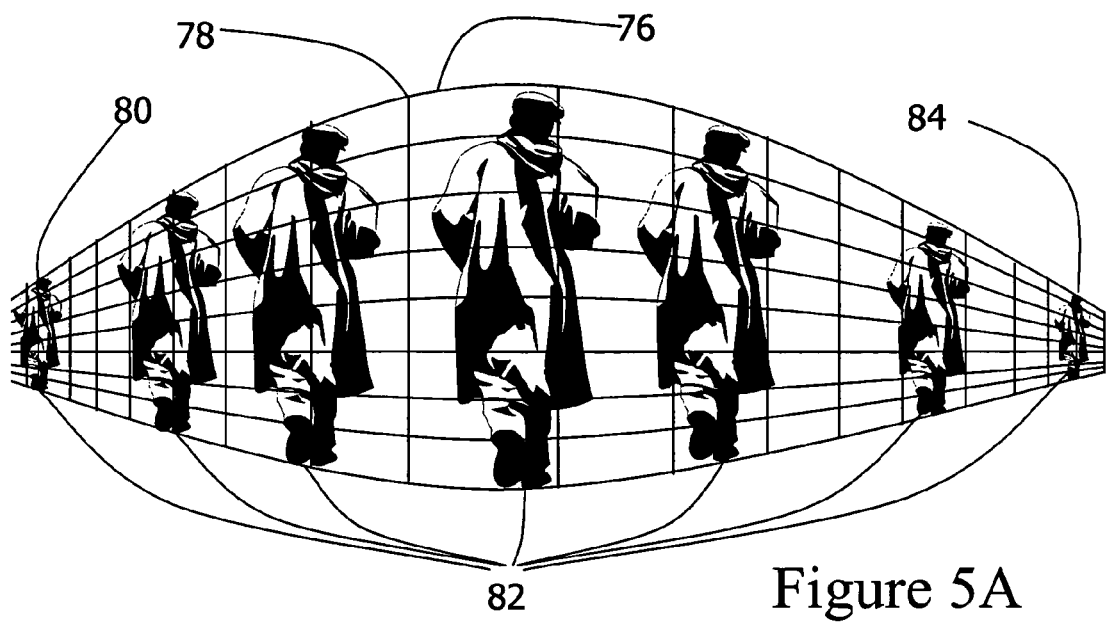
FIG. 5A shows a frontal fence scene as projected by the camera lens.

Turning now to FIG. 5A, which represents an imaging system's view of a long fence 76 normal to the imaging system. For illustration, the human FIG. 82 is shown in several locations along the fence. When the figure is located near the edges of the fence 80, 84, it appears smaller to the camera due to the perspective of the imaging system. Applying the lookup table 50 shown in FIG. 4a, the density of pixels is higher in the edges of the field corresponding to the edges of the fence 80, 84, and lower in the center of the view 60 corresponding to the location of human FIG. 82. In one embodiment, the number of pixels along the image of the standing person is generally the same in each of the seven locations where human FIG. 82 appears on the fence 76. When the image is processed according to an embodiment of the invention, all appearances of the human figure appear to be of the same size and resolution.

Figure 5B:
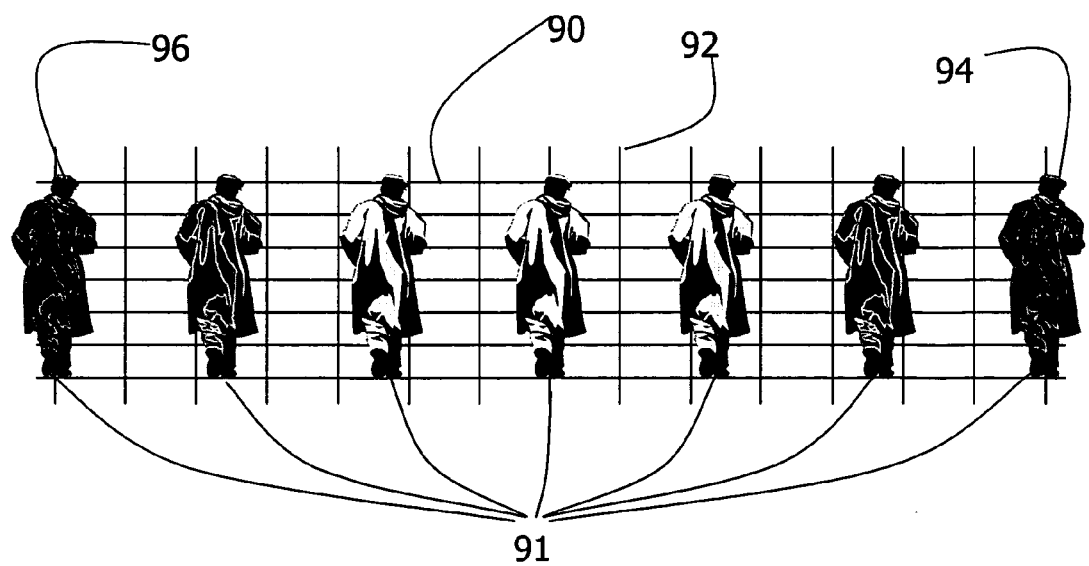
FIG. 5B shows the same frontal fence scene after preprocessing by the imaging system according to an embodiment of the invention.

FIG. 5B shows the image that is acquired from the fence 76 (FIG. 5A) using the lookup table 50 (FIG. 4A) in one embodiment of the invention. As the image was sampled by pixels at a density that is correlated with the distance of the object, the number of pixels that cover the height of the subject appears to be constant, and therefore the images 19 of the subject appear to be of the same size. The only visible deficiency in the remote images is that their contrast seems to be compromised as a result of the fact that the image system faces more noise and distortion when aimed at a remote object. The general uniformity in scale of objects 19 throughout the scene is very helpful, however, for pattern recognition and image processing algorithms. Thus, in one embodiment of the present invention, an imaging system and its processor provide the ability to present a scene with basically uniform scale by programmable dilution of pixels as a function of distance from the camera.

Figure 6A:
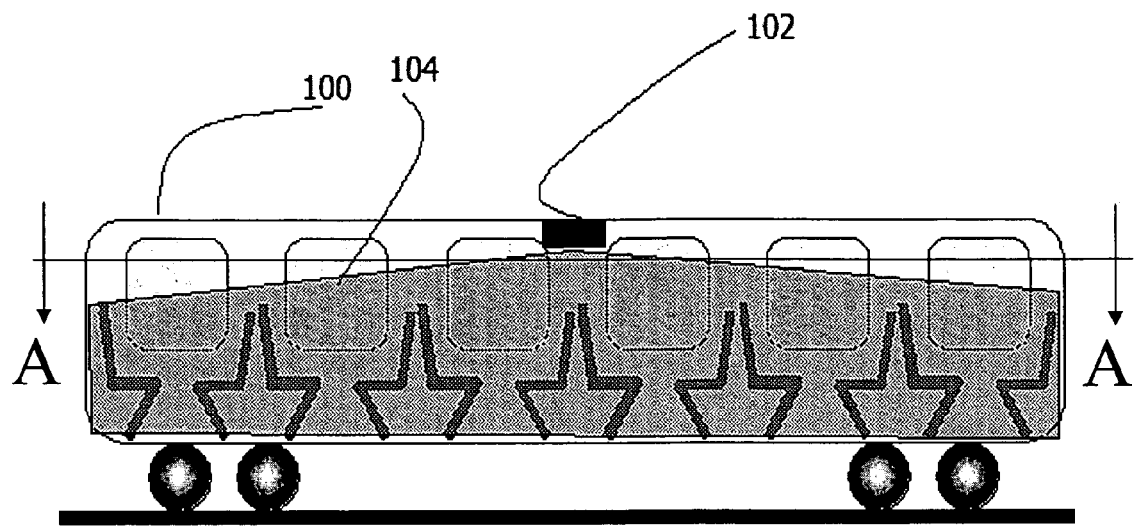
FIG. 6A shows a side cutaway view of a train car with a security camera installed therein.
Figure 6B:
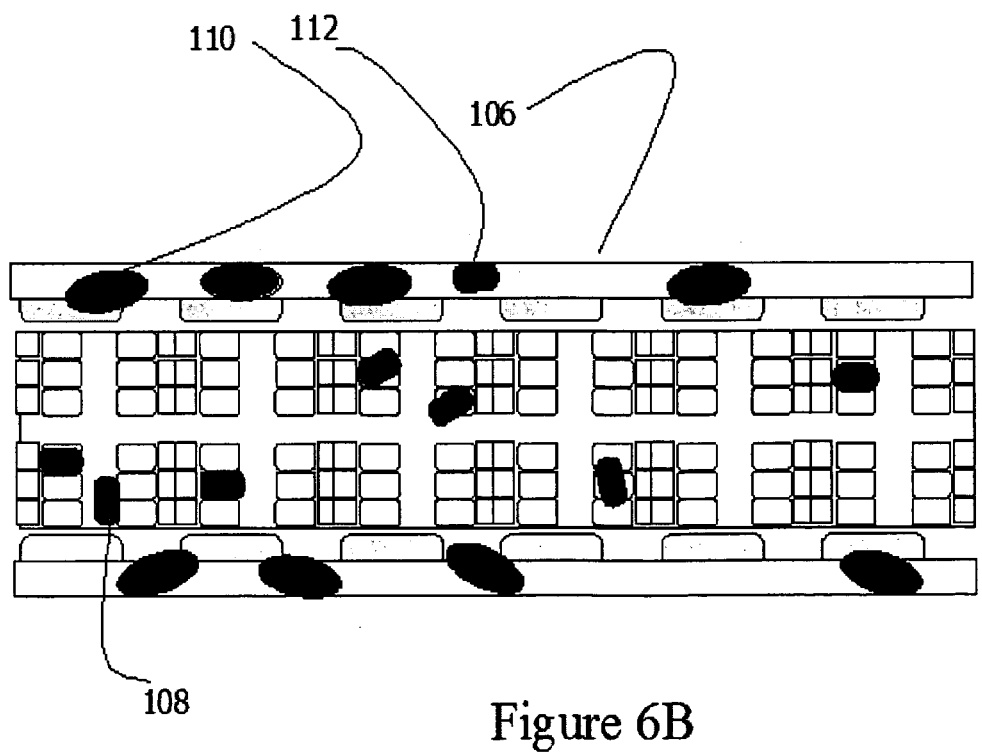
FIG. 6B shows a plan cutaway view of the train car of FIG. 6A along the line AA.

Turning now to FIG. 6A showing a section view of a train car 100 with a security camera 102 mounted on the ceiling, and FIG. 6B showing a plan view of the interior of train car 100. In this illustrative embodiment of the present invention, security camera 102 is used to monitor the interior of the train car 100.

A security camera 102 is attached to an elevated location in the car 100. In one embodiment, the security camera 102 is mounted to the center of the ceiling of the car 100. Where the camera 102 is so mounted, the field of view shown by the lines 104 is closer to the camera right under the camera where the distance from the camera 102 to the monitored interior is less than the height of the interior of the car 100, while the field of view shown by the lines 104 is farther from the camera 102, and as much as half of the length of the car 100, near the ends of the car 100.

A typical security application of the camera 102 would be to detect items that passengers have left behind. Such items are a security hazard. The details of pattern recognition algorithms for identifying the items is known in the art, and not discussed herein. The systems and methods disclosed herein permit the acquisition of an image having sufficient resolution within the field of view to permit identification of items of interest.

In one embodiment, the systems and methods disclosed provide a line of sight from the camera to a majority of locations where items may be left.

There are obviously areas in the car that are not within line of sight of the camera 102. Such areas include, mainly the floors between the seats and locations where seat-backs are blocking the view of the camera 102. Moreover, because an item of interest may be located anywhere in the field of view, there can be a large disparity in the distances between the camera 102 and various items of interest, for example, some items of interest may be up to 4 times closer to the camera 102 than others. Some items 110, 112 will be visible to the camera 102, while other items 108 are not visible to the camera as they are hidden behind seats of seat backs. Because of these problems, it was heretofore impractical to use a single stationary camera to monitor items left behind in a train car.

Figure 7A:
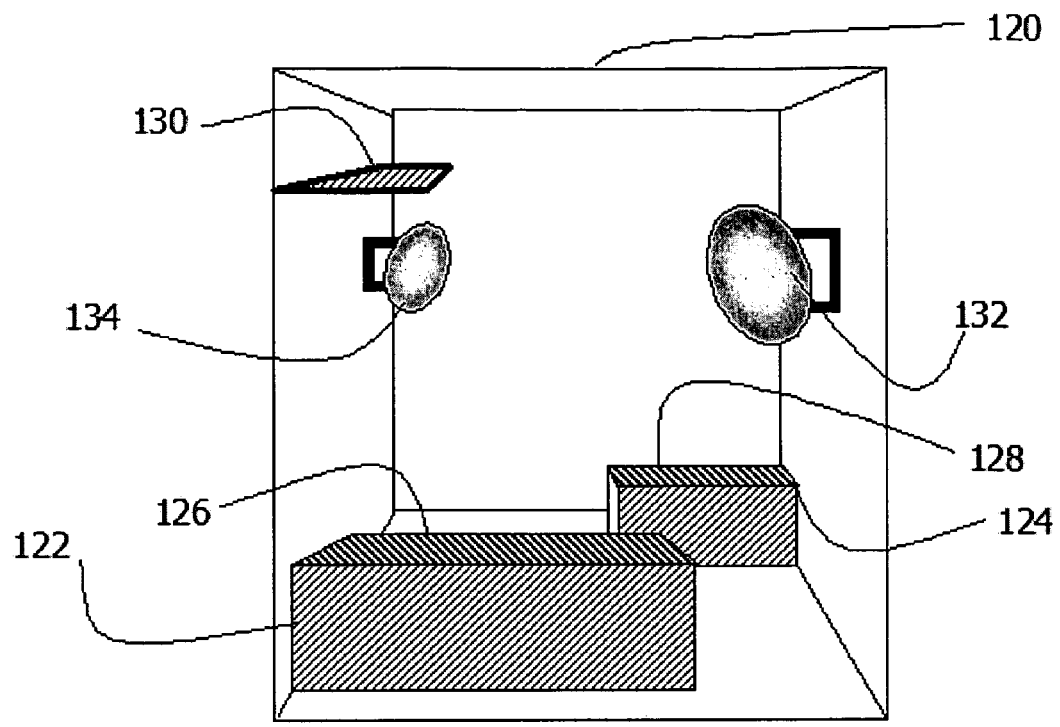
FIG. 7A shows an interior scene as seen by a security camera.

Turning now to FIG. 7A, an interior scene is shown showing an interior 120 as seen from the point of view of a camera (not shown) installed near the ceiling. Interior 120 includes a shelf 130 that can be seen directly by the camera. For illustrative purposes, solid object 122 obstructs the view of an area 126 located behind the solid object 122 from the point of view of the camera. Accordingly, one or more items located behind the solid object 122 cannot be viewed directly from the point of view of the security camera. Similarly, solid object 124 obstructs the cameras direct view of an area 128 located behind it.

In the context of a train car or other small interior space, small mirrors can be installed in locations that will expose hidden objects to the camera. Thus, although areas 126, 128 are obstructed from the direct view of the security camera, mirrors 132, 134 are used to view obstructed areas from another angle. As illustrated in FIG. 7A, due to practical considerations, the mirrors 132, 134 are much smaller than the part of the scene that they expose. A small mirror, however, can reflect a larger object if it is convex. Thus, the areas 126, 128 can be exposed to the camera, albeit distorted and significantly reduced in the size from the point of view of the camera. The distortion comes from the convex shape of the mirror, while the reduction in size results from both convex shape of the mirror and the distance of the object from the camera. Even if mirror 132 were not convex, area 126 as seen reflected in mirror 132 appears a distance from the camera equal to the distance from the camera to the mirror 132 plus the distance from mirror 132 to the area 126. As a result, the image of an object of interest in the area 126 may then be too small to be properly identified in an image from the security camera.

Figure 7B:
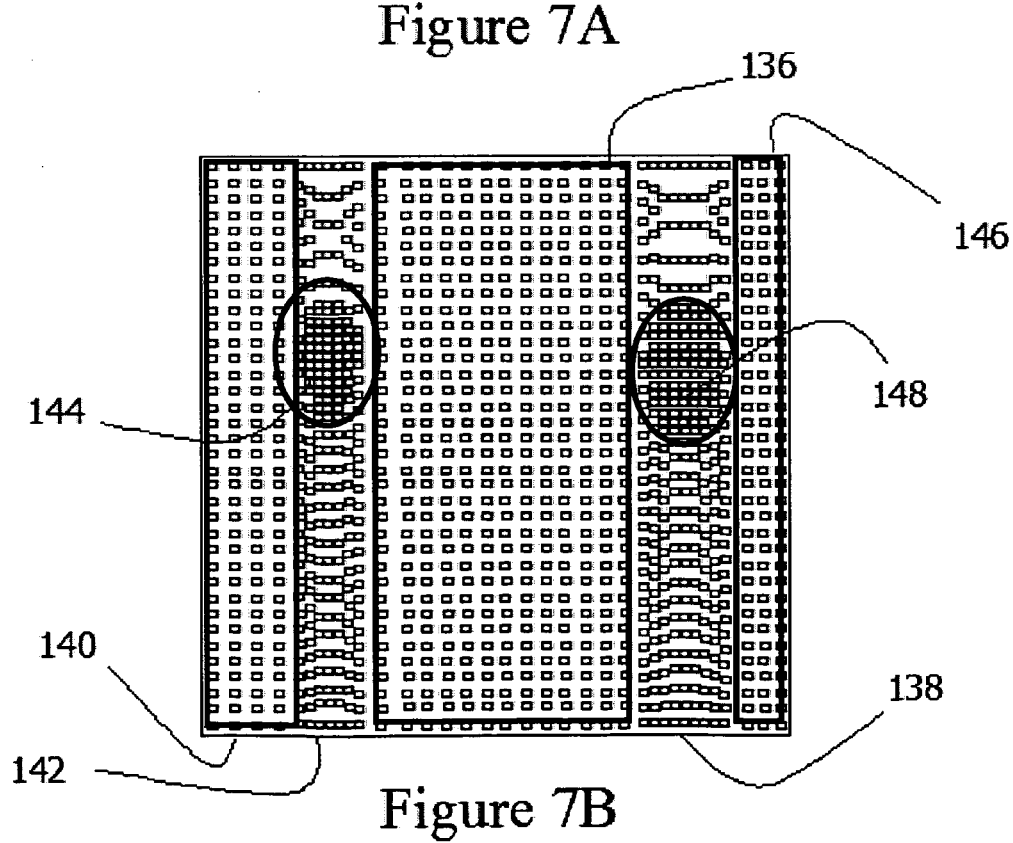
FIG. 7B shows a diagram of a lookup table used by the image preprocessor according to an embodiment of the invention.

FIG. 7B shows a lookup table provided to modify an image produced by a security camera view of FIG. 7A by correcting for the distortion introduced by the convex shape of the mirrors 132, 134. In addition, the lookup table can correct for the apparent distance of the areas 126, 128 from the camera. It should be noted that in the illustrated example, for simplicity, the lookup table has been modified to accommodate the mirrors 132, 134 without substantial consideration for the appropriate lookup table for the remainder of the image. As illustrated, pixels are distributed evenly throughout a large percentage of the scene, as can be seen in some areas 136, 140, 146. Columns with horizontally denser pixels 138, 142 contain even denser areas 144, 148, reflecting an increased vertical pixel density correspond to the position of the mirrors 134, 132. In the columns 138, 142 that contain the denser areas 144, 148, the distribution of pixels along the column is distributed so as to accommodate the denser areas 144, 148 of pixels. The result is that the density of pixels covering the areas 144, 148 corresponding to the mirror locations is significantly higher than the density of pixels covering areas of direct line of sight, thus creating an image that covers the scene much more usefully than a conventional camera and providing improved images for better image processing and decision-making.

Accordingly, pixel density may be enhanced in areas that require additional clarity. Further, pixel densities can be non-uniform to correct for image distortion that results from, e.g., the perspective of the camera, and/or the shape of a mirror or lens. For example, as discussed above, the pixel distribution can be non-uniform to accommodate differences in scale due to distance.

In one embodiment, the pixel density in the lookup table is adjusted so that if a number of identical objects (e.g., tennis balls) exist in various locations throughout the scene viewed by the camera, all of the objects will be imaged with approximately the same number of pixels. In other words, the same number of pixels should be dedicated to an object that is far from the camera as to one that is near the camera; similarly, the same number of pixels should be dedicated to the back of a tennis ball viewed in a distant a convex mirror as the number of pixels dedicated to the front of the tennis ball viewed directly in the camera's field of view. The lookup tables shown in FIGS. 4A and 7B are illustrative of this principle.

The present invention is versatile system and method that allows distribution of pixel density to accommodate various requirements. In one embodiment, as partially illustrated in the lookup table of FIG. 4B, some areas of a scene 66, 67, 68 are allocated a first pixel density, while other areas of a scene are allocated a higher pixel density 70, 72, 74. In one embodiment, some areas of a scene are given no pixel density because they do not contain anything of interest. In one embodiment, the density of pixels varies throughout the scene to accommodate a particular requirement or desired image clarity or desired image compensation.

Turning now to FIGS. 8A-C, an illustration is presented to show compensation for optical defocusing of an image caused by large differences in distance between the camera and various parts of the scene. The invention as described with respect to FIGS. 8A-C is typically relevant to close-up scenes where objects within the field of view can be close to the camera and thus appear out of focus because the scene is beyond the depth of field of the camera. Depending on a number of factors, including the lens type and quality, and the aperture opening, a camera is able to capture an image that is substantially focused between a minimum and a maximum distance from the lens. This range is known as the depth of field. In scenes where all of the objects in the scene are within the depth of field, the entire scene is in focus, and there is no problem of defocusing. In some applications, however, the camera positioning, lighting, lens or other factors may cause portions of the image to be out of focus, or defocused. Moreover, in applications such as automatic optical inspection in production processes, the camera may be positioned so close to the scene that, in order to be in focus, the closest areas of the scene require a different optical setting than the farthest areas of the scene. It is neither desirable nor practical, however, to adjust the optical setting while the camera is scanning.

According to one embodiment of the present invention, A camera 150 is scanning a field of view represented by line 151 to acquire an image. Point 155 is within the field of view and relatively close to the camera 150, and point 153 is within the field of view and relatively far from the camera 150. The focus of the camera is pre-adjusted to provide a clear, focused image at point 153. An object 156 in that part of the scene will be imaged in good quality and focus. With the same settings for camera 150, however, a similar object 160 located at the point 155, will appear larger and out of focus. However, as the image of object 160 is much richer in pixels due to its being closer to the camera, an image of a lesser resolution of object 160 can be derived by averaging the values of neighboring pixels. In the example illustrated in FIGS. 8A and 8B, a part of object 158 that covers one pixel, is covering 3×3=9 pixels in the representation of object 160, so that these 9 pixels can be averaged to define a value for one pixel that will represent this area in a quality that is closer to the quality of the single pixel of object 158. Thus, the defocusing of object 160 can be at least partially compensated by the redundancy of pixels. Eventually, as discussed above, according to one embodiment of the invention, both of the objects 156, 160 will be imaged with approximately the same number of pixels through the use of this averaging process.

In accordance with another embodiment of the invention, to accommodate the loss focus near point 155, the image of the object 160 (near point 155 of the scene) is imaged with a higher pixel density, and thus, a larger number of pixels. In other words, pixel dilution is waived, and the additional pixels are used to sample object 160 in more detail. In the illustration, the object 156 (near point 153 of the scene) is sampled with 9 pixels (3×3), the same pixel density 158, 162, when applied to the object 160 (near point 155 of the scene) samples the object 160 with 81 pixels (9×9). In other words, to accommodate the loss focus near point 155, instead of diluting the pixels near point 153 of the scene down to about 9 pixels to allow each of the objects 156, 160 to be imaged using approximately the same number of pixels as disclosed above, in this embodiment, the image is sampled with more than 9 pixels, which may be all 81 pixels. The image so sampled is then processed by integrating larger meta-pixel groups of neighboring pixels as shown in FIG. 8C by darker lines 161; thus, resulting in a clearer, more focused image that, after scaling, contains approximately the same number of pixels as object 156.

Figure 9B:
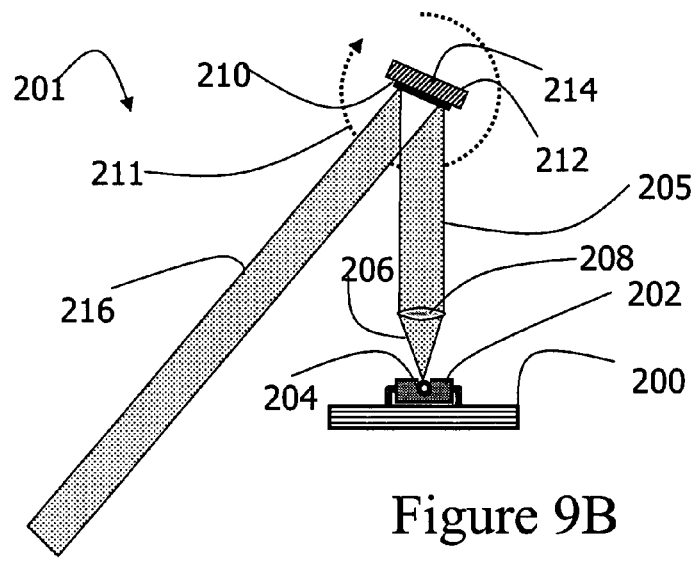
FIGS. 9A-9B shows two views of a scene scanner according to an embodiment of the invention.
Figure 9A:
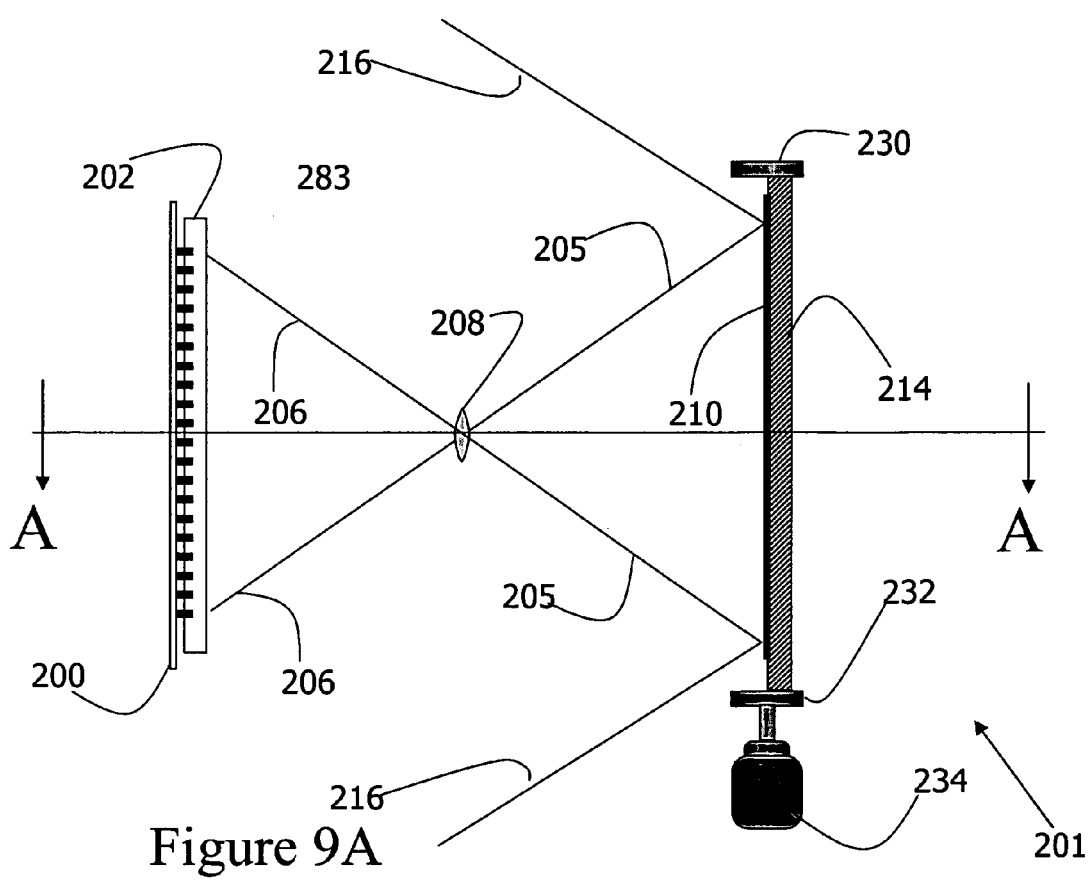

Turning now to FIGS. 9A and 9B, two schematic views are shown of a scene scanner 201 for carrying out the invention. FIG. 9A shows one view of the scene scanner 201, and FIG. 9B shows a view of the scene scanner 201 taken along line AA in FIG. 9A. A base 200 holds a linear CCD array 204 in an electronic component 202. A mirror 210 is rotatably supported by a holder 214 so that it may revolve on an axis parallel to the CCD array in the direction of arrow 211. The mirror 210 reflects a beam of light 216, 205 through an imaging lens 208 that sends a focused beam 206 onto the linear CCD 204. As the mirror 210 rotates, the CCD scans the field of view. A motor 234 rotates the support 214 and thus mirror 210 while a shaft encoder (not shown) records the exact angular position of the mirror 210. An image is formed by rotating the mirror 210 about the axis and successively sampling the light incident on the array 204. The output of the CCD is selectively diluted as explained below.

Figure 10:
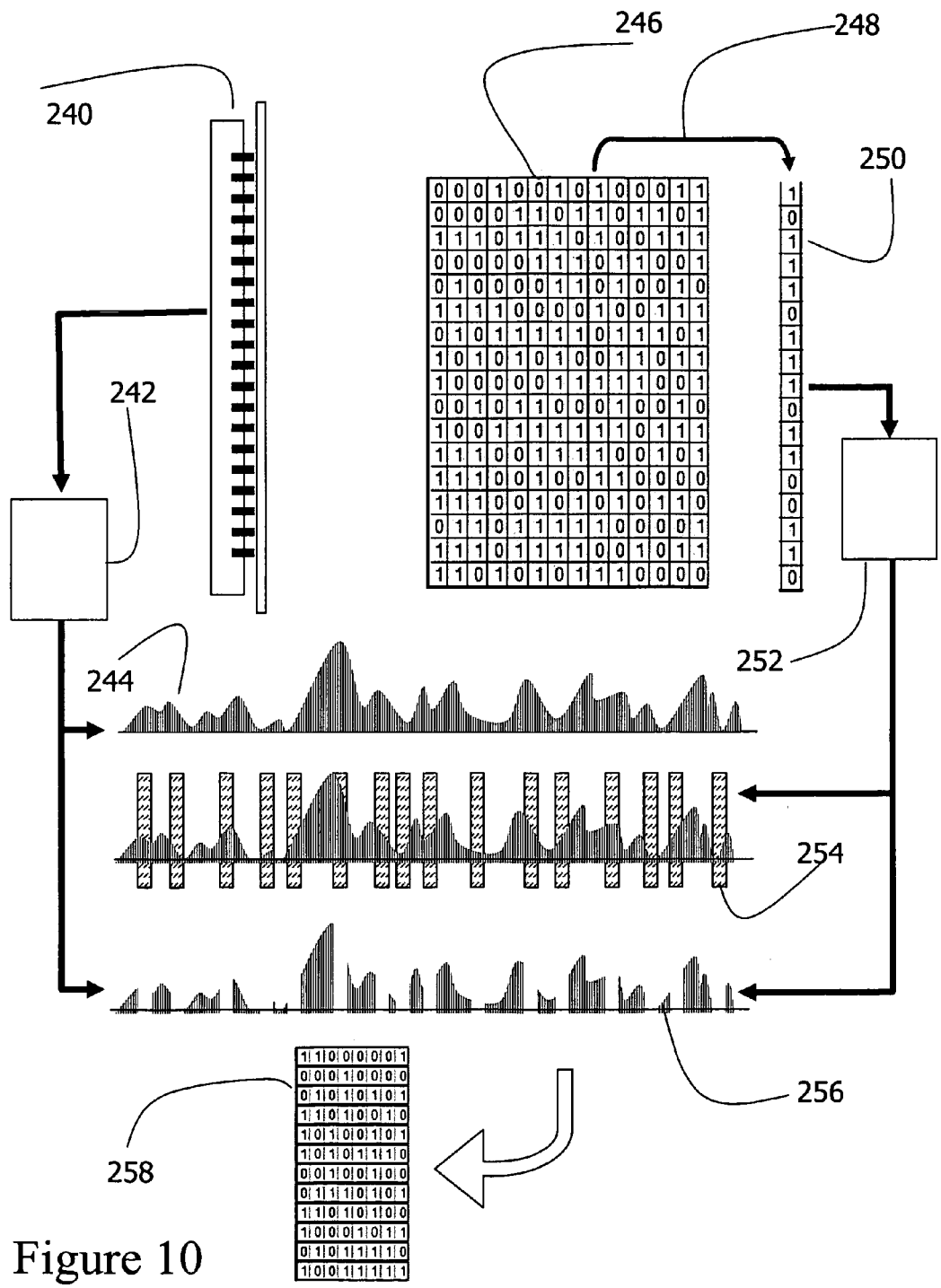
FIG. 10 shows a diagrammatic view of the process of the selection look-up table according to an embodiment of the invention.

Attention is now called to FIG. 10, showing the process of image dilution. A linear image sensor array 240 such as model IT-P4-6144 linear CCD array available from Dalsa, Waterloo, Ontario Canada, or the infra red linear array as the linear array detector that covers the 200-1100-nm range and is available from Ocean Optics Inc., Dunedin, Fla. scans an image linewise through a lens—as described herein above in this application—and feeds a sequential output signal to an analog to digital converter 242. The sampled digital sequence of values 244 is fed into a dilution circuit (not shown) that dilutes the signal according to a pre-defined lookup table 246. In one embodiment, the number of pixels per line required as an input for image processing, as provided by commercial digital cameras, is 1000 pixels. This allows for a 1:8 dilution of the output of the linear array in creation of the input image. For convenience, the dilution scheme may be determined by the lookup table 246 that specifies the required pixels for each scan of the linear array 204.

In one embodiment, a single linear array outputs data representing a specific orientation of the mirror 210 (FIG. 9), thus representing a specific angle of azimuth of the scanned scene. By assigning a required resolution to each area in the scene, the controller of the scene scanner 201 can assign the required pixel dilution scheme for each scan of the linear array 204, and thus, for each azimuth angle, and represent this scheme in the content of the lookup table 246.

In one embodiment, the number of columns in the table is equal to the number of scan lines in the image, and the number of rows in the table is equal to the number of pixels in the linear array 204. The table 246 contains binary data, in the sense that the value of each cell in the table is either "0" or "1". In one embodiment, a "1" in a column means that, for this scan, the pixel corresponding to the "1" is required in the image output from the dilution process. The number of is in each column is equal to the vertical resolution of that particular line in the image output from the dilution process. The table 246 is used, further in the processing, as a legend for interpretation of the input image, indicating the azimuth and elevation that corresponds to each pixel.

An angle detection mechanism that monitors the revolving mirror (not shown) tracks the momentary azimuth of acquisition. In one embodiment of this invention, the angle detection mechanism assumes that the mirror is rotating at a constant speed and gets a trigger from a shaft encoder many times per revolution, depending on the shaft encoder resolution. Using a high frequency stable pulse generator, the angle detection mechanism can interpolate the angle of the mirror 210 throughout its rotation. This technique can interpolate the angle of the mirror 210 at a resolution that is higher, and typically 10 times higher, than the horizontal resolution of the image.

In one embodiment, a one-dimensional lookup table (not shown) may contain a position for every angular position of the mirror. Such a one-dimensional lookup table can be programmed to have "1" in positions that represent an azimuth that is required in the image, and "0" for positions that represent an azimuth that needs to be diluted out. In one embodiment, the number of "1"s in this one-dimensional table are equal to the number of vertical scan lines in the image and also to the number of columns in the lookup table 246 for this image. As the mirror revolves and the scene is line-wise reflected onto the linear array 204 through the lens 206, the one-dimensional lookup table is indexed by pulses representing the angular position of the mirror 210. When the indexed one-dimensional lookup table position contains a "1", the lookup table 246 column is indexed to the next position, and a scan line is acquired. A controller 252 then extracts the indexed column 250 from the table 246 and uses the contents of the column to delete the non-required pixels 254 from the scanned line, producing a "diluted" scan line 256 that has a fixed length equal to the resolution of the input that will be output from the image dilution process. In other words, the selected pixels of the selected columns compose the image 258 for further processing. The result is that the image output by the image dilution process contains only those pixels that represent the desired resolution of each area of a scanned scene.

Although the discussion of pixel dilution is presented with relation to a linear array, it is equally applicable to a two-dimensional CCD array, including a high-resolution two-dimensional array. It is to be understood that it is within the spirit and scope of the present invention to apply the specific dilution mechanisms shown in this application, or other dilution mechanisms selected for use in connection with the claimed methods and systems, in both X and Y dimensions. Specifically, it should be understood that using dilution, regardless of the specific method or apparatus chosen to carry out the dilution, to permit selection of a subset of the CCD array's pixels for communication, storage and/or processing is regarded by the applicants to within the scope and spirit of some of the claims herein. The distribution of selected pixels across the two-dimensional CCD array can be arbitrary, and can serve the same purposes and applications illustrated herein with linear CCD arrays.

Figure 11A:
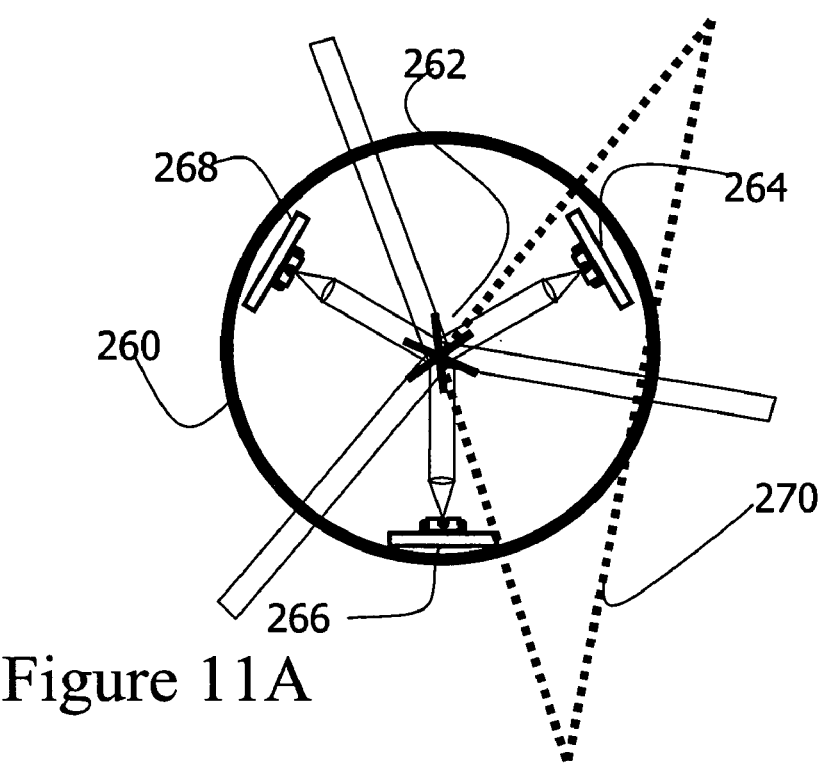
FIG. 11A shows a top view of the staggering of three linear arrays according to an embodiment of the invention.

Turning to FIG. 11A, a top view of the staggering of three linear arrays to enhance the angular coverage. Three image acquisition assemblies 268, 264, 266 (similar to the scene scanner 201 described above) are installed so that their rotating mirrors are coaxially positioned adjacent to each other. In one embodiment, the three rotating mirrors are rotated by the same axis 262 and by the same motor 272. The typical angle of coverage of each scene scanner is between 120 and 160 degrees. The relative orientation of the three scanners can be adjusted in a variety of ways, for example, as shown in FIG. 11B or as shown in FIG. 11C.

Figures 11B, 11C:
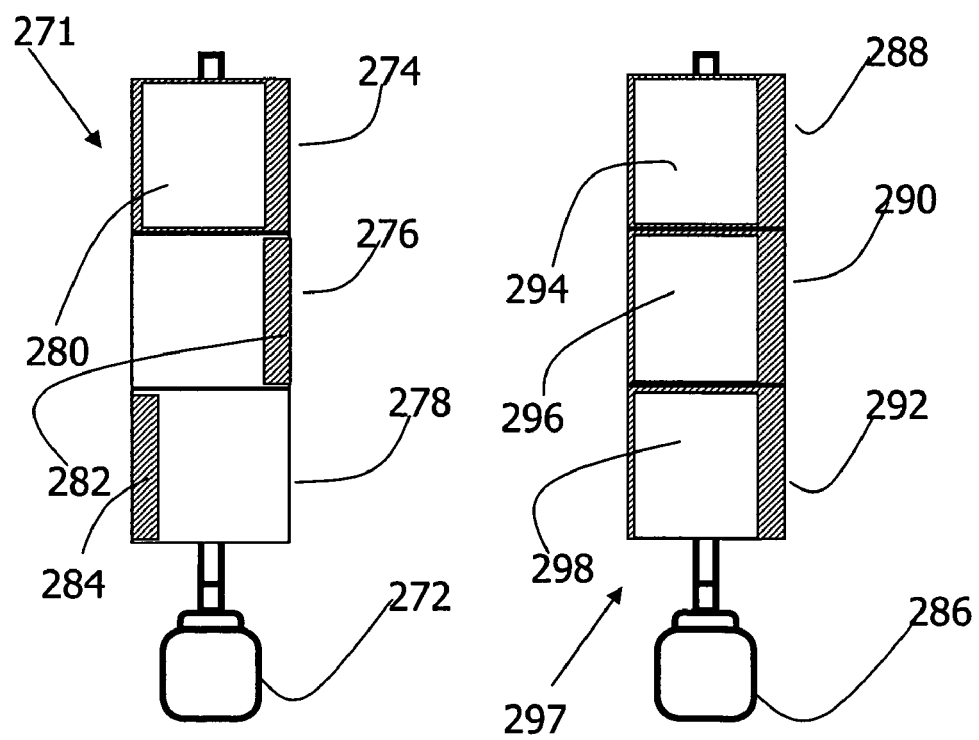
FIG. 11B shows a front view of the staggering of three linear arrays in a mode of increasing the angular coverage according to an embodiment of the invention.
FIG. 11C shows a front view of the staggering of three linear arrays in a mode of increasing the vertical resolution and acquisition speed according to an embodiment of the invention.

In FIG. 11B a side view is shown of the staggered mirror assembly 271 for a scene scanner intended for a 360 degree coverage. In this relative arrangement the three scanners are oriented in 120 degrees from one other. The assembly then provides a 360-degree coverage with some overlap between the sectors. This mode is very useful for surveillance and security applications where the relevant object can show up in any azimuth.

In FIG. 11C, a side view is shown of the staggered mirror assembly 287 for a scene scanner intended to enhance coverage of a specific direction. In this relative arrangement the three scanners are oriented in the same direction. The assembly then provides the same coverage as a single scanner, but in one embodiment can provide a 3-times-faster revisit time, or in another embodiment can provide a 3-times-higher horizontal resolution. As the typical revisit time in a single scanner, using today's relatively reasonably priced off-the-shelf linear arrays is 4 frames per second, tripling this rate brings frame rate up to 12 frames per second, into a range that can be conceived as a video rate. It will be apparent to one of skill in the art that additional mirrors/arrays combinations can be added to further enhance the horizontal resolution and/or the frame rate. For example, a scene scanner with 12 mirrors could provide 2 times the horizontal resolution and 24 frames per second. Other combinations are possible as well.

Figure 12A:
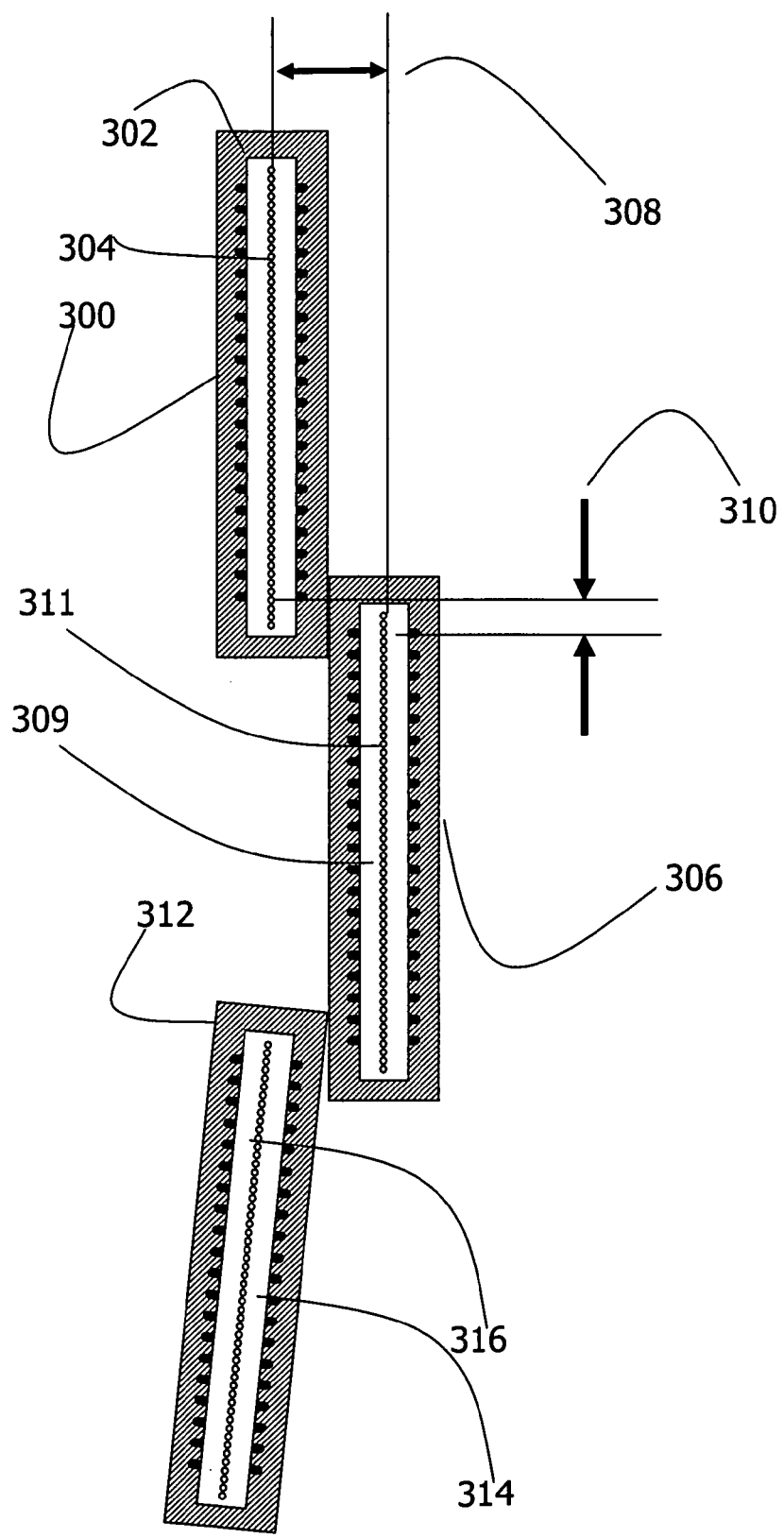
FIG. 12A shows the staggering of three linear arrays working with one mirror, to extend the vertical resolution beyond the capability of a single array according to an embodiment of the invention.

Turning now to FIG. 12A. FIG. 12 shows three staggered linear array 302, 306, 314. The arrays 302, 306, 314 are staggered to increase the resolution of a scene scanner. A printed circuit 300 carries a linear array sensor unit 302 that has a line of active pixels 304. Similarly, the same or another printed circuits 306, 312 carries linear arrays 309, 314, each having a line of active pixels 311, 316. The physical structure of the device does not allow linear concatenation of two devices without breaking the continuity of the pixel lines. Thus, in one embodiment, two similar arrays 302, 306 may be staggered with some translation shift 308 and some parallel overlap 310. The output of devices 300 and 306 corresponds to two parallel columns in the look-up table. In the illustration, a third linear array 312 is also staggered from the first two arrays 302, 306, but due to inaccuracy in the mechanical assembly the third linear array 312 is not parallel to the other arrays. Because the relative orientation of the arrays is fixed and does not change, a lookup table according to the invention can be calibrated to compensate for both the offset and skew, and thus compensate for mechanical alignment of this faulty orientation. It will be apparent to one of skill in the art that a calibration compensation circuit can be programmed using the output of providing a known calibration scene into the scene scanner.

Figure 12B:
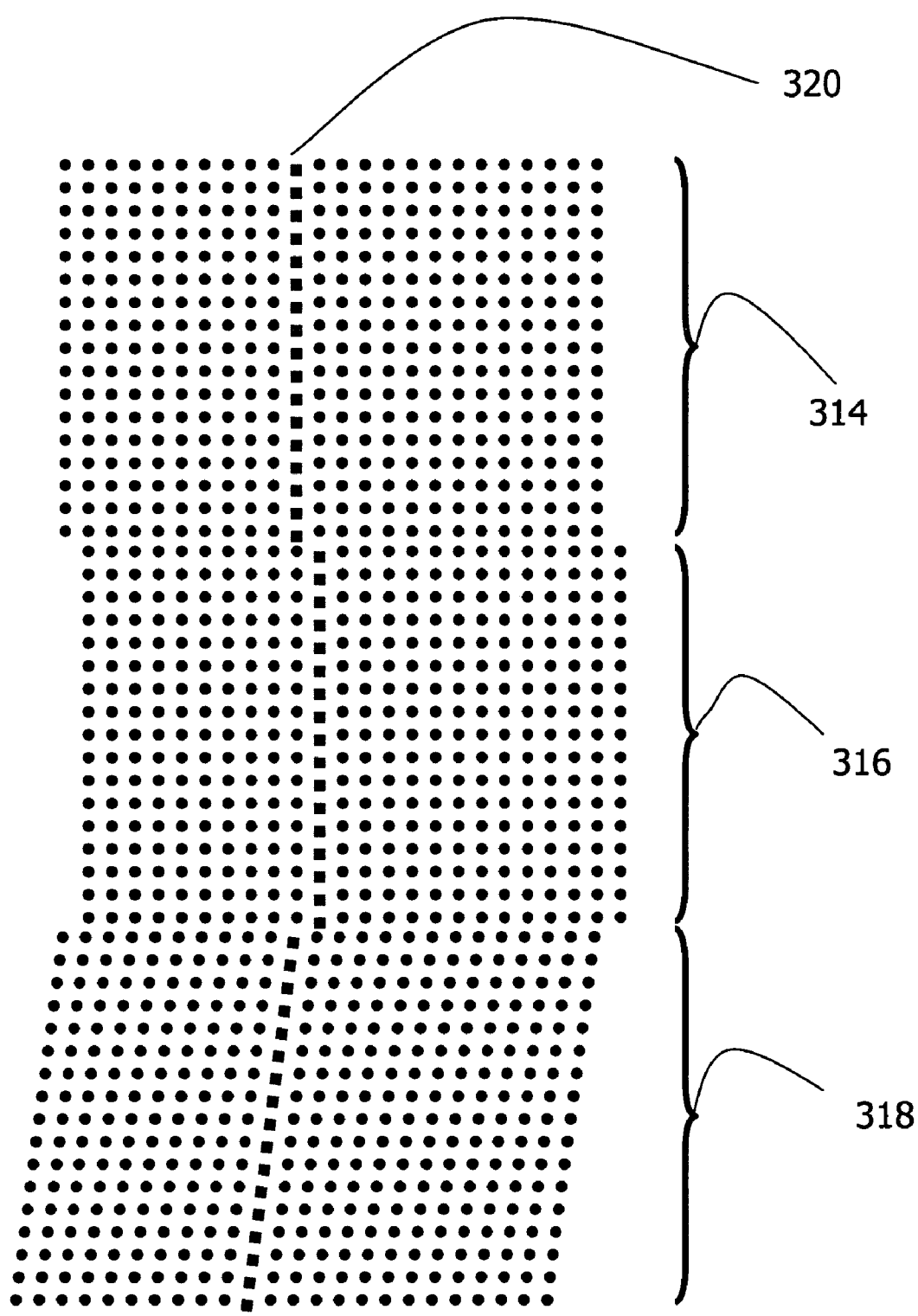
FIG. 12B shows the implementation of the staggering of three linear arrays in the lookup table according to an embodiment of the invention.

Turning now to FIG. 12B. FIG. 12B shows the projection of the three staggered arrays on the lookup table. It can be seen that a single scan line 320 corresponds to a staggered set of cells in the table. The rows 314 correspond to the top array 300, the rows 316 correspond to the middle array 306, and the rows 318 correspond to the bottom, slanted array 312. Because a look up table according to the invention is read column by column, two vertically contiguous pixels in the table may be included in two different scan lines as illustrated here.

FIG. 13 shows a simplified schematic block diagram of one embodiment of a system of this invention. A mirror of scene scanner 1300 is rotated 1301 and optics are used to focus the light on a CCD array 1302. The CCD array 1302 line-wise scans the image, and passes the data to a data acquisition circuit 1303 in an embedded processor 1305. An image processor 1304 in the embedded processor dilutes the acquired image lines to include only the relevant pixels. The processed image is them passed to inspection or other processing routines, or displayed for a human on an inspection monitor 1306. For example, without limitation, the processed image output from the embedded processor 1305 can be passed to patter or face recognition functions, or motion detection functions, to name a few.

FIG. 14A-14D illustrate a few of the possible programmable resolution distribution functionality of the present invention. In these illustrations, the outer rectangles 1310, 1320, 1330, 1340 represents the scene covered by a camera (not shown), and the corresponding area of a lookup table. The gray level (darkness) of any region in the scene represents the resolution of imaging at that region, determined by the density of marked cells in the table. In one embodiment, the total number of pixels per scan line is held constant, but the illustrations are simplified in that they do not show that when the resolution is enhanced (or reduced) from the average in a part of a given scan line (or column), then other parts of that scan line (or column) have to be reduced (or enhanced) respectively, from the average.

FIG. 14A shows a uniform distribution of resolution reduction. By way of example, consider a linear array comprising 10,000 pixels and a scene sampled 10,000 times across the frame, where the desired resolution is 1,000×1,000 pixels. In other words, although the raw resolution is 100,000,000 pixels, the desired image resolution is only 1,000,000 pixels. Such a constraint may be required in order to accommodate a bandwidth constraint. As illustrated, the original content is reduced by 9 out of every 10 pixels in each scan line and 9 out of every 10 columns. In other words, reduction is accomplished by starting at line 1 and simply including 1 out of every 10 scan lines across the whole image and selecting 1 out of every 10 pixels of each included line.

FIG. 14B shows a high precision mode in which a sub-scene 320 comprising of 20% of the frame 1320 is acquired. Again consider a linear array comprising 10,000 pixels and a scene sampled 10,000 times across the frame. The sub-scene consists of an area of 2,000 pixels square (20% of 10,000 in each direction). Assuming the same constraint as above of providing a 1,000×1,000 image, it may now be composed when 1 out of 2 lines and 1 out of 2 pixels per line are acquired. For illustrative purposes, consider that the first scan line is scan line number 460/10,000-using the method described, the same 1,000 pixels on each the next 1000 even lines, throughout scan line 2458, would be captured. In such an embodiment, the camera does not cover the whole scene, most of which is not included in the output image.

FIG. 14C shows an alternative way to zoom on one sub area 322 of the camera frame 1330, without becoming blind to the whole scene. The lookup table is programmed to select lines at low resolution throughout the scene, and increase the density at the interesting sub-scene 322. It should be clear that the shape of the interesting area does not need to be rectangular, as was shown in FIG. 14B above.

FIG. 14D shows a similar situation to FIG. 14C, but where the interesting, highlighted area 324 has moved to the new position. This illustration exemplifies the ability of the system of the present invention to modify the content of the lookup table dynamically. The table can be updated on a frame-to-frame basis, either in a prescribed manner, or as a result of real time image processing. A Video Motion Detection software (such VMD-1 available from Advantage Security systems at Niagara Falls, N.Y.) is used, in one embodiment of the present invention, to detect areas of motion in the scanned image. Such areas are then scanned in higher resolution by updating the lookup table to select pixels and scan lines more densely in the area of motion. The lookup table can be updated after every frame to keep the moving object tracked at high resolution while the camera keeps scanning the whole scene.

In one embodiment of the present invention, the content of the lookup table is modified dynamically during operation in order to adjust the resolution distribution across the image. The resolution distribution of the image may be modified according to any of the following considerations: enhancing the resolution of areas where motion is detected; decreasing the resolution of areas where motion is not detected; increasing the resolution of areas that meet a condition of interest based on their content history (a bag left unattended); modifying the resolution of areas that are pointed at by operators in the scene; modifying the resolution of areas where color changes are detected; modifying the resolution of areas in real-time at the request of an operator.

Figures 15A, 15B, 15C:
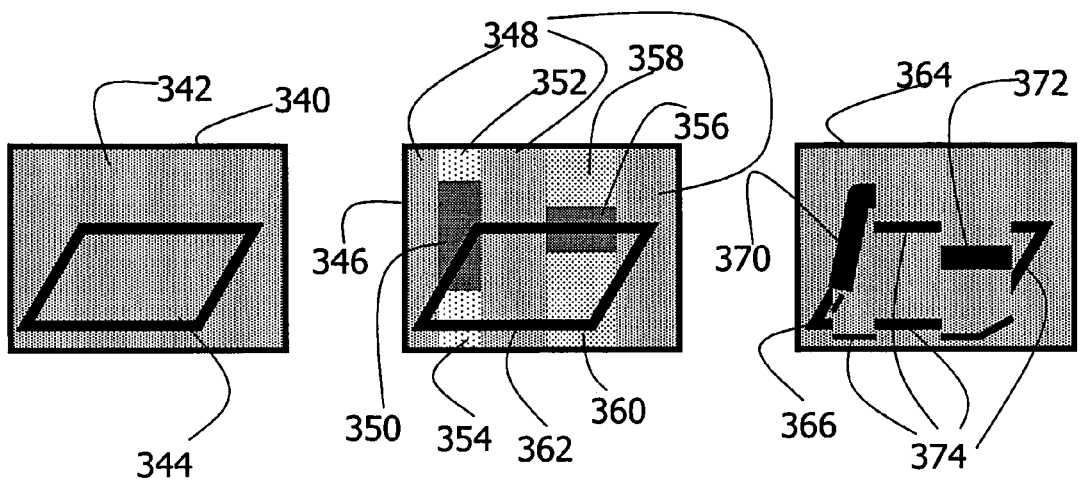
FIGS. 15A-15C are representations of the visual appearance of a diluted image according to an embodiment of the invention.

Turning now to FIGS. 15A-15C, where the background gray level represents the image resolution, darker being a higher resolution, lighter being a lower resolution. FIG. 15A represents a frame 340 acquired using a uniform resolution 342 (albeit, less than the total available resolution of the array) where the scene includes an object 344. Subject to limitations of the scene scanner and any loss due to pixel dilution, the object 344 will be reproduced accurately the same in the output as it appeared in the frame 340. FIG. 15B shows the a frame 346 acquired with the resolution being non-uniform over the frame 346, the frame 346 comprising a plurality of higher and lower resolution areas 348, 350, 352, 354, 356, 358, 360, 361. A large percentage of the frame 346 uses a uniform, average resolution 348. Other areas 350, 356 have higher than average resolution, while still other areas 352, 354, 358, 360 have lower resolution than average. In one embodiment of the invention, the relevant pixels in each scan line remains constant for a given image, thus some areas 352, 354, 358, 360 have a lower resolution to accommodate the areas 350, 365 calling for a higher resolution in the same scan line. FIG. 15C shows the appearance, as displayed in a conventional uniform resolution frame 364, of the object 362 in the scene scanned using the areas of resolution of FIG. 15B. The portions 366 of object 362 that are imaged in the average resolution areas 348 will be reproduced in similar scale and position. The portions 370, 372 that were imaged in higher resolution corresponding to areas 350, 356 will appear enlarged. The portions 374 that were imaged in lower resolution corresponding to areas 352, 354, 358, 360 will appear scaled down. This distortion may be desired and intentional. See, e.g., FIG. 5A, 5B. Accordingly, in one embodiment, the areas scanned with lower pixel dilution (i.e., higher pixel density) will be appear enlarged, and the areas scanned with higher pixel dilution (i.e., lower pixel density) will appear scaled down.

In one embodiment, the image is displayed in scale despite having been scanned with a non-uniform pixel resolution. One method for providing an in-scale display is achieved by mapping the coordinate of each pixel in the distorted image to its original position in the scene using the same look-up table that was used for the selection of pixels. While some of the pixels in the image may be lost and other pixels in the image may be duplicated, the resulting image will appear properly scaled. Another method for providing an in-scale display is by mapping the pixels in the distorted image to destination coordinates near their original position, then using a blending technique to fill in any empty coordinates, then integrating pixels mapped into coordinates to accommodate the resolution of the destination image or display. In summary, a scene is scanned using a non-uniform resolution providing a distorted image (i.e., an image that will appear distorted on a uniform resolution display), the distorted image can then be processed to normalize its appearance (i.e., an image that will not appear distorted on a uniform resolution display), in this manner, the portions of the image that were scanned in higher than average resolution appear with more detail than the portions of the image that were scanned with lower than average resolution.

A similar post-processing of a distorted image could be employed to normalize a the portion of a scanned scene that is viewed through a distorting lens, such as, for example a convex mirror or a wide angle lens. In one embodiment, the scene scanner compensates for the lens distortion by providing the highest pixel density to the portions of the scene comprising images made smallest by the lens, producing an image. When displayed on a uniform resolution display, the portion of the image containing the area distorted by the lens will appear undistorted, while at least some portion of the image not containing the lens-distorted area of the image will appear distorted. Applying the technique above, the scene can viewed without distortion (introduced by the resolution changes) but with higher or lower resolution in portions corresponding to higher or lower relevant pixel density, respective, captured by the scene scanner, however, the distortion caused by the lens is reintroduced. In one embodiment, the image may be further processed so that the area comprising the mirror is again normalized and the mirror appears to reflect an undistorted image. In one embodiment, the original lookup table can be used as the basis for normalizing the image reflected in the mirror.

Figure 16:
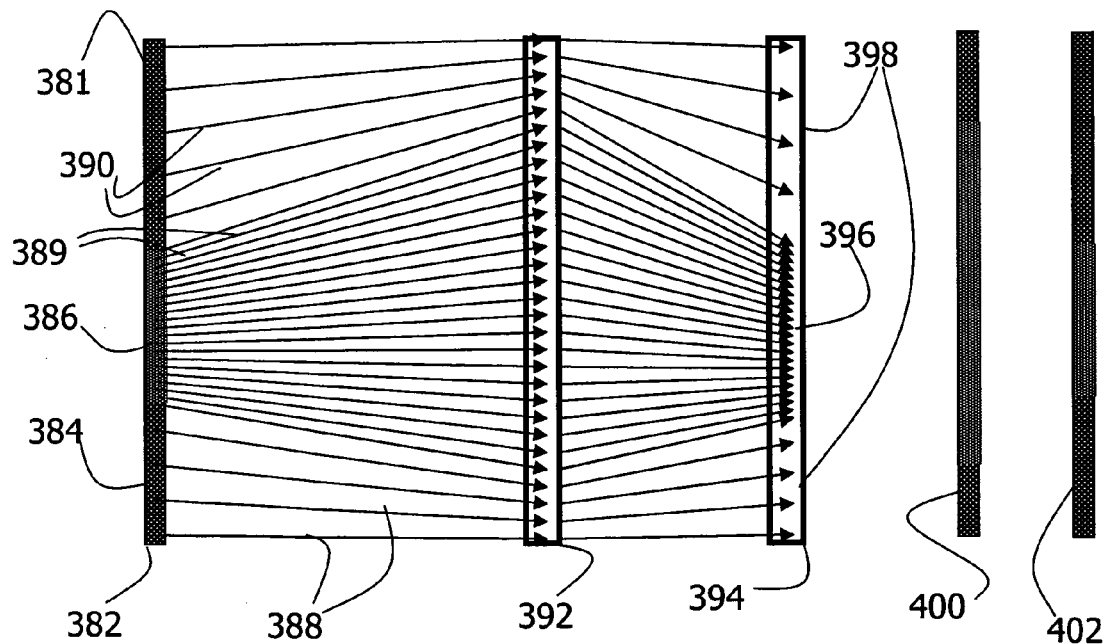
FIG. 16 shows a scan line with variable resolution according to an embodiment of the invention.

Attention is now called to FIG. 16, further describing the resolution distribution with respect to a single vertical scan line. A vertical line of the scene 382 is segmented into three segments 381, 384, 386, where two segments 381, 384 are intended to be low resolution and one segment 386 is intended for high resolution. The scan line 392 that represents the line of the scene 382 is representing the scene with high density of pixels 389 from segment 386, and lower density of pixels 388, 390 from the other segments 381, 384. Displaying scan line 392 on a uniform resolution display, the image segment will look like image line 400, with the high-resolution segment appearing to be enlarged. In one embodiment, the lookup table (not shown) that was used to select pixels from the linear array 382 for the scan line 392, can be used in reverse, thus permitting the mapping of each pixel in the scan line 392 into its original position, then the compensated scan line 394 will resume the correct scale, with the high resolution area 396 and the low resolution areas 398 in their correct scale and position. Accordingly, the image segment line 402 will appear in correct scale and position. It should be noted that while the compensation illustrated in FIG. 16 is useful for scaled visualization of a scene, it is often preferable to process the image at its enhanced resolution.

Figure 17:
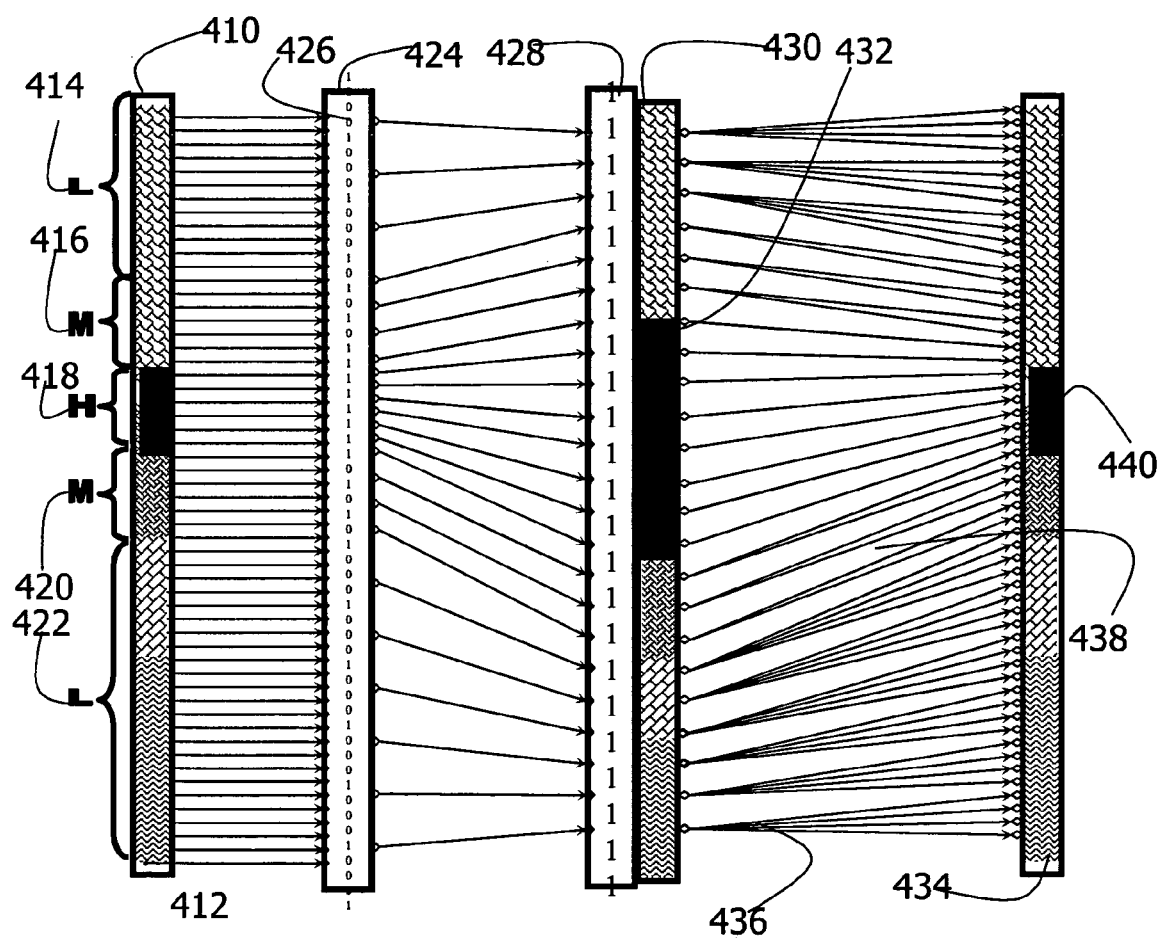
FIG. 17 shows the implementation of a scan line with variable resolution according to an embodiment of the invention.

Attention is now called to FIG. 17, showing an illustrative example of an embodiment of the invention, and thus providing, in more detail the way that variable resolution may handled in such embodiment. A vertical stripe 410 of a scene (not show) is imaged onto the linear array 424. The textures in FIG. 17 represent the graphical content of the stripe 410. In this illustrative example, certain segments 418 of said stripe are intended to be imaged at a low resolution and therefore their pixels are diluted at a rate of 1:4. Other segments 416, 420 are intended to be imaged at a medium resolution and thus diluted at a ratio of 1:2. Finally, one segment 418 of the scene is intended to be imaged in high resolution and not be diluted.

The numbers "0" and "1" on linear array 424 represent a column of a lookup table 426 that corresponds to the stripe 410. The numbers 426 binary value represent whether the pixel corresponding thereto will be delivered for processing in this stripe: "1" means that this pixel will be delivered for processing; while "0" means that this pixel will be disregarded.

The selected pixels, i.e., those that have a "1" associated with them in the column of a lookup table 426, are sampled into an image buffer 428. In one embodiment, image buffer 428 may have a resolution that is much lower than that of the linear array. In one embodiment, the resolution of the image buffer 428 is selected to assure a given maximum throughput, e.g., to prevent the output from exceeding the processing capacity of a conventional imaging system. Once image data is in the buffer 428, it may be processed by an imaging system (not shown); in one embodiment, buffers representing all of the stripes in an image are processed after all of the buffers have image data.

As discussed above, a processed image can be line-wise displayed as in 430, and the scene will be distorted in scale due to the non uniform dilution. The high resolution segment 418 will be represented as the enlarged segment 432 in the display, showing it to be larger than its size as seen by the camera. This distortion is intentional, and in one embodiment, is intended to create uniform object resolution in the scene, instead of the uniform angular resolution which is common to other types of cameras.

In order to obtain a scaled image, the processed image has to be distorted to compensate for the dilution distortion. In one embodiment of this invention, such distortion can be accomplished by projecting each pixel of the processed image 432 onto one, or more than one pixel in the display 434, according to the corresponding column of the lookup table. In one embodiment, the first pixel of the diluted image is displayed as the first pixel of the column in the output display; then, for each "0" found, the previous pixel is repeated onto the output display, but when a "1" is encountered, the corresponding pixel from the column is displayed in the output display, and the process is repeated for the remainder of the column. Reference number 436 shows a selected pixel that is duplicated 4 times to represent 4 pixels, while reference number 438 shows a selected pixel that is duplicated twice onto the output display. By following this algorithm, all the diluted pixels from the original scene are replaced by duplicates of their selected neighbors. In one embodiment, pixels in a display corresponding to a "0" lookup value are filled with a duplicate of the nearest pixel in the display corresponding to a "1" lookup value. In one embodiment, pixels in a display corresponding to a "0" lookup value are filled with a blending function that determines the value of the pixel by considering the value of a plurality of adjacent pixels. Lower resolution output images can be created by further diluting some of the selected pixels.

Figure 18:
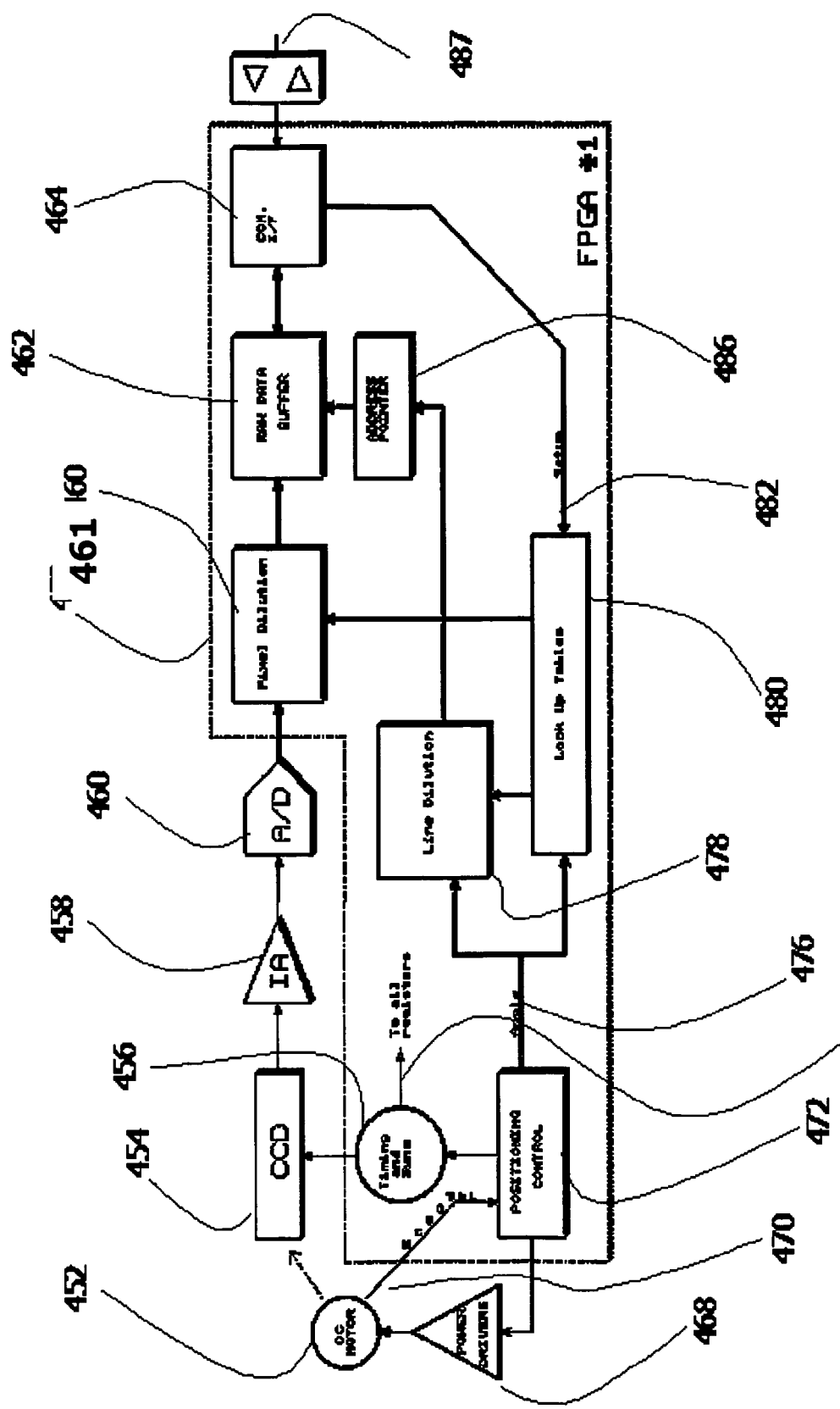
FIG. 18 is a high level block diagram of the electronics in a camera according to an embodiment of the invention.

Turning now to FIG. 18. FIG. 18 is a high level block diagram of the electronics in a scene scanner according to an embodiment of the invention. A Positioning Control Block 472 has registers that continuously monitor the position and angular velocity of a rotating mirror, and calculate a next mirror position. An output of the Positioning Control Block 472 is received by the Power Drivers 468 to move the Motor 452 attached to the mirror. Encoder lines 470 provide the current position sync to The Positioning Control Block 472. The Positioning Control Block 472 also synchronizes the Timing block 456. Timing block 456 generates the timing signals required by the system and provides the signals 474 as needed.

The Positioning Control Block 472 outputs the current angle 476 (interpolated knowing the current encoder position and motor velocity) to the Line Dilution block 478 and the Look-Up Tables 480. The array 454 is activated by the Timing Generator 456 which can provide the timing signals necessary for the specific array 454 device used.

The output of the array 454 is sent to the Input Amplifier Block 458. The resulting conditioned output from the Input Amplifier Block 458 is then transferred to the Analog to Digital Converter 460. Then the digital data representing the full line of the array 454 is received by the Pixel Dilution Block 461. This block 461 gets the line mask data from the Look-Up Tables block 480 and outputs digital data representing the selected pixels to the Data Buffer 462. The Data Buffer 462 stores the data representing the selected pixels in the address specified by an Address Pointer block 486. The Address Pointer block 486 resolves the current address using the angle 476. In one embodiment, the data representing the selected pixels is discarded before it is stored at the address specified by the Address Pointer block 486 if the Line Dilution block 478 indicates that the current line is "0" or inactive. In one embodiment, the Address Pointer block 476 resolves the current address additionally using an output from the Line Dilution block 478, and where the Line Dilution block 478 indicates that the current line is "0" or inactive, the address specified by the Address Pointer block 486 is a discard buffer. The Line Dilution block 478 indicates the state (active/inactive) of a line based upon at least the current angle 476 and the Look-Up Tables 480.

A communication interface 464 allows modification of the Look-Up Table block 480 and provides an interface to read data stored in the Data Buffer 462 through the communication link 487.

In one embodiment, some blocks 456, 461, 462, 464, 472, 478, 480, 486 are implemented as programming in a field-programmable gate array (or FPGA), as illustrated in FIG. 18 as 450.

Figure 19:
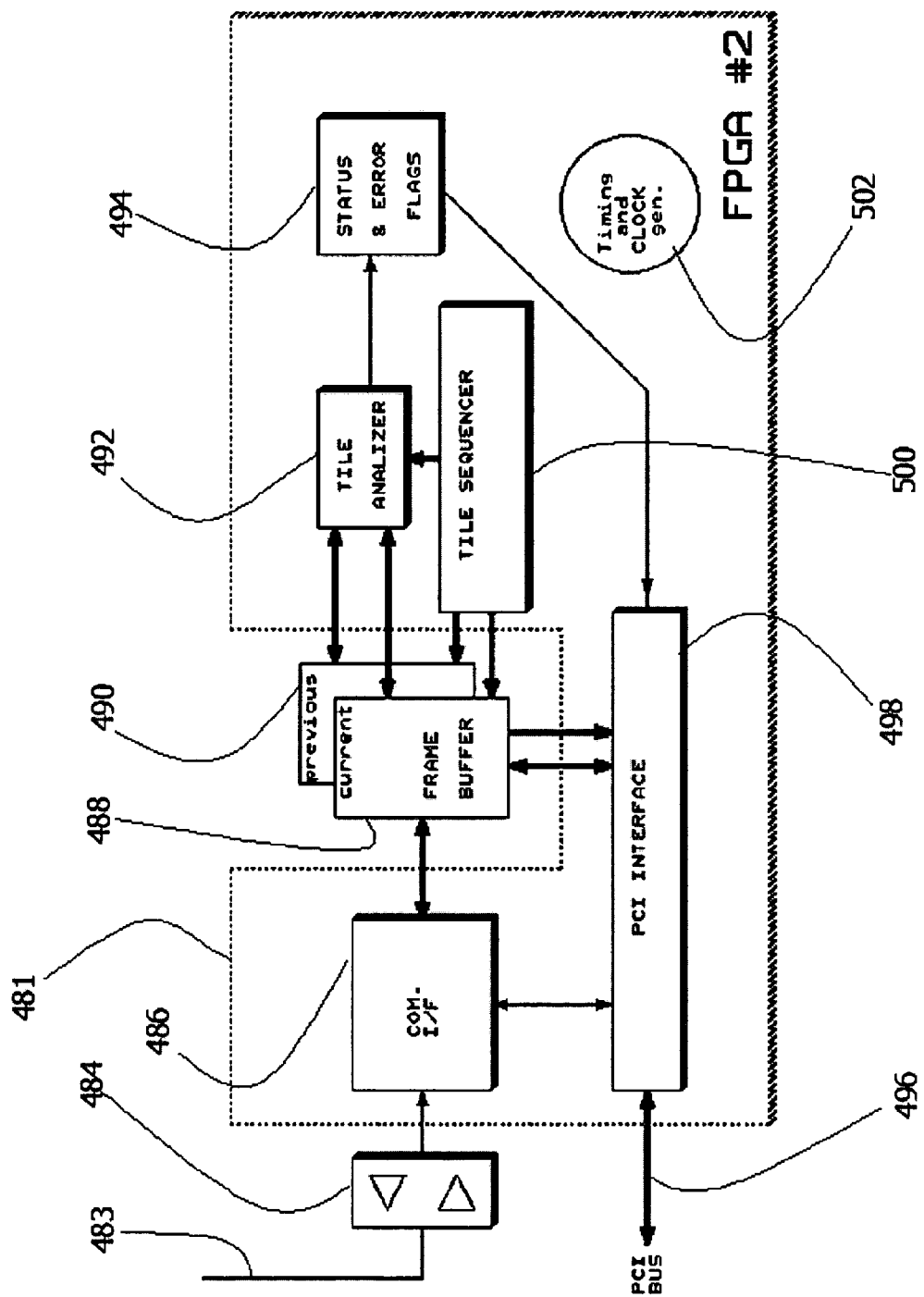
FIG. 19 is a high level block diagram of the electronics in the processing unit according to an embodiment of the invention.

Attention is now called to FIG. 19, showing the functional block diagram of an Image Processing and Buffering system in accordance with one embodiment of the present invention. A bidirectional communication interface 484 is provided to allows for data to be communicated across a communication link 487, thus interconnecting the system shown in FIG. 18 with the system shown in FIG. 19. The Communication block 486 can receive data such as an image from communication interface 484 and the communication block 486 stores the received data in the buffers 488, 490. In one embodiment, the buffers 488, 490 comprise a double or alternating buffer, one for receiving a new image and the other for holding the prior frame until it can be processed or transmitted. A tile sequencer 500 and analyzer 492 compare the tiles in the previous and current images and signal differences on the status flags block 494.

In one embodiment, some blocks 486, 492, 494, 498, 500 and 502 are implemented as programming in a field-programmable gate array (or FPGA), as illustrated in FIG. 19 as 481. In one embodiment, the FPGA 481 can interface directly with a PCI bus 496, and thereby with a PC or other device (not shown) over the PCI interface block 498.

The Timing generator block 502 in of FPGA 481 may generate the timing signals necessary to allow full synchronic operation.

Figure 20:
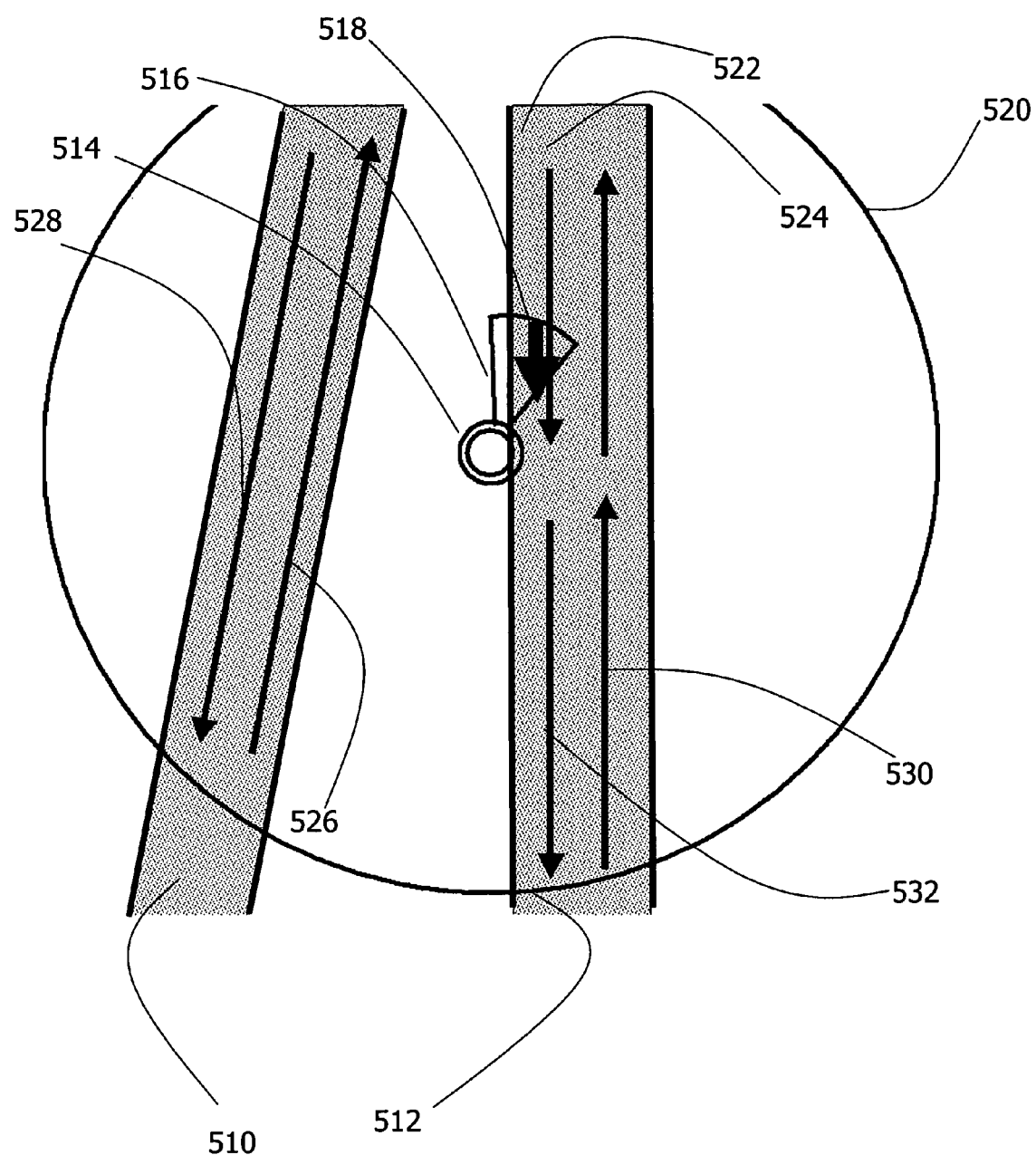
FIG. 20 is a simplified diagram of a traffic control camera.

Attention is now called to FIG. 20, showing a traffic control camera 514 positioned along a road 512 for monitoring the compliance of drivers with the traffic laws. A conventional traffic control camera would have a relatively narrow field of view 516 with a relatively short range, due to the ordinary resolution limitations that have been explained throughout this application. As illustrated, the conventional camera would be able to cover a relatively short segment 518 of the road. This may be suitable, for example, to detect drivers speeding in segment 518.

According to an embodiment of the present invention, however, the traffic control camera 514, can be operated with selective resolution and up to 360 degree coverage. Thus, the covered area 520 may be extended in angle, in range or both, and the camera can cover traffic 530, 532 in a much larger segment of the road, with better performance.

As the range of the camera 514 is larger than that of a conventional camera, if operated over 360 degrees, the camera 514 may also capture the traffic 526, 528 in a near-by road 510, thus increasing the utility of the location of camera 514. Because the camera can control its resolution from one frame to another, and as the position of the license plate and the driver are easily determined within the contour of the approaching car and their location within the next frame can be accurately estimated by interpolation, when coupled with a motion or object detector software or hardware, the camera can document a speeding car, or a car that moves when the stop light at the junction is red, with a sequence of typically four images: two long shots taken few seconds apart from each other, showing that the vehicle is in motion and optionally indicating its speed, a readable resolution picture (i.e., zoom) on the license plate, and a recognizable resolution image (i.e., zoom) on the driver's side of the windshield, providing an image that may be useful in identifying the person who was driving the car at the time of the violation.

In one embodiment, the camera of this invention, when positioned in or near a stop-lighted junction, may be aware of the stop-light signal phase. The camera of the invention may be programmed to detect speed and position of vehicles approaching the junction, and can determine, using well known tables of breaking distances, when a car that is approaching a junction is likely going to enter the junction in red light. Upon detection of such event, the camera of the invention can not only document the traffic violation, but further, it can also be provided with a signal light or siren to signal vehicles approaching the junction from other directions to stop, and thus avoid collision with the violating vehicle. The ability of the camera of the present invention to provide such alert and response in all approaching directions, is a result of its precise determination of position and speed of objects in the field of view.

Figure 21A:
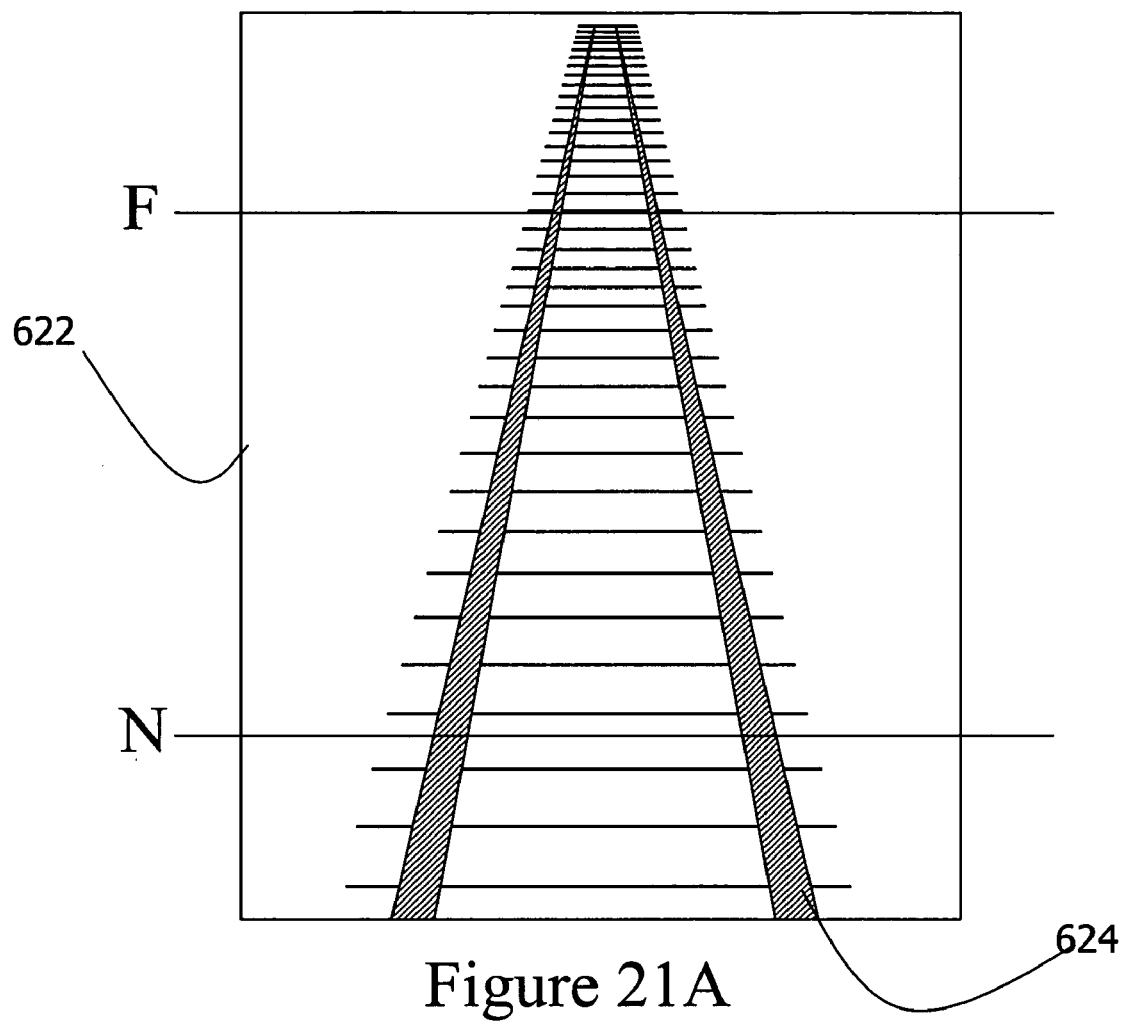
FIGS. 21A, 21B, 21C show a rail track and a rail track monitoring application according to an embodiment of the invention.
Figure 21B:
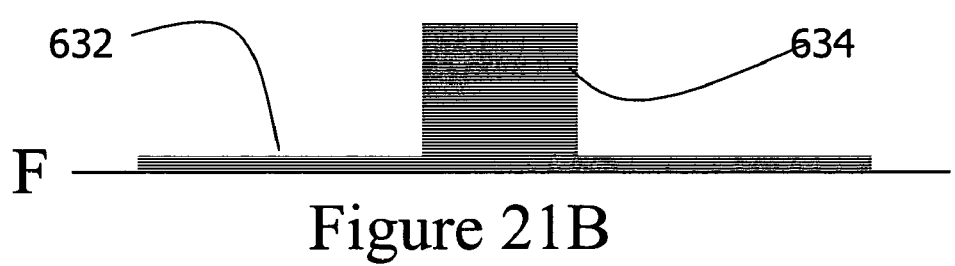
Figure 21C:
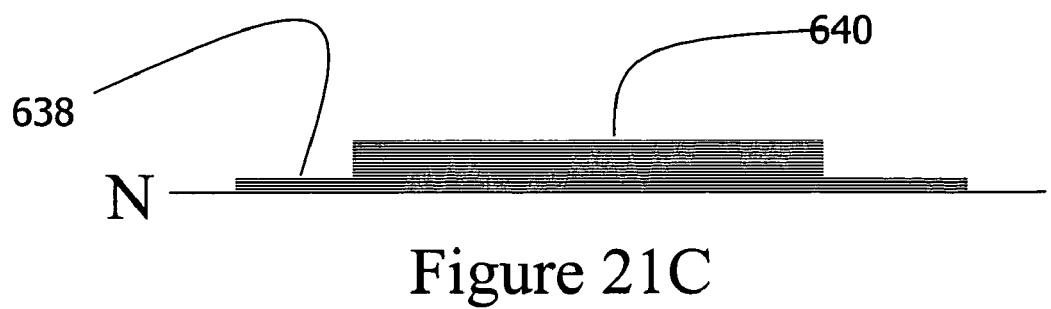

Attention is now called to FIG. 21A-21C. FIG. 21A shows a field of view 622 of a camera (not shown) installed on the front of a locomotive (not shown) to view the rail tracks 624 in front of the train. As can be seen, at a distance down the tracks represented by line N, the rail tracks appear wider in the field of view 622 than at a distance down the tracks represented by line F. FIG. 21B shows an illustrative distribution of resolution across the horizontal line F, showing a relatively low resolution 632 across most of the line, but, by using the ability to adjust the resolution across the horizontal axis, the resolution can be very high across the width of the tracks 634. Similarly, FIG. 21C shows an illustrative distribution of resolution across line N. The resolution is low 638 across some of the line, and is increased across the part of the scene 640 corresponding to the tracks 624. In one embodiment of the present invention, the distribution of resolution is adjusted so that every railway sleeper is assigned a uniform number of pixels, giving a good coverage of the track for a long distance. The significance of long high-resolution coverage is that the train operator may get an early warning that enables him to stop the train if the camera detects an object on the tracks.

Figure 22A:
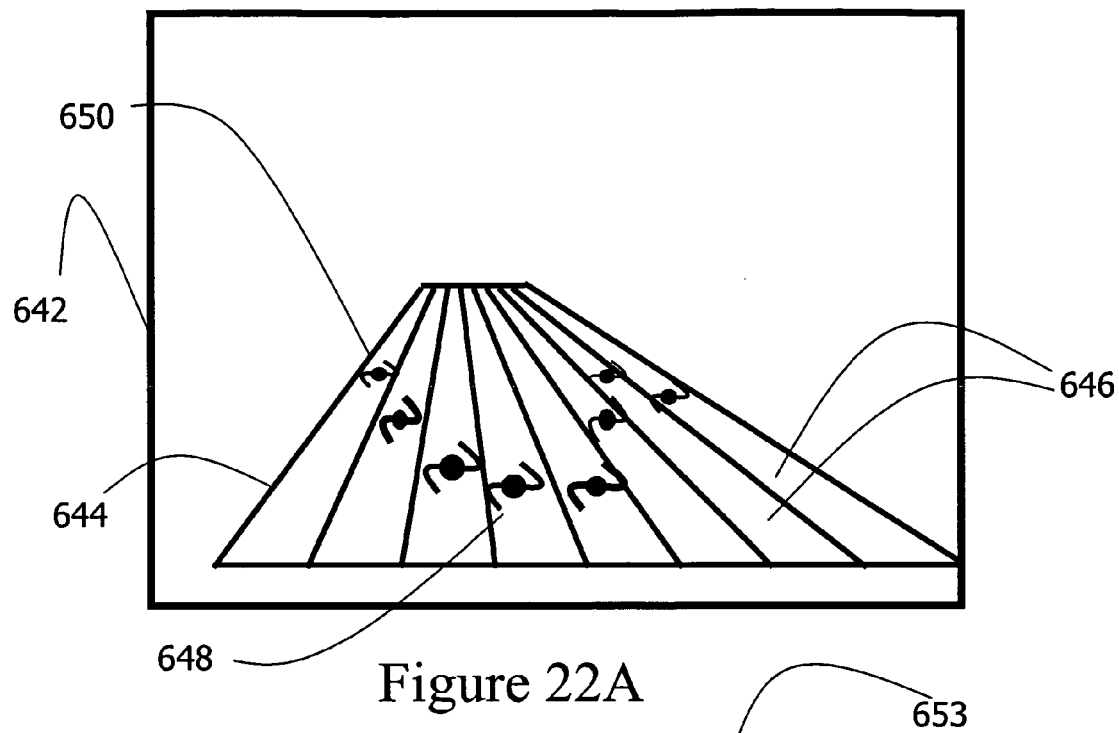
FIGS. 22A and 22B show a swimming pool and a swimming pool monitoring application according to an embodiment of the invention.
Figure 22B:
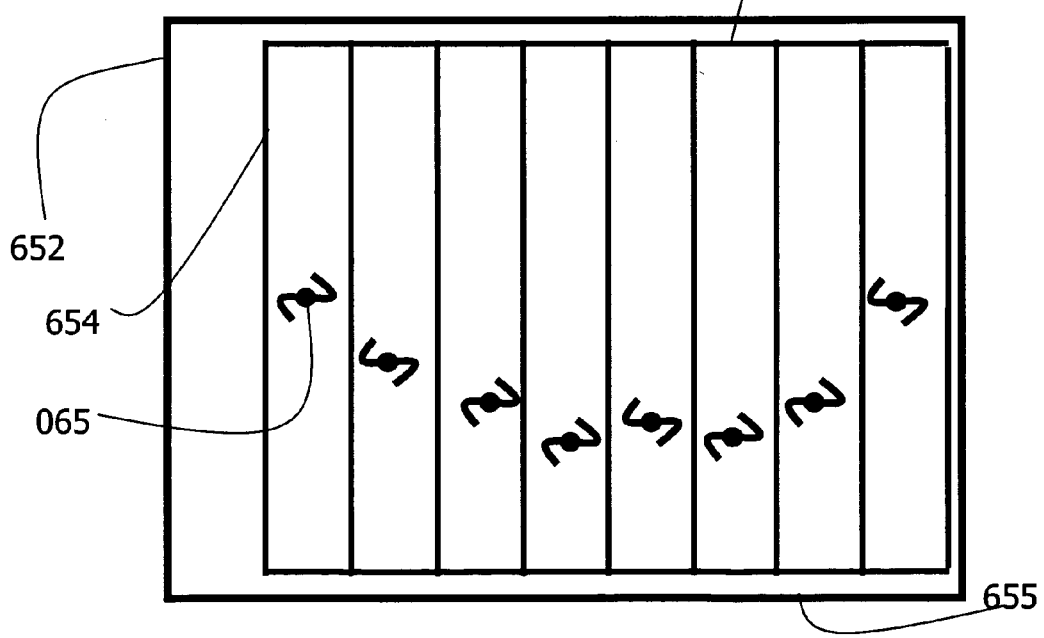

Attention is now called to FIGS. 22A and 22B, showing a perspective view 642 of an Olympic swimming pool 644 with 8 lanes 646. Note that in the perspective view 642 the far end of the pool, and the farthest swimmer 650 are smaller than the near end of the pool and the nearest swimmer 648. Note also that the vertical scale is not linear. Although the perspective view 642 is the way people are used to viewing, for example, a swimming contest, the scene scanner of this invention can provide a much clearer and more informative image of the contest as seen in FIG. 22B. FIG. 22B shows a frame 652 in which the resolution distribution was configured such that the top end of the pool 653 is aligned with and near the top of the frame 652, and the near end of the pool 655 is aligned with and near the bottom edge of the frame 652. The resolution is distributed vertically so that the vertical scale 654 is linear with the distance of the swimmer from the top end of the pool. The visual effect of this imaging is that all the swimmers 656 have the same size, and their relative vertical position on the frame is a relatively precise representation of their relative position in the pool. This application is a typical example of the use of the camera according to one embodiment of the invention, to translate a scene from its natural perspective into an orthophotographic image that is useful for the viewer. The same mechanism will apply to cartographic applications such as an orthophoto in aerial photography.

Figure 23:
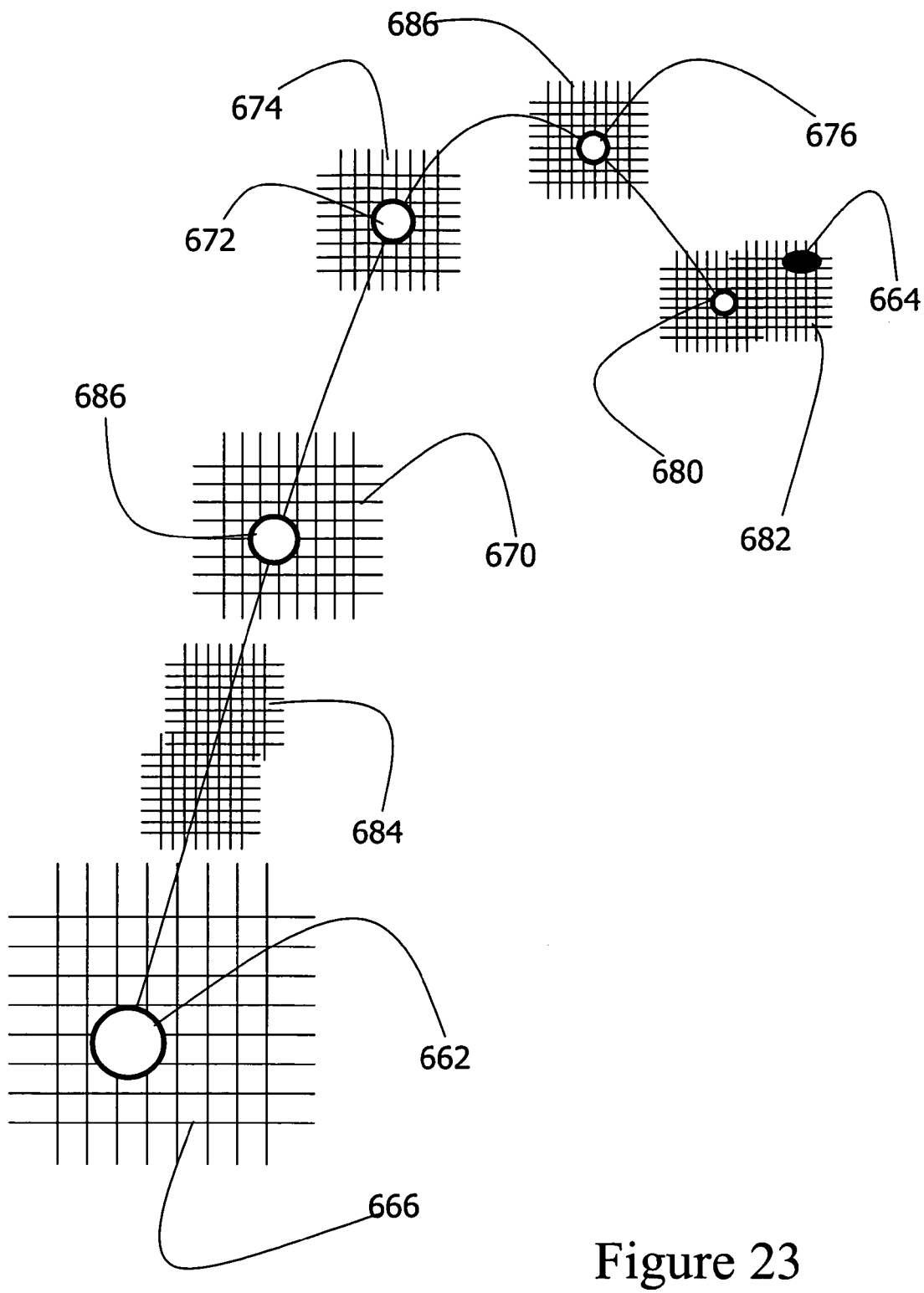
FIG. 23 is a ball tracking application according to an embodiment of the invention.

Attention is now called to FIG. 23. FIG. 23 discloses a general method to use the features of the camera according to one embodiment of this invention for tracking objects that fly in a generally ballistic trajectory. In one embodiment of the invention, the camera can be used to track a ball, such as a golf ball, a base ball, a basketball, a football or any other civil or even military projectiles. For illustrative purposes, a golf course is depicted in FIG. 23. A ball 662 is sent to a ballistic trajectory towards a hole 664 at a far distance. The camera is positioned so it can cover the initial part of the ball trajectory. The sub-field of view where the ball is expected to pass initially is covered with high resolution of pixels 684. In one embodiment, the direction of rotation of a mirror in the scene scanner is oriented such that the scanning beam will cover the direction of the flight of the ball. This ensures that the image of the ball will be extended and it will appear longer than its real size. In one embodiment, the coverage angle is limited to 50 degrees, and a polygon mirror (discussed below) is used to provide a high frame rate. In one embodiment, the processor gets few images of the ball while in the high-resolution area 684, and through object recognition and calculation, the expected trajectory of the ball is determined accounting for the angle and speed of its initial movement. In one embodiment, auxiliary data may be used to calculate the expected trajectory of the ball 662, including, for example, wind speed (provided from a wind indicator) or spin, if it can be determined from the images taken in the high resolution area 684. The camera is further assigned to acquire high-resolution coverage of the parts of the field of view 670, 672, 674, 680, 682, 686 visible to it where the ball is expected to pass or rest. In one embodiment, the information about the expected trajectory of the ball may be calculated and provided to other cameras that are covering the event, such as, for example, a camera that is situated so that it can better observe the ball's landing 680.

In some applications imaging in dark or in low light conditions is desired. Although the scene can be artificially illuminated (as it may be for any camera), in one embodiment of the invention, the area being scanned can be provided with an overlapping illumination line, increasing the illumination efficiency and reducing the required instantaneous output of the light source.

Figure 24:
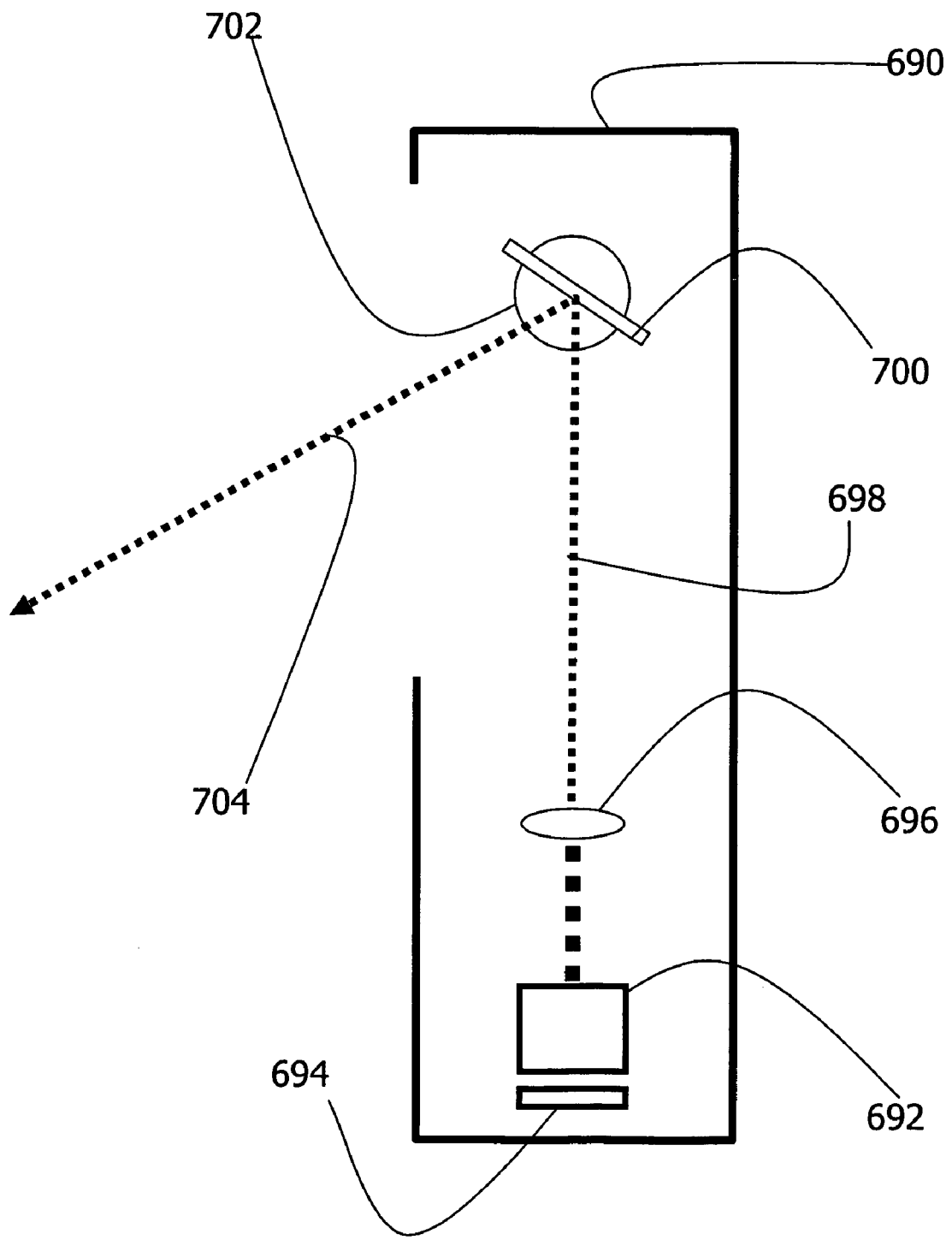
FIG. 24 shows a projector for image playback according to an embodiment of the invention.

FIG. 24 shows a line projector useful in association with the present invention. An enclosure 690 contains a strong light source 692 such as a linear halogen lamp or LED array, or any lamp used in slide projectors. The light is converted into a strong, uniform, vertical beam by a reflector 694 and an optical director 696 that can be a circular lens; a cylindrical lens or a shaped bundle of fiber optics such as Lighline 9135 available from Computer modules Inc., San Diego, Calif. The vertical beam 698 is reflected by a vertically relatable mirror 700 engaged to a motor 702, and is projected out of the enclosure onto the scene 704.

In one embodiment, the enclosure is mounted on top of the camera and the two rotating mirrors are aligned, taking into account the parallax, so that the same vertical line of the scene is illuminated and scanned. In one embodiment, the mirror of one of the two devices are mechanically linked to the mirror of the other device, both being rotated by the same motor, thus ensuring perfect mechanical alignment and optical synchronization (subject to a parallax adjustment) between the light projector and the camera. In one embodiment of the present invention, both mirrors can be unified to one extended mirror, part of which is used for the scanning and part of which is used for the illumination. This latter method is likely to reduce the number of moving parts, reduce the amount of power required for imaging and reduce mechanical adjustments that must be made to a camera after manufacturing or handling. It should be noted that the sweeping light beam described herein and used in combination with embodiments of the present invention has an additional advantage over current illumination methods in which a light sweeps the area to be illuminated. In existing systems, because the light sweeps with a full-frame camera, an intruder may use the sweeping light as an indicator of where the camera is aimed at any given time; the intruder can then attempt to effect the intrusion in between sweeps. Using embodiments of the present invention, the projected beam is traversing the scene at the same speed as the mirror is scanning it, typically at least 4 times per second, which is likely to be too fast for an intrusion to be effected between sweeps. Moreover, where higher speed arrays or additional arrays are employed, the mirror/light sweep speed can be substantially increased.

Figure 25:
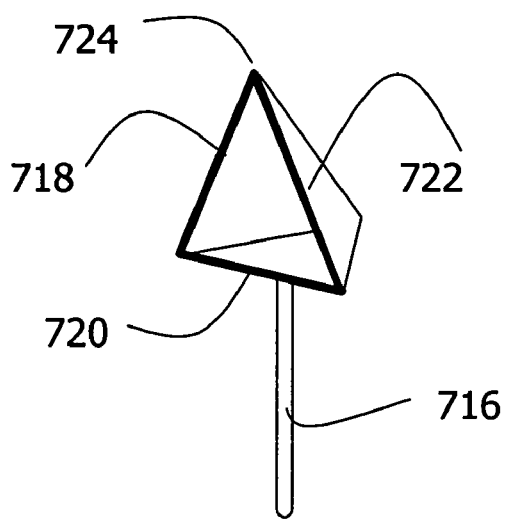
FIG. 25 is a corner reflectors used to calibrate a camera in accord with an embodiment of the invention.

Turning now to FIG. 25. It is useful to be able to position calibration points in the scene and easily identify them in the image. This is helpful both in calibration of the camera and in handling unintentional vibrations. A corner mirror 724 is positioned on a pole 716 anywhere in the scene. The three faces 718, 720, 722 of the corner mirror 724 are reflective in their internal side, and are perpendicular to each other. An aperture formed by the three faces 718, 720, 722 of the corner mirror 724 is generally directed to the camera. The projected light coming from the line projector is reflected by the three mirrors, and is reflected back directly into the camera. For a given illumination intensity and a given distance from a camera, the amount of light reflected by the corner mirror 724 to the camera will dependent substantially only upon the size of the mirror 724 aperture. By using mirror reflectors of various sizes, and positioning them at different key points in the scene, a generally uniform reflection is obtained.

Because the positions of the calibrations mirrors can be known and will not change, they can serve to correct shifts and distortions of the image, using conventional "rubbersheeting" and morphing methods known in the digital image processing art. In one embodiment, the calibration mirrors can also to monitor the proper operation of the projector and the visibility conditions (e.g., fog, haziness) of all or parts of the monitored scene.

In one embodiment, calibration and correction of distortions is done using natural artifacts that are identified in the image and are known to represent stationary objects in the scene, such as highly contrasted objects like a dark tree bark, a white rock on a dark ground, a junction of roads, a top of a pole etc.

Figure 26:
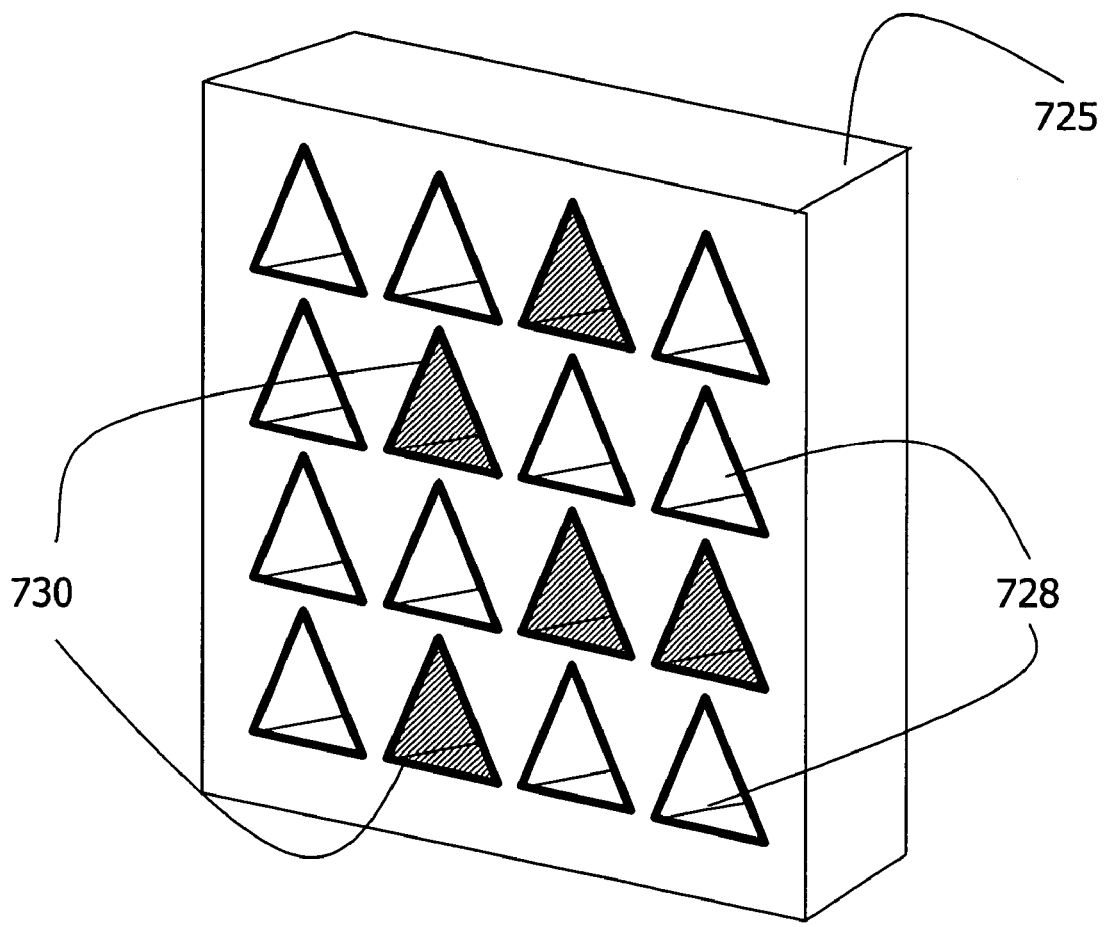
FIG. 26 is an array of corner reflectors used to calibrate a camera in accord with an embodiment of the invention.

Attention is now called to FIG. 26, showing a block 725 with a grid of corner mirrors, some of which 728 are open and active and some of which 730 are blocked and thus not active. When block 725 is generally oriented towards the camera and the line projector is working, the active mirrors will appear in the image as relatively strong flashes of light, while the blocked mirrors 730 will not reflect light. As there are 16 corner reflectors in this block, there are 65,536 possible combinations (i.e., 2 to the $16^{th}$ power) that can be made on the block 725. In one embodiment, certain corner reflectors will always be open, for registration. For example, in one embodiment, the four corner mirrors will always be open and serve as a registration square. The other 12 mirrors can provide over 4,000 unique combinations of reflection by the block 725. One or more of the blocks 725 can be placed throughout an area covered by a camera to be used for calibration of the image of that camera. In one embodiment, a checksum for error detection can be encoded using two of the mirrors. As will be apparent to one of skill in the art, the forgoing embodiments may be combined and still provide over 1,000 individually encoded targets 725 with error correction. It should be noted that the mirrors 718, 720, 722 may be visible to the camera in daylight as well as at dark, due to the light directly reflected onto the camera. It should also be noted that the active size of the corner mirrors can be controlled by partial blocking of the aperture, so that far mirrors get wider aperture than near mirrors.

As described above, including in connection with the description of FIGS. 9A-9B above, one concept of a scene scanner in accordance an embodiment of the present invention is that a linear CCD array receives a line image reflected by a revolving mirror and focused through optics. As shown in FIGS. 9A-9B, the reflective surface of the mirror is positioned on the axis of rotation in order to maintain a fixed optical path between the mirror and the target thought the rotation. This restriction does not apply, however, if the camera is used for scenes that are remote from the camera to the extent that they are optically in infinity. In such applications, the reflective face of the mirror does not have to be located on the axis of rotation, and this offset will not diminish the quality of the image and will not defocus it.

Figure 27A:
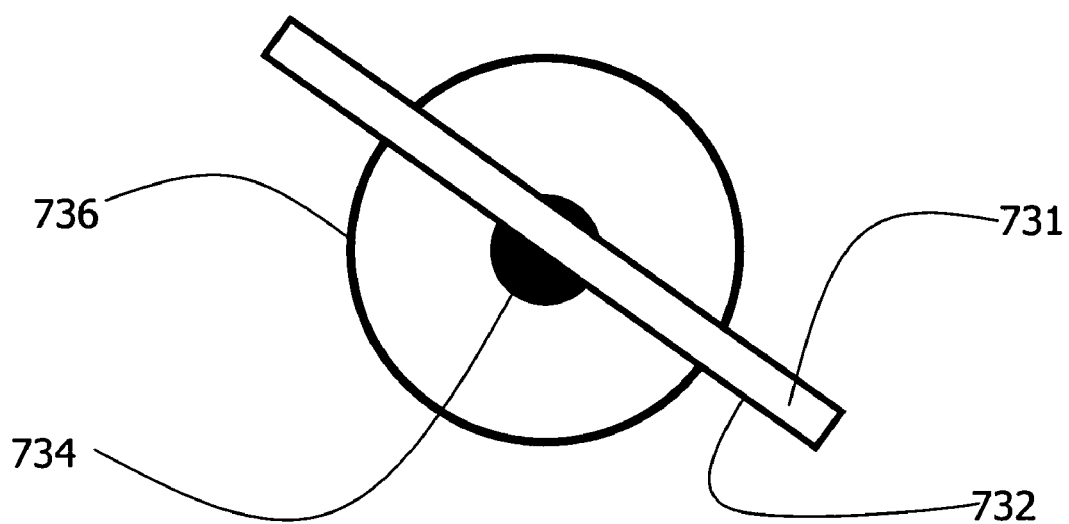
FIGS. 27A, 27B show the position of the revolving mirror in relation to the axis.
Figure 27B:
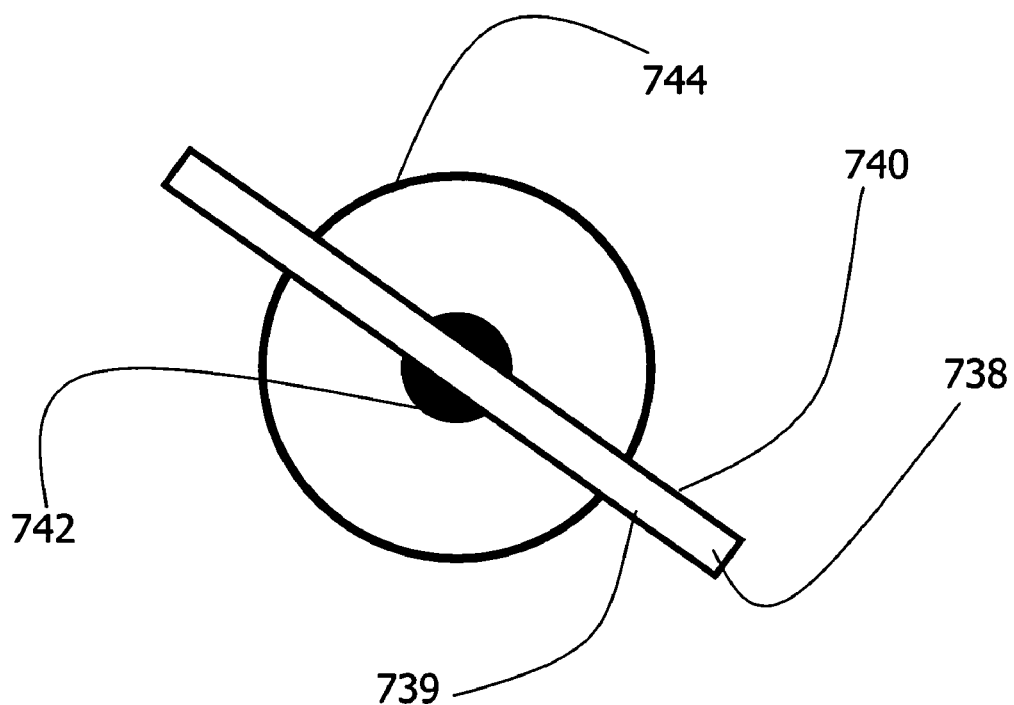

Attention is now called to FIGS. 27A-27B. FIG. 27A shows a reflective surface 732 of a holder 731 is collocated with the center of the axis 734 of rotation of the motor 736. FIG. 27B shows a reflective face 739 of a holder 738 is not centered on the axis of rotation 742. Such an embodiment has major advantages as it enables the rotating reflector to have more than one active face, such as reflective face 740. In one embodiment, both sides of the holder have a reflective face, allowing the scene scanner to cover two sectors of approximately 150 degrees each, or more, depending, at least in part, on the thickness of the holder 738. In another embodiment, more than two faces are used, allowing the camera to trade off angular coverage with the frame rate, and provide video images as will be disclosed in FIG. 30 below.

Figure 28A:
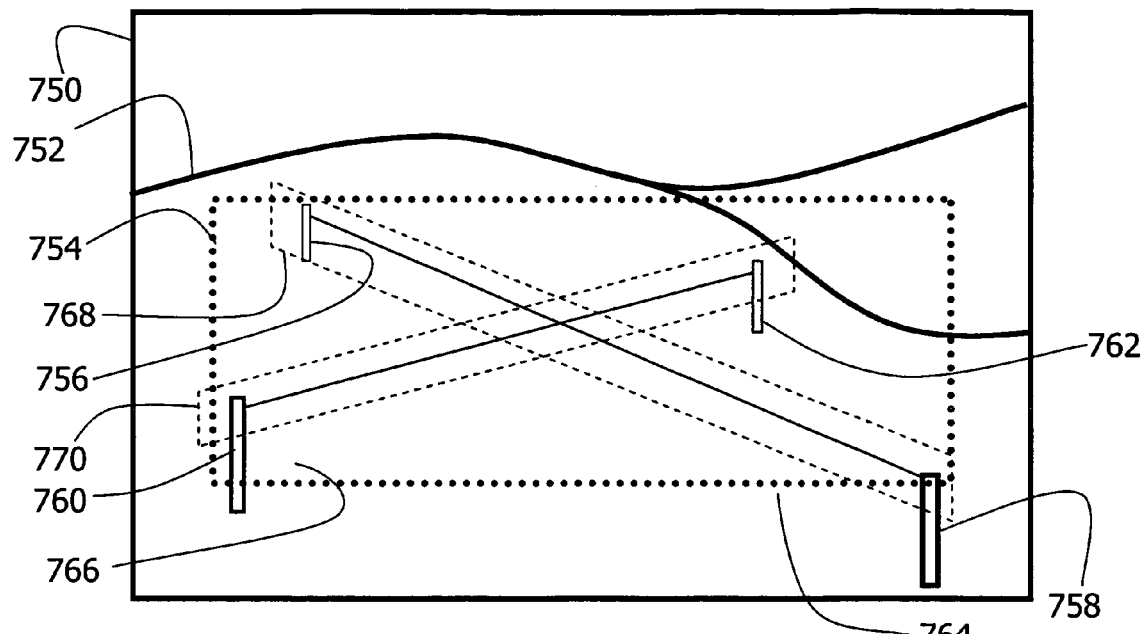
FIGS. 28A, 28B, 28C show the use of straight wires across the scene for calibration in accord with an embodiment of the invention.
Figure 28B:
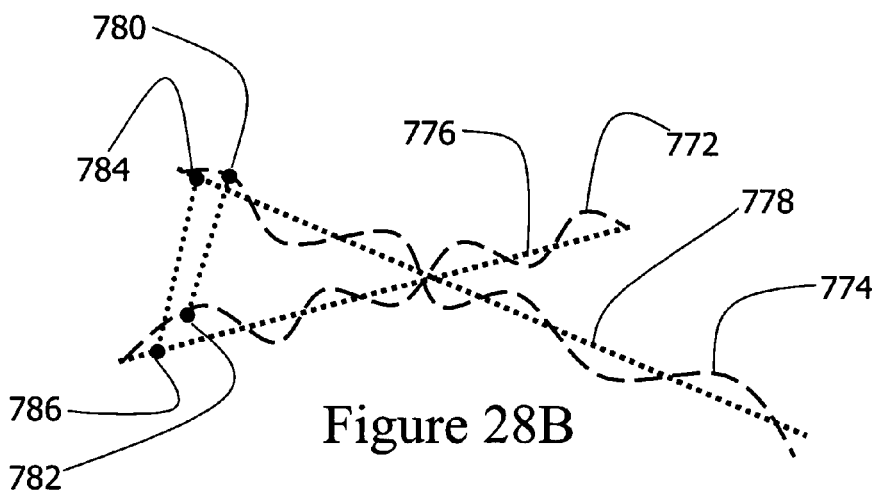
Figure 28C:
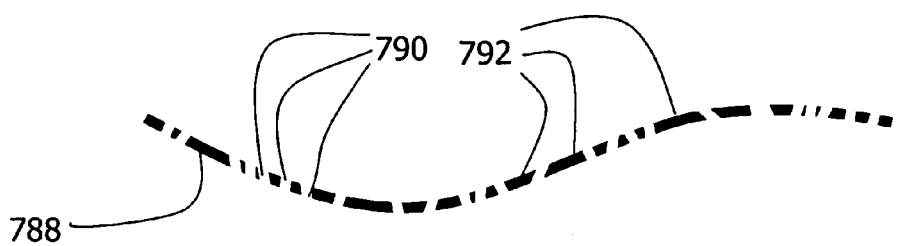

Attention is now called to FIG. 28A-28C. FIG. 28A shows a generally straight item, such as a rope, a wire or a chain, suspended between two poles 756 and 758 across a scene of interest 764 in the field of view 750. Another straight item is suspended between poles 760 and 762 in a different direction. Areas of high resolution 768 and 770 are allocated around the straight items to ensure their recognition in the image. FIG. 28B shows an exaggerated appearance of the two items 772, 774 in the image, due to the vibration of the camera. The position of the items in the image 772, 774 are compared to their known position in the scene 776, 778, and the point-to-point deviation for corresponding points 780, 782, 784, 786 is calculated. These deviations then provide the distortion vectors for aligning the image and canceling the distortion caused by vibration of the camera.

Because the camera according to one embodiment of the present invention scans the field of view line by line, and as the number of lines per vibration cycle is often very large (such as, for example, 1,000 lines per cycle), the expected deviation of the next line can be calculated based on an extrapolation of the deviation of a plurality of recent lines. In one embodiment, such a calculation is used as the basis for an on-the-fly adjustment to the lookup table, the adjustment being made to accommodate the expected deviation and prevent the distortion in advance. Such distortion-look-ahead is unique to a camera that scans the image line-wise sequentially, and is not possible in a two dimensional array that captures the scene simultaneously.

In one embodiment, the optics of the camera are focused to infinity and objects that are 5 meters or more from the camera are optically in infinity; in such a camera, the horizontal calibration items can be relatively short wires suspended approximately 5 meters in front of the camera at different elevations. Where scenes contain natural or artificial generally horizontal items such as a horizon, seafront, tops of buildings, cross roads etc, it will be apparent to a person of skill in the art that the method of distortion-look-ahead is not limited to artificial calibration items, and can use any generally horizontal items in the scene for distortion detection and/or cancellation. FIG. 28C illustrates that the length of the straight calibration item can be marked with color 788, 790, 792, as a one dimensional barcode, to identify points along the line and increase the accuracy of the calibration. In addition to marking with color, the length of the straight calibration item can be marked with reflective surfaces, or adorned with items such as corner mirrors to identify points along the line and increase the accuracy of the calibration.

In one embodiment of the present invention, a camera is used to monitor a sea front, where the field of view is very flat and wide. The selected pixels for each vertical scan line will be at the apparent elevation of the horizon at each angle.

Figure 29A:
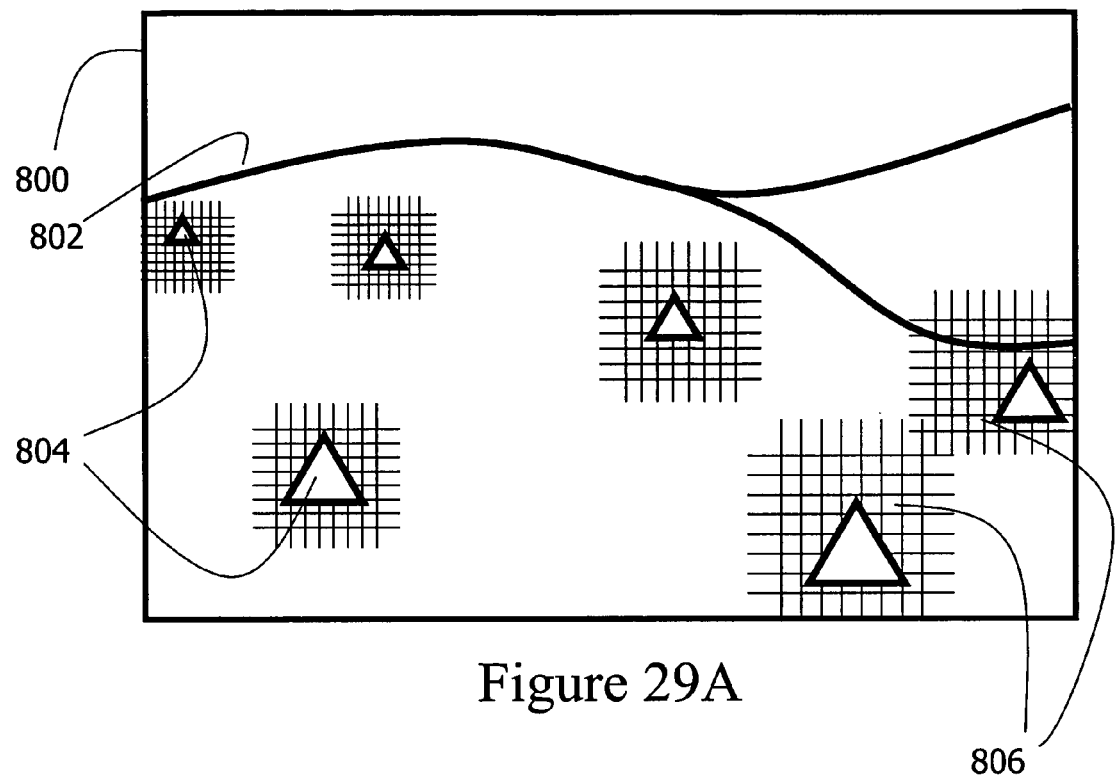
FIGS. 29A, 29B show the use of point targets for calibration of the camera in accord with an embodiment of the invention.
Figure 29B:
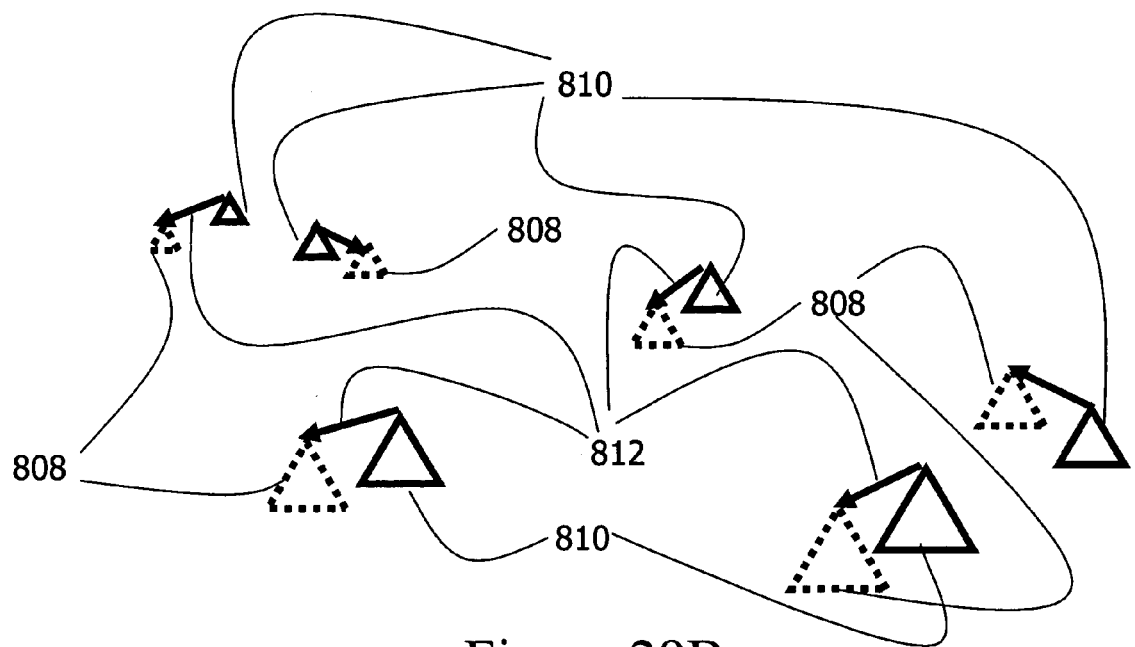

Attention is now called to FIGS. 29A and 29B. FIG. 29A shows a scene containing the corner mirrors described in FIG. 26, used for calibration and vibration compensation of the camera. For the purpose of this illustration, the corner mirror blocks are illuminated by a line projector (not shown) from the direction of the camera, and reflect the illuminating light back into the camera. The reflected light from a mirror block appears in the image as a grid of typically 4×4 pixels, with the registration targets (typically the corner mirrors) always on, and the rest of the mirrors serving as identification of the target. Because the location of the targets can easily be determined once they appear in the image, small areas of higher resolution can be assigned to them, so that their position in the frame can be determined with high precision.

FIG. 29B show a situation where, due to motion of a camera, the apparent position of the targets 810, have deviated from their known positions 808. This deviation can be defined as a vector in the field of view, going from the apparent position of the target to the reference position. In one embodiment, the vector is averaged over a plurality of periods. In one embodiment, the vector is averaged over periods where there are no known external influences such as wind or motion. These vectors can be applied to register the image by standard processes of rubbersheeting or morphing.

In one embodiment, visual targets that are illuminated by ambient light can be used as targets. Such targets can be made in the shape of a checkerboard, such as one with 4×4 squares, and can be used in the same manner and serve the same purpose as the corner mirrors. The use of a checkerboard to reflect ambient light is well suited to well lit scenes, such as scenes captured in daylight.

For various applications it may be desirable to have a camera for use in connection with an embodiment of the present invention capable of providing higher frame rates, such as a video frame rate of 24 frames per second or more.

Figure 30:
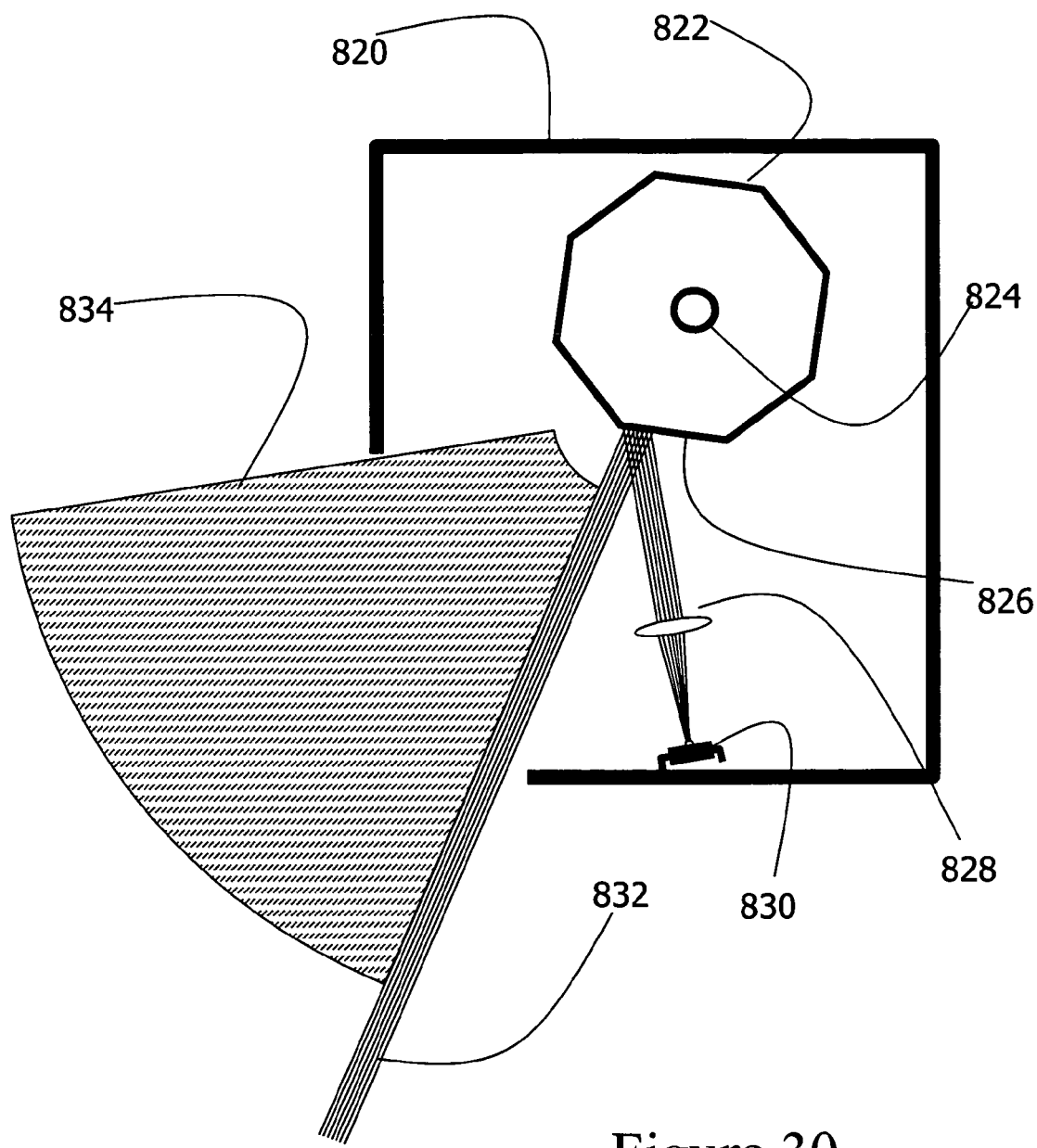
FIG. 30 shows a sector application of the camera using a polygon in accord with an embodiment of the invention.

Attention is now called to FIG. 30. FIG. 30 illustrates a scene scanner 820 with a polygonal mirror 822. In one embodiment an octagonal mirror is used, however, it will be apparent to a person of skill in the art that the polygonal mirror can contain any number of faces. Each of the faces of the polygon acts as a single mirror, and reflects the vertical line image entering the camera into a vertical line image that is projected by the lens 828 onto the linear CCD array 830. When the active face of mirror 826 rotates beyond the end of its sector 834, the next face replaces it and another scan of the scene is performed. Using a polygon mirror, one revolution of the mirror system creates multiple scans of a narrower sector of the scene. In one embodiment, an octagonal polygon mirror 822 covers a sector of approximately 60 degrees, providing a eight images of the scene per revolution of the octagon. As the processing bandwidth of a system according to one embodiment of the invention may allows 4 revolutions per second, an octagonal polygon can provide 32 frames per second, which is more than necessary for a live video. It should also be noted that additional linear arrays (not shown) can be added to cover different fields of view using the same polygonal mirror 822. In one embodiment, a different field of view is substantially adjacent to the field of view captured by array 830, resulting in two contiguous, nearly contiguous or slightly overlapping images of a larger field of view.

Figure 31:
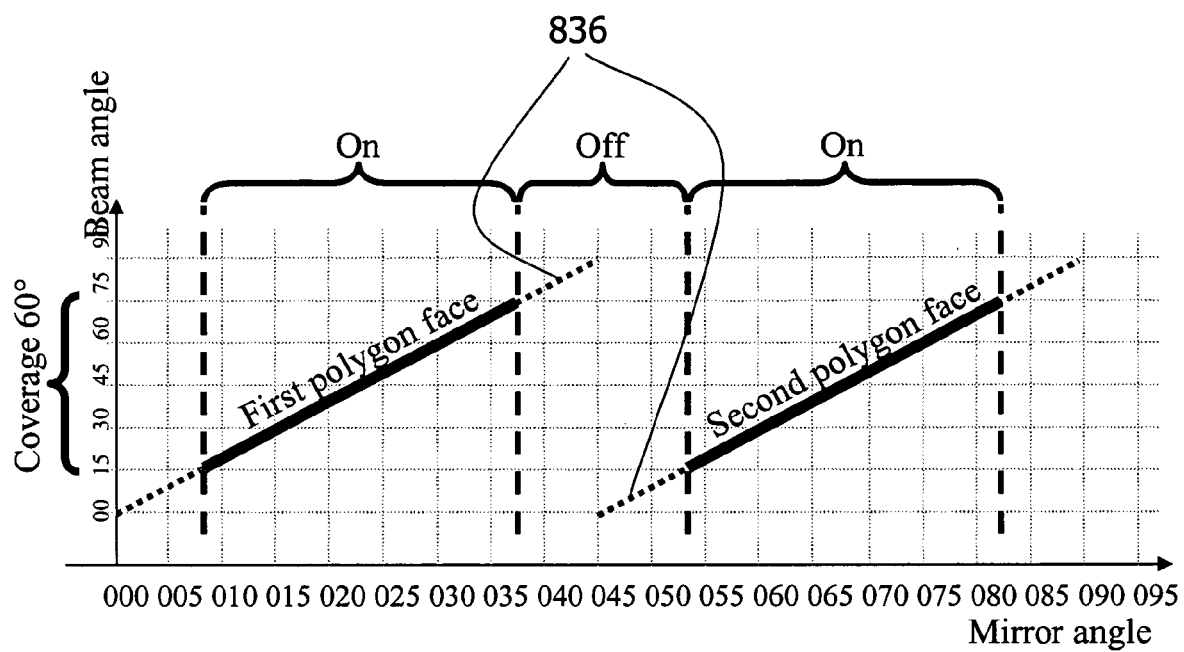
FIG. 31 is a graph showing the relationship between the angle of the mirror and the angle of view of the camera in sector implementation in accord with an embodiment of the invention.

Attention is now called to FIG. 31. FIG. 31 shows a graph showing an example of the coverage of the camera using an octagonal mirror according to one embodiment of the invention. The horizontal axis designates the angular position of the polygon in degrees. The vertical axis designates the direction of the reflected beam coming into the camera in degrees. Note that the reflected beam changes its direction by double the amount of rotation of the mirror face. The lines 836 show the relationship between the angle of the mirror and the angle of the incoming beam. Because many mirrors cannot be used to their extreme edge, in one embodiment, the margins of the lines 836 are ignored. The markings "on" and "off" designate the used and unused parts of the cycle in one embodiment of the invention. In one embodiment, only about ⅔ of the cycle of an octagonal mirror is used, providing an effective coverage sector of approximately 60 degrees. Accordingly, a camera according to one embodiment of the present invention, using an octagonal mirror, renders a 60 degree sector at 32 frames per second, with the approximately the same processing bandwidth as described in the previous application for a 150 degrees coverage at 4 frames per second.

Figure 32:
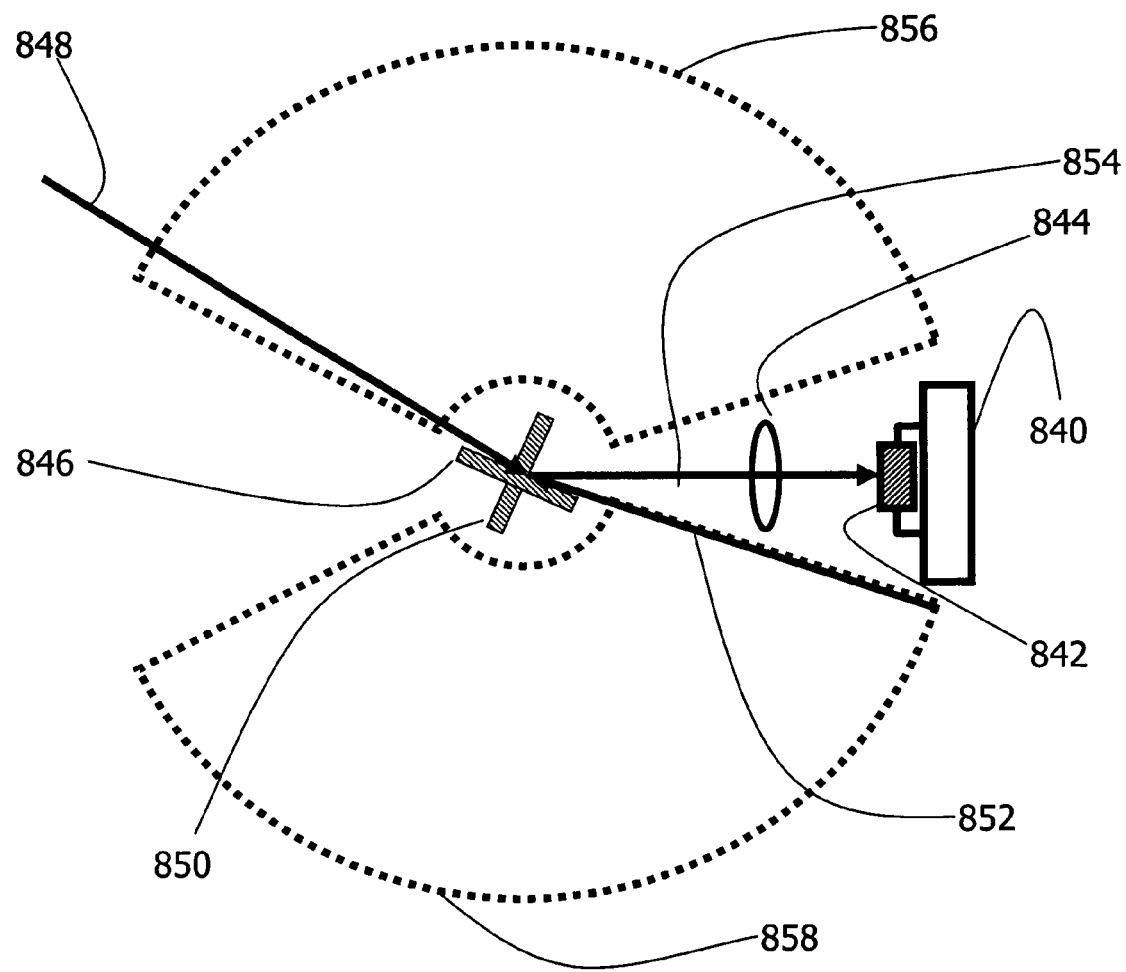
FIG. 32 shows the use of a double-sided mirror for increased angular coverage in accord with an embodiment of the invention.

Attention is now called to FIG. 32. According to one embodiment of the present invention, an apparatus is shown to illustrate a manner of obtaining 360-degree coverage. An array 842 is provided on a base 840. Lens 844 focuses a beam of light on the array 842. A dual faced mirror is shown in two rotational positions 846 and 850. In position 846, the beam 848 is reflected, and while this face of the mirror is active, sector 856 is covered. In position 850, the beam 852 is reflected, and while this face of the mirror is active, sector 858 is covered. As can be seen, the total coverage of both sectors is well above 180 degrees, leaving only two narrow sectors, one across from, and one adjacent to and behind of the array 824. Because the coverage is over 180 degrees, a second camera, operating at a rotational offset from the first, can capture the remaining portions of the image. In one embodiment, a single camera is provided with two arrays rotationally offset from one another at about 90 degrees and longitudinally offset from one another by about the physical size of the array, a single dual-faced mirror is selected to be of a size sufficient to reflect light onto both arrays is rotated by a single motor. It is noted that if two identical cameras are mounted on top of each other, sharing one motor and one rotation axis, and rotated in 90 degrees from one another, the areas uncovered by each of the two cameras will fall in the center of the active sectors of the other camera, so that all 360 degrees will be covered.

Figure 33:
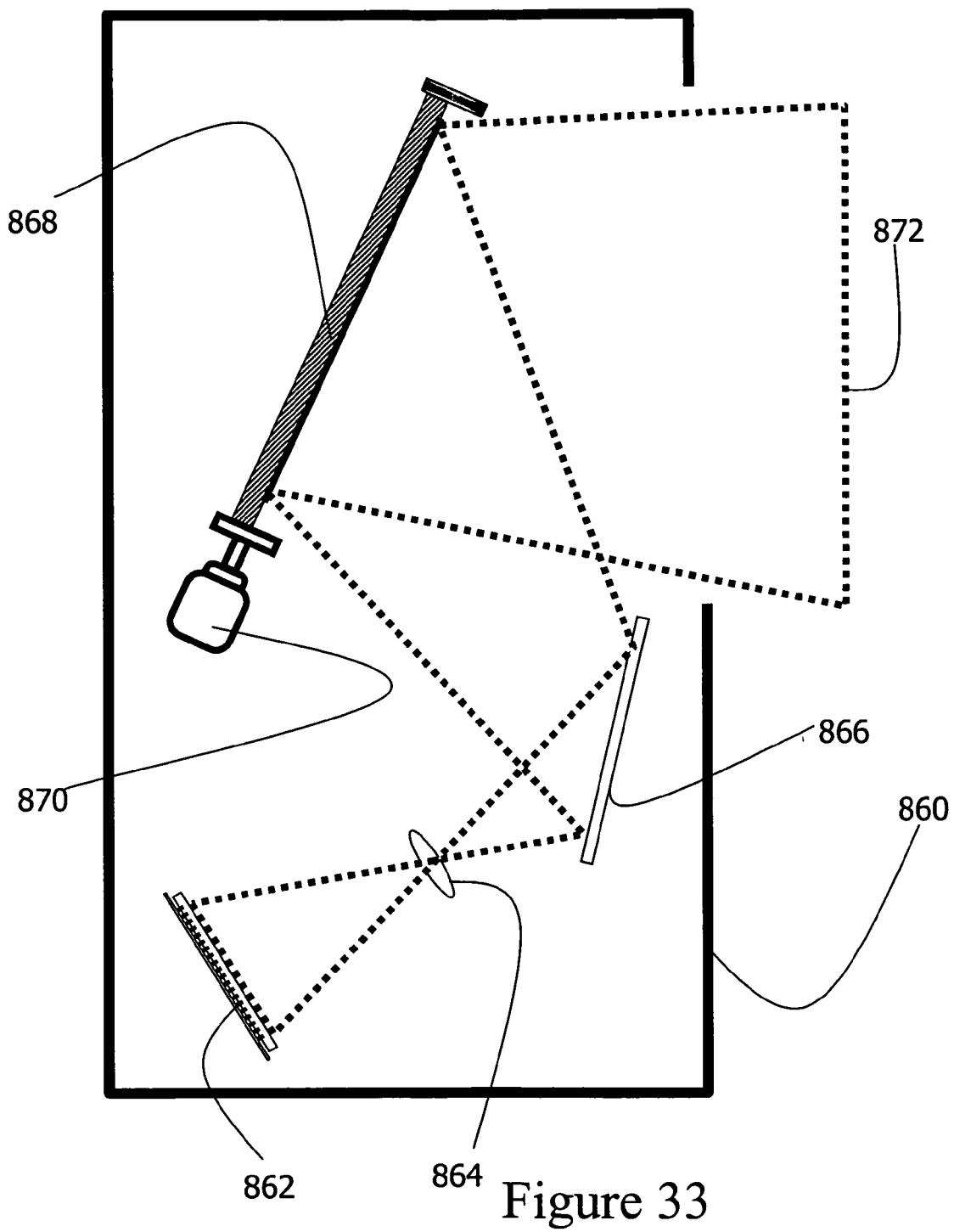
FIG. 33 shows an optical arrangement that allows the camera to look at angles broader than 180 degrees in accord with an embodiment of the invention.

Attention is now called to FIG. 33. According to one embodiment of the present invention, an apparatus is shown to illustrate a manner of obtaining frontal coverage in a scene scanner. Enclosure 860 contains a linear CCD array 862 that receives an image 872 reflected by a revolving mirror 868 and then by a fixed mirror 866 and focused by a lens 864. The whole optical assembly is slanted so that the coverage beam is generally horizontal. The fixed mirror 866 can be replaced with a prism that serves the same purpose. This optical configuration can be used in combination with a single face, dual faced or polygon mirror is used.

Figure 34A:
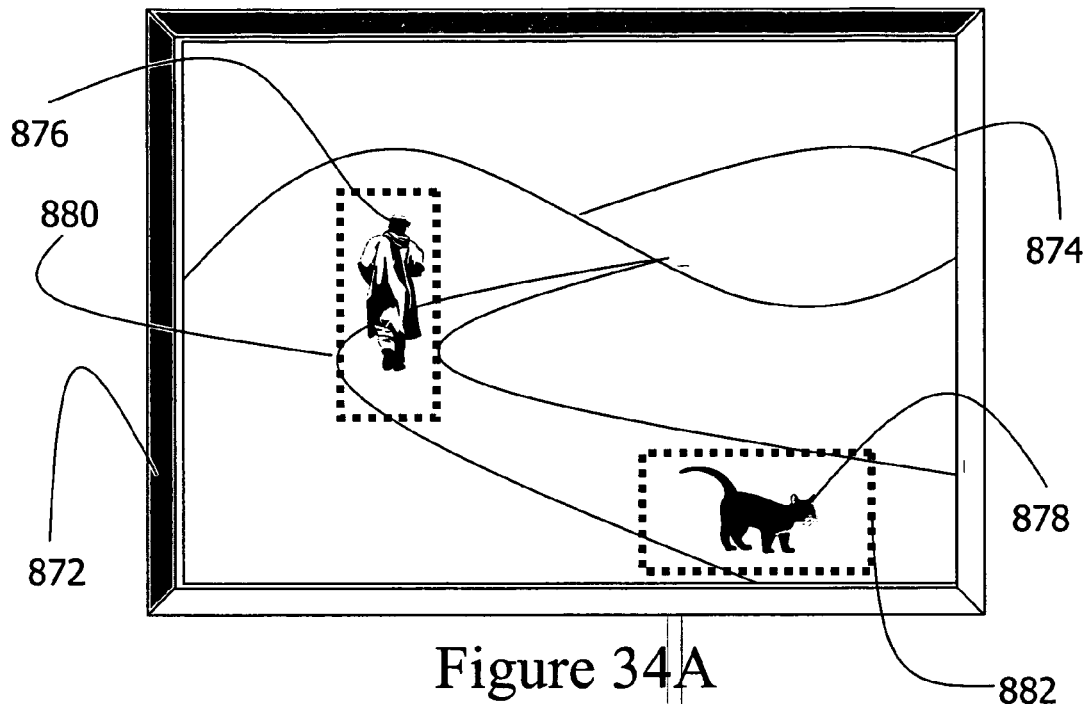
FIGS. 34A and 34B show the camera for zooming on multiple targets in accord with an embodiment of the invention.
Figure 34B:
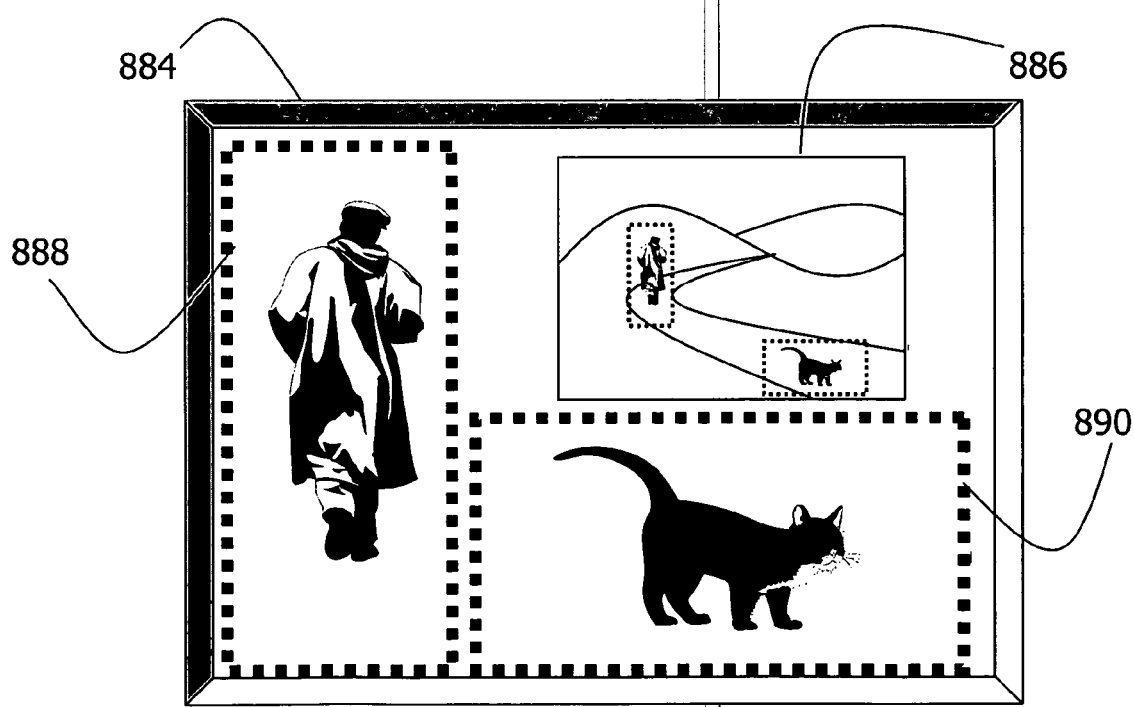

Turning now to FIGS. 34A-34B showing the ability of a system in accordance with one embodiment of the present invention to scan a scene in panoramic view while tracking at least one object in detail in high resolution (zoom). It will be apparent to a person of skill in the art that any number of totally independent high-resolution areas, each of which may have its own shape, size and resolution, can be applied, alternating between frames, each of which contains a different distribution of pixels. An example is illustrated in FIGS. 34A-34B. FIG. 34A shows a screen 872 with a scene 874, containing two items of interest, namely, a person area 876, and a cat area 878. An operator (not shown) can mark one area of interest 880 around the person and another area of interest 882 around the cat. In accordance with one embodiment, and in the case of this example, the scene scanner alternately scans: the frame 274; the person area 876; and the cat area 878. The images resulting from the three scans are used to produce the image shown in FIG. 34B. The frame 274 will continue to be scanned at a uniform resolution and will be displayed as a part 886 of the screen 884, the person area 876 will be scanned at a system or operator assigned resolution, and will be displayed as part 888 of the screen 884, and the cat area 878 will be scanned at a system or operator assigned resolution, and will be displayed as part 890 of the screen 884. This uniquely enables the operator to keep an eye on the general scene 886, while closely monitoring the two areas of interest 888, 890 in zoom. It will be noted that this capability can be achieved with a single camera, rather than the three separate cameras that would be required to achieve the same effect using conventional cameras. In accordance with one embodiment of the present invention, a scene scanner with an octagonal mirror is employed to provide the images, wherein the optical camera can scan at a rate of 32 frames per second—the system or operator could assign a duty cycle to the areas of interest, such as using two frames per second for one part 886, while using fifteen frames per second for the other parts 888, 890. In the illustrated example, such a method would provide much smoother (and thus clearer) motion images of the parts 888, 890 containing items of interest. In one embodiment of the invention, tracking of the moving items of interest (as is well known in the art) can be applied to keep the zoomed areas revealing the items of interest. In this manner the system may continue track the items of interest while the operator is focused on other parts of the screen. In one embodiment, the block for tracking the moving items of interest would interface with the lookup table blocks allocated to those items to track the items.

Figure 35:
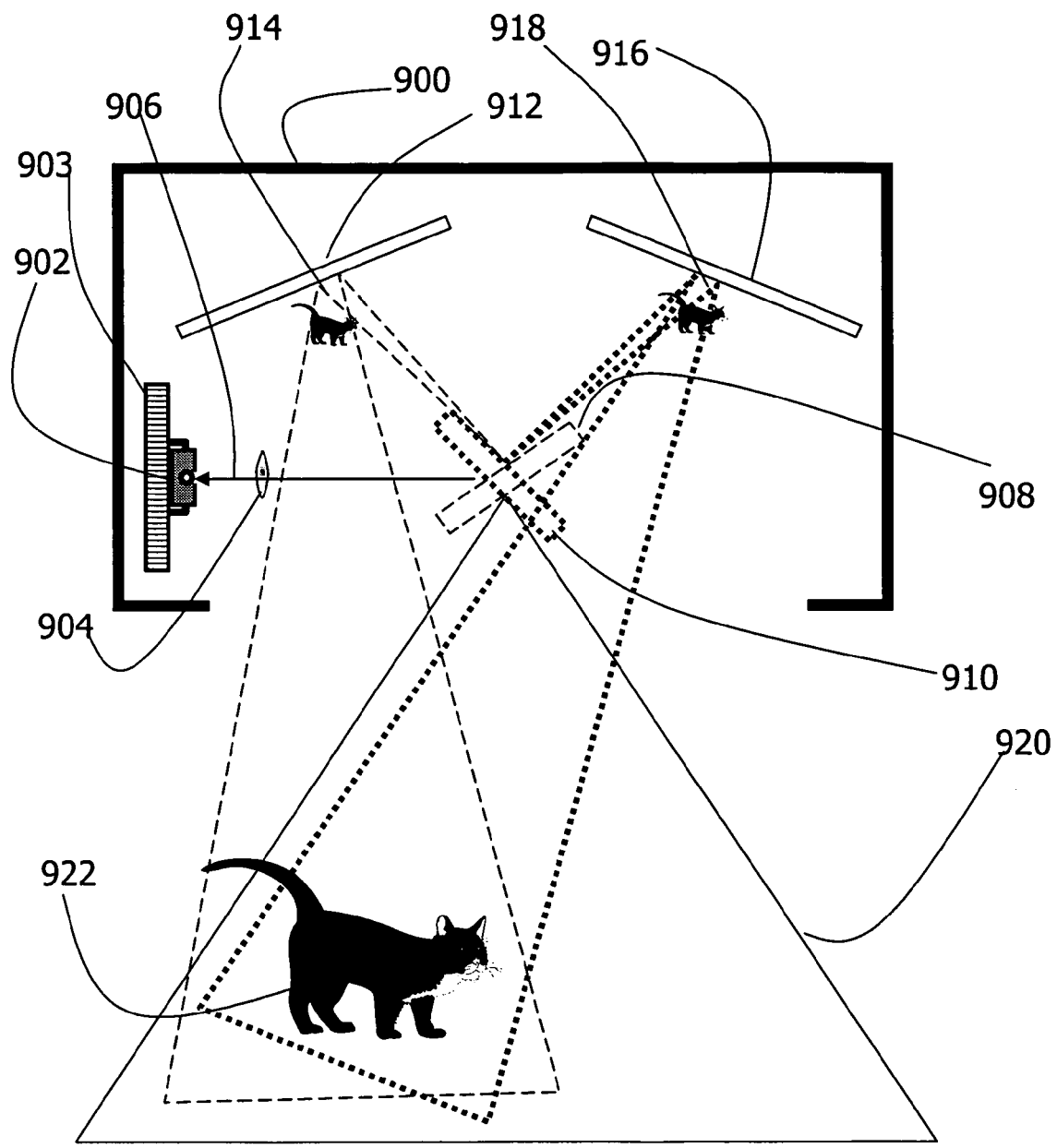
FIG. 35 shows a stereoscopic implementation of the camera in accord with an embodiment of the invention.

Attention is now called to FIG. 35, showing a configuration of the camera in accordance with one embodiment of the present invention. This configuration can provide stereoscopic images of an item in the field of view without any additional moving parts beyond the single revolving mirror. In this description, "bottom" and "top" designate the position on the illustrative drawing, which may or may not correspond to an actual position of the camera or subject. The camera enclosure 900 contains a linear CCD array 902 and its base 903, a lens 904 to focus images reflected by a double sided revolving mirror (shown in two of its positions) 908, 910. As the mirror rotates, the bottom face of the mirror reflects a sequence of vertical image lines from the scene onto the CCD array. The angle of coverage 920 is broad, and can be as much as 150 degrees. The top face of the mirror, however, reflects a vertical image line coming from the top of the camera, where two generally planar, fixed, slanted mirrors 912, 916 reflect the scene onto the revolving mirror.

Because the two fixed mirrors 912, 916 are separated at a finite distance from each other, the two images that they reflect onto the revolving mirror are not identical, and represent a stereoscopic pair of images of the scene.

When an interesting object 922 in the field of view is detected and the operator or the system wants to obtain a stereoscopic image of it, the system uses its azimuth and elevation as derived from the down looking image, and calculates the correct azimuth and elevation in which the object will be reflected by each of the two fixed mirrors 912, 916. The system then creates a look-up table to have two generally trapezoidal areas of high resolution that cover the image areas 914, 918, of each of the two fixed mirrors 914, 916, where the item of interest are expected to appear. The camera will thereafter acquire the stereoscopic pair of images when the up facing side of the revolving mirror is active, and the system can morph the two trapezoid images into a conventional rectangular stereoscopic image.

Figure 36A:
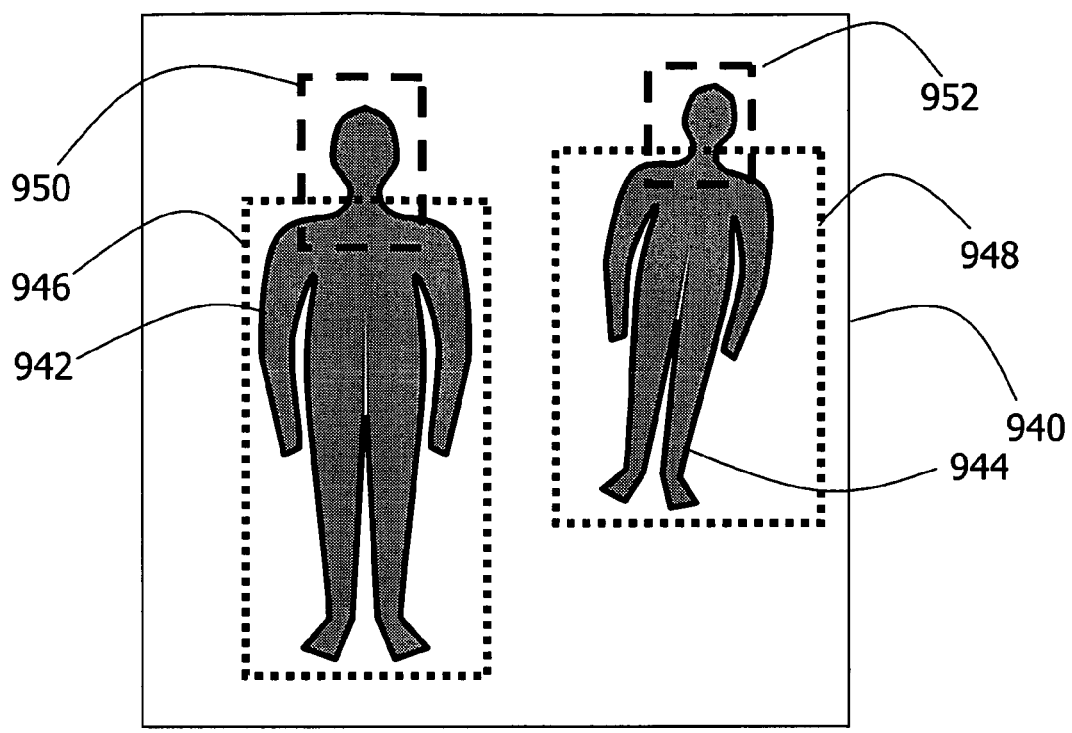
FIGS. 36A and 36B show a camera for enhancing resolution of the face within facial recognition systems in accord with an embodiment of the invention.
Figure 36B:
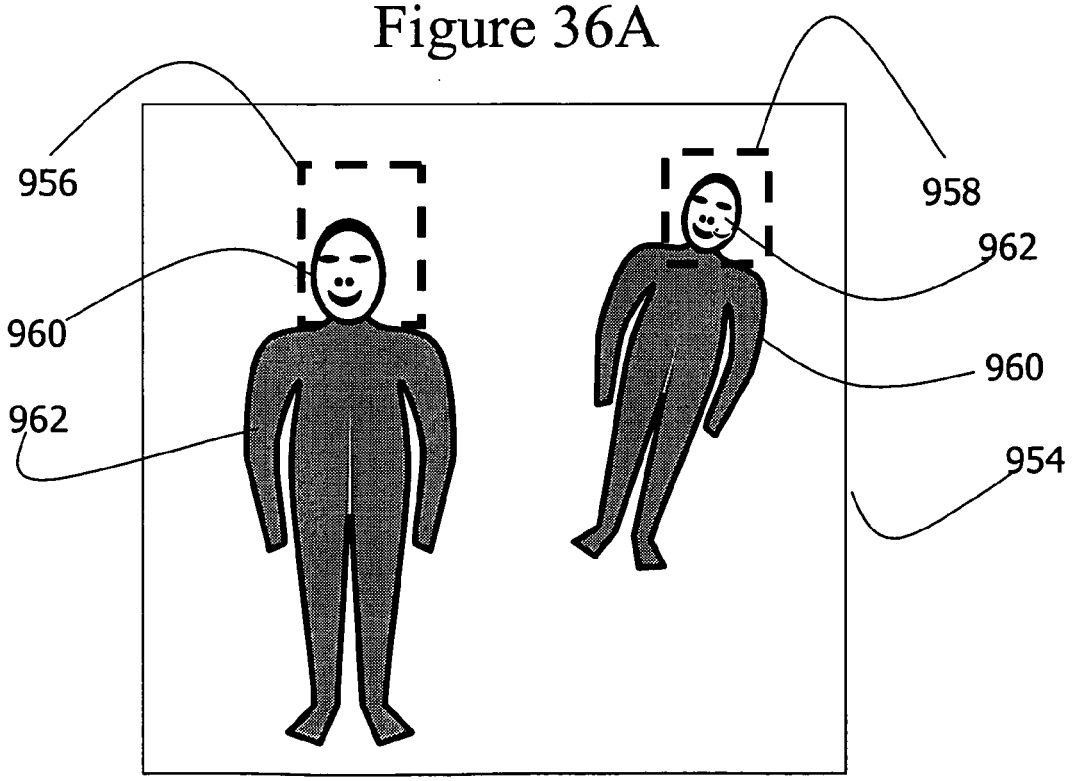

Attention is now called to FIGS. 36A and 36B, showing the application of a camera in accordance with one embodiment this invention to recognition of a relatively small moving item whose location in the field of view in a given frame can be predicted based on an appearance of another, relatively large moving item in the preceding frames, and in particular, by way of example, the recognition of the face of a moving person. Recognition by pattern recognition software typically requires a high resolution, as a distinction has to be made between objects that are relatively similar to each other. It may not be practical to apply a high resolution to the whole image, and it is also not possible to assign a spot of high resolution to a specific area within the image, as the area of the face in the image moves. The programmable resolution of the camera of one embodiment of the present invention enables to prepare a spot of high resolution in the locality of the frame where the face is expected to appear, and to do so before the image is captured. Image 940 shows two persons 942, 944, moving in the field of view in a resolution of the image that is unlikely to be sufficient to recognize the faces of the persons, even if their faces are known to the system. At the selected resolution, however, their general body contours (torso, legs, arms) can be detected. When the body of the person 942, 944, is detected in the image, the software calculates bounding rectangles 946, 948 that loosely surround the body. The system then estimates the normal location of the head of the person, typically as smaller bounding rectangles 950 and 952, in relationship to the body rectangle, and calculates the coordinates of these expected head rectangles.

In one embodiment, the system assumes that the faces will be located in the next frame within the same area as the head rectangles of the current frame (this assumes that the motion of a person between two consecutive frames is very small). In one embodiment, the system uses estimates of the head locations from two consecutive frames to predict the location of the head-bounding rectangles in the next frames. In either case, the system can then program the higher local resolutions in the areas 956 and 958 for the next frame. When the next frame is taken, areas 956 and 958 will have much higher resolution than average, and the faces of the persons 960 and 962 will be acquired in high resolution and be much easier to recognize—both for a human operator and for a software. Iteratively, the body 960 and 962 of the persons is taken as the basis of prediction of the location of the faces in the next or subsequent frames. In one embodiment, one frame is thereafter allocated for enhancement of each located face, while one frame is allocated for continued identification of bodies and estimates on face locations. In this manner, the system can adaptively locate people and capture the faces in sufficient detail for face recognition algorithms to operate.

It is understood that these methods of using the camera, for the same processing bandwidth, creates much better data for face recognition. It should be noted that generally, security camera recordings are used for investigative, rather then alert purposes, as the persons recorded by the camera can only become suspected following a crime or a violation, and not by being recorded by the camera ahead of the event. Typically, investigators try to identify faces and other details in the video recordings, and frequently find the images blurred due to poor resolution. The ability of the camera of this invention to automatically detect face areas (even without recognition of the face) and store a high-resolution still image of the face within the recorded video stream, is advantageous because it enables investigators to view a clear image of the suspect.

Figure 37:
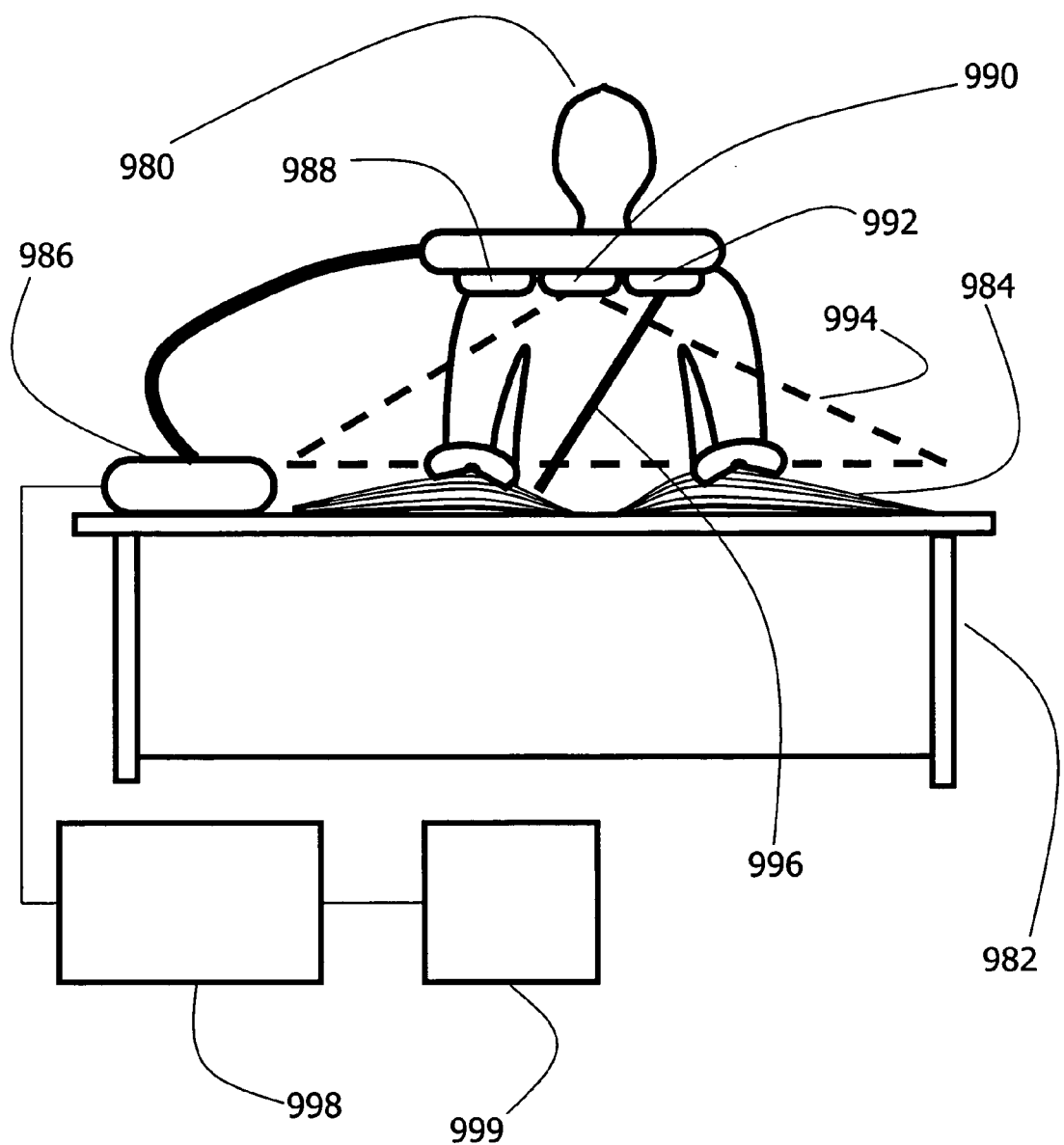
FIG. 37 shows a camera for desktop document processing in accord with an embodiment of the invention.

Attention is called to FIG. 37, showing an application of a document processing camera in accordance with one embodiment this invention. A user 980 is seated at a desk 982 reading a newspaper, a magazine or a book 996. A system including a desk lamp 986 is situated near the newspaper 996. According to one embodiment of the invention, in addition to optionally having one or more lighting elements 988 for illuminating the reading surface, the head of the system holds a camera 990, and a digitally oriented laser pointer 992 such as is implemented in the 3D Systems (Valencia, Calif., USA) sterolithography machine.

As the user turns to a new page, the camera scans the page with its high resolution camera and sends a digital representation of the image to a processor 998. In one embodiment the refresh rate can be slow, for example, one scan per second. In one embodiment, the resolution distribution can be adjusted by analyzing a first calibration frame to assign high resolution to the text areas of the page, and a second scan is carried out with the assigned resolution. The second scanned image is converted into text using an OCR software (not shown), which is known to have reasonable—but not complete accuracy.

In one embodiment, a user database 999 has keywords that are relevant to the user. The keywords could have been entered into the database by the user using a standard user interface. The system then seeks the presence of keywords in the converted text, and if found, the laser pointer highlights these words by underlying or circulating them with a laser light beam from laser pointer 992. The user then sees highlighted words on the document that he is reading, calling his attention to items especially relevant to him.

It should be noted that the camera would have a focus problem, as the center of the page may be much closer to the camera than the periphery of the page. In one embodiment, the focus problem may be resolved in the manner discussed above in connection with FIG. 8, so that all the parts of the image are in focus. It should further be noted that, in one embodiment of the invention, irregularities in the image due to the bowing of pages in an open book can also be resolved by programming a lookup table to compensate for the varying distance of the page from the camera in much the same manner as that described to normalize the image reflected by the convex mirror in FIG. 7. Moreover, the laser light beam may be used to create reference points within the image that can be used to determine the shape of each page facing the camera, and thus aid in the process of normalizing the image. In one embodiment, the camera captures markings made by the user, such as markings designating a piece of text to be saved, or a term to be translated or explained. The textual and graphical output that needs to be seen by the user can be sent to the laser pointer to provide the user with an effective product. For example, a translation could be drawn with laser light in response to a user's request for a translation.

Figure 38A:
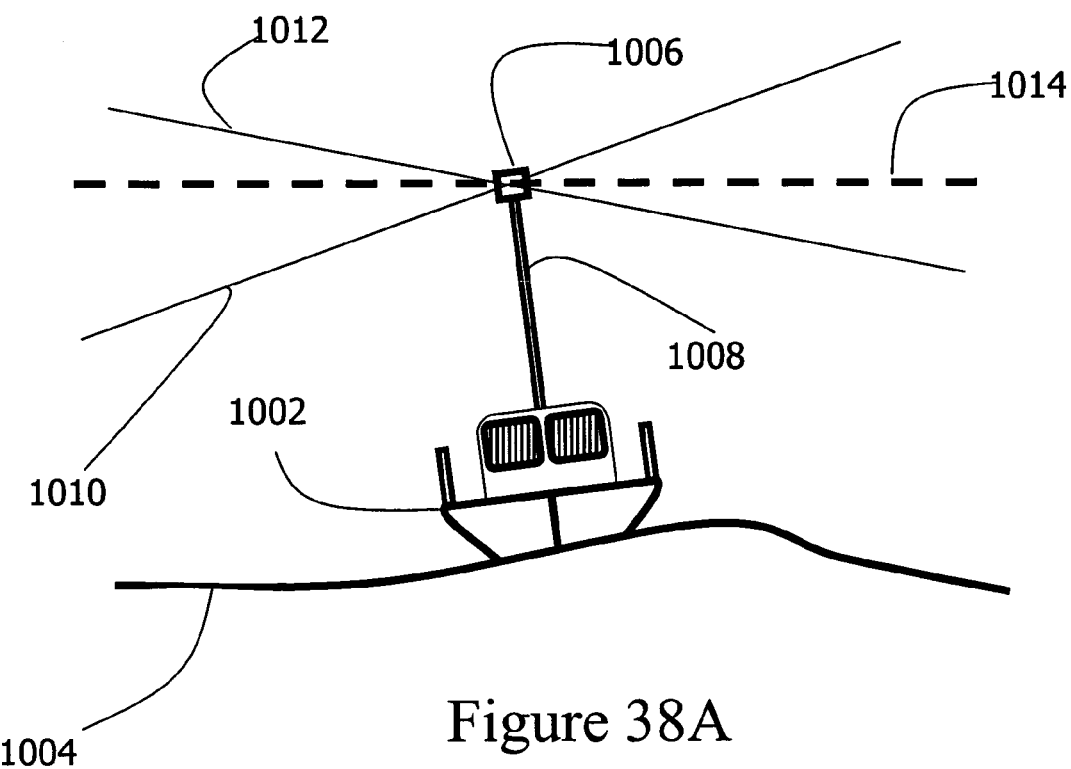
FIG. 38A is a camera mounted on a ships mast.
Figure 38B:
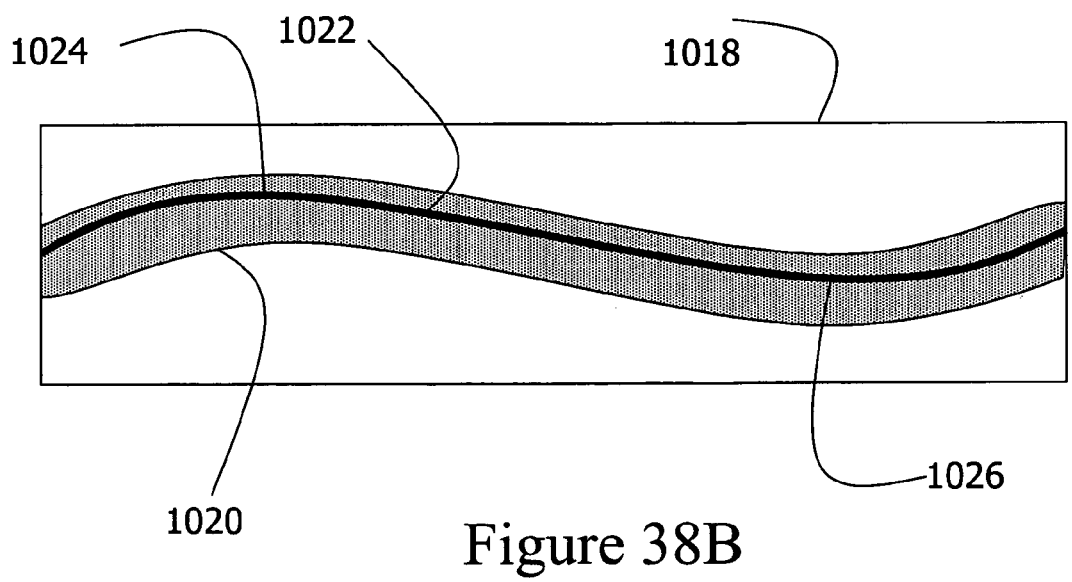
FIG. 38B is a diagrammatic view of a method for compensation of tilt of a camera in accord with an embodiment of the invention.

Attention is now called to FIGS. 38A-38B. FIG. 38A illustrates a camera 1006 according to one embodiment of the present invention installed on the top of a mast 1008 of a boat 1002 in a body of water 1004 such as a lake or an ocean. In one embodiment, the camera 1006 according to the present invention compensates for significant tilt as may be found when it is installed on the top of a mast 1008 of a boat 1002. According to one embodiment, the camera is configured to cover 360 degrees and provide an image of the sea surface between the boat 1002 and the horizon along with a small portion of sky. If the camera is not mechanically stabilized, the apparent elevation of the horizon 1014 in the field of view of the camera will move significantly up and down as the boat 1002 tilts back and forth in the water 1004. The vertical field of view 1010-1012 should then be large enough to accommodate tilt of the boat 1002, and in one embodiment, the vertical field of view 1010-1012 should then be large enough to accommodate the most severe expected tilt of the boat 1002. Only a portion of the vertical field of view will be relevant at any given moment, and much of the 360 degree image will contain the sky above the horizon or the water close to the boat 1002, both of which for this example are of no interest. The camera 1006, according to one embodiment of the invention, dynamically zooms to the interesting area, which in this example, is a narrow vertical sector above and below the horizon, as is illustrated in FIG. 38B. Rectangle 1018 represents the 360 degrees field of view of the camera, so that the left edge and the right edge of the rectangle represent the same azimuth. As the camera is tilted, the horizon 1022 appears in a varying elevation as the mirror of the camera revolves. At the azimuth where the camera is in its lowest elevation angle, the horizon is at its highest position in the frame 1024, while at the azimuth where the camera is in its highest elevation angle, the horizon appears to be at its lowest position in the frame 1026. In one embodiment, the frame rate of the camera 1006, is substantially higher that the tilting rate of the yacht, thus the appearance of the horizon in the field of view is generally repetitive, with only slight deviations between cycles. As the expected position of the horizon in the next frame is predictable—either by image processing of the previous frames in which the horizon is recognized by the contrast between the sea color and sky color—or by an on-board gyroscope that reports the tilt of the yacht—the camera can allocate a high resolution stripe 1020 across the field of view, that will include the desired field of view. In one embodiment the desired field of view would include the a small strip of sky above the horizon, a narrow margin above small strip of sky to accommodate errors in prediction, and a wider vertical sector under the horizon that covers the interesting portion of the water surface, for day and night navigation. Thus, according to one embodiment of the present invention an inexpensive, unstabilized, reliable camera can provide high-resolution images of a 360-degree scene around a platform with significant tilt.

In one embodiment, the high resolution stripe 1020 is displayed on a uniform resolution display with the horizon 1022 displayed as a horizontal line, thus providing a rectangular, 360 degree view of the body of water that appears as though it were taken without any tilt.

Although the illustration is described in terms of tilt, in one embodiment of the present invention the camera may be compensated for tilt (i.e., roll), pitch and/or yaw. In one embodiment, the camera is used on an airplane, and compensates for any or all of: roll, pitch, yaw, and climb or decent.

Figure 39A:
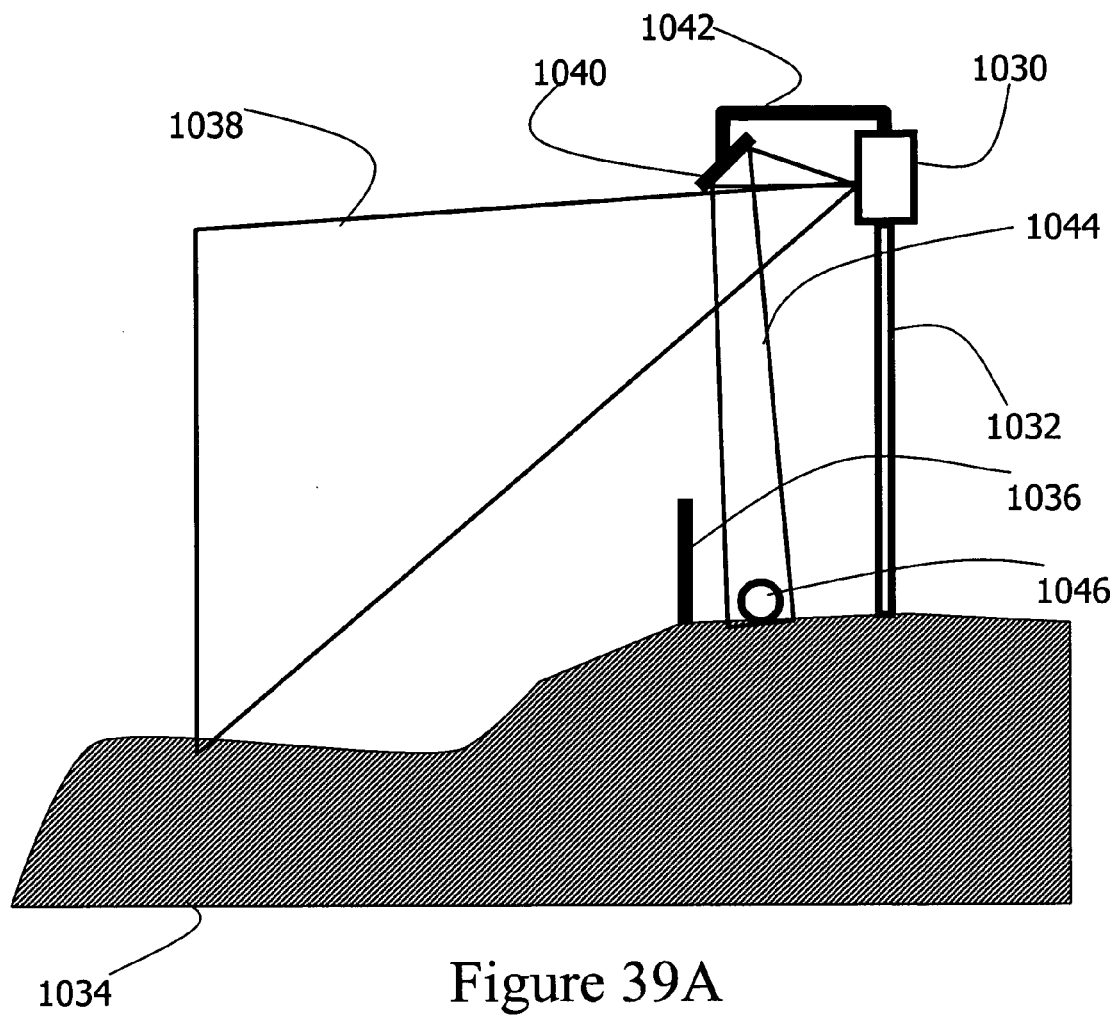
FIGS. 39A and 39B show a method for using a mirror angled to reflect objects near the base of a camera pole in accordance with an embodiment of the present invention.
Figure 39B:
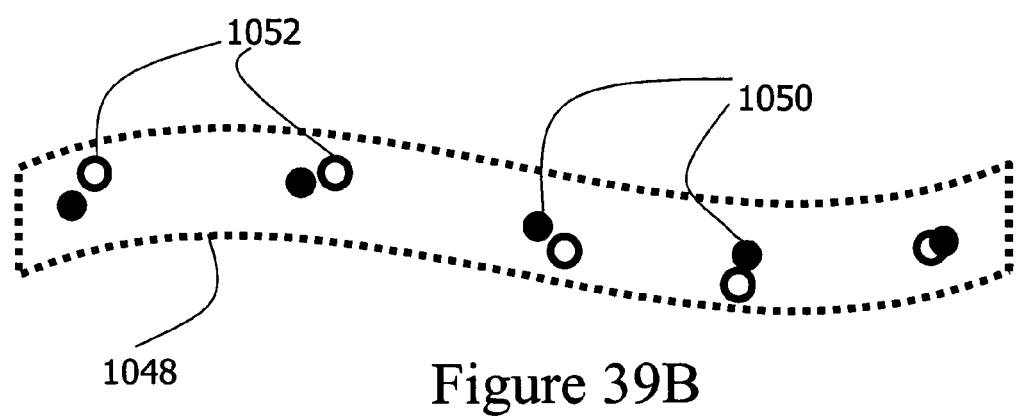

Turning now to FIGS. 39A-39B, a method according to one embodiment of the invention is disclosed for embedding calibration targets in the field of view when security, topography or logistics prevent locating them in the scene. According to one embodiment of the invention, a camera 1030 is installed on a pole 1032 positioned near the perimeter of a site 1034, monitoring the field of view 1038. The topography of the terrain, or a physical barrier 1036 such as a fence or a wall, prevent the position of calibration targets in the field of view as described above, include in connection with the discussions relating to FIGS. 25 and 26. A fixed mirror 1040 positioned close to the camera and rigidly attached to the camera 1030 with a connecting element 1042 sways and vibrates with the camera 1030, as the camera 1030 sways or vibrates due to wind or other cause. The mirror 1040 is positioned across the top of, but within, the field of view of the camera 1030, so that a relatively small portion at the top of the field of view is reflected from the ground near the pole.

In one embodiment, the elevation of the pole is more than few meters, thus optical distance from the ground to the camera is large enough to have the ground close to the focus of the camera 1030, which is typically aligned to be focused to infinity.

Calibration targets 1046, which may be of the contrasted and/or reflective type mentioned above, can now be placed on the ground within the area of ground near the pole being reflected by mirror 1040 into the view of the camera 1030. The targets 1046 should be oriented to face upwards. These targets 1046 will be captured by the camera 1030 through the mirror 1040, and will serve the image processor (not shown) to calibrate the image against distortions and offsetting. In one embodiment, an illuminating projector as described in connection with FIG. 24 may be used coaxially with the camera, a similar mirror can be installed on the projector to direct a slice of the illumination beam to the said calibration stripe on the ground. The illumination stripe can first be used to mark the calibration stripe so that the targets can be placed and secured at the proper locations within the coverage of the camera. Once the targets are installed, the illumination stripe will illuminate the targets and enhance their visibility to the camera and to the image processing.

FIG. 39B shows the calibrations stripe 1048 as seen by the camera. The stripe may appear to be curved or straight, depending on the geometry and alignment of the mirror 1040. The position of the targets 1050 is either known in advance, or is averaged over a long period of time to define a reference location. The momentary position of the targets 1052 as captured by the camera, as it moves due to wind and mechanical interferences, is compared by the image processor to the reference position, and an error vector is assigned to each target. The translation and angular deviations are then used to correct the image where the deviations of each target is applied to correct the scan lines in its local vicinity.

It will be apparent to one of skill in the art that a portion of the field of view other than the top can be reflected down to the ground in the same manner to achieve the same purpose and effect. Moreover, multiple portions of the field of view can be reflected town to the ground, at either the same, or at differing targets. In one embodiment of the present invention, mirrors are located at both the bottom and at the top of the field of view, and aligned to point to a similar strip of ground so that one set of calibration targets are reflected to two different portions of the field of view.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A system for isolating digital data representative of a plurality of parts of a field of view, the system comprising:
    an array of sensor cells adapted to provide a frame having a plurality of digital representations corresponding to at least a portion of the field of view, the digital representations being distributed uniformly;
    a selector adapted to isolate a non-uniformly distributed subset of the plurality of the digital representations provided by the array; and
    a buffer for holding simultaneously a single digital image with at least two subsets of the isolated digital representations, the at least two subsets having different resolutions;
    wherein the selector isolates the non-uniformly distributed subset according to a determination that is made before the sensor cells provide the digital representations.

2. The system of claim 1, wherein the array of sensor cells is a linear array of sensor cells, and the at least a portion of the field of view is a line of the field of view.

3. The system of claim 2, further comprising a moving element for causing a plurality of lines of the field of view to become incident on the linear array.

4. The system of claim 3, wherein the selector further comprises a line selector adapted to isolate a subset of lines of the field of view.

5. The system of claim 3, wherein the moving element is a rotating mirror.

6. The system of claim 1, further comprising a lookup table reflecting the non-uniformly distributed subset.

7. The system of claim 6, wherein the lookup table can be dynamically modified.

8. The system of claim 7, wherein the lookup table is a binary lookup table, and wherein each of a plurality of entries in the lookup table corresponds to a portion of the field of view.

9. A system for isolating digital data representative of a plurality of parts of a field of view that changes over time, the system comprising:
    an array of sensor cells adapted to provide a frame having a plurality of digital representations corresponding to at least a portion of the field of view at a given moment in time, the digital representations being distributed uniformly; and
    a programmable selector adapted to isolate a non-uniformly distributed subset of the plurality of the digital representations provided by the array at given moments in time, the isolation being performed based upon a set of values programmed in a programmable lookup table;
    wherein the set of values in the programmable lookup table are programmed before the given moment of time that the sensor cells provide the digital representations.

10. The system of claim 9, wherein the array is a linear array and the at least a portion of the field of view is a line of the field of view, the system further comprising:
    a rotating mirror for causing a plurality of lines of the field of view to become incident on the linear array;
    an encoder for determining the angular position of the mirror;
    a line acquirer for activating the selector to isolate the digital representations based upon the programmable lookup table, and for storing the isolated digital representations in a frame buffer at a location corresponding to the angular position of the mirror.

11. The system of claim 10, wherein the programmable lookup table may be dynamically modified.

12. The system of claim 11, further comprising a scene inspector, and wherein the programmable lookup table is dynamically modified upon a signal from the scene inspector.

13. The system of claim 12, wherein the scene inspector can detect a pre-defined feature in the field of view, and the programmable lookup table is dynamically modified to increase resolution in an area of the field of view in which the feature is detected.

14. The system of claim 12, wherein the scene inspector inspects the field of view for the presence of a linearly moving object, and if a linearly moving object is found, detects a rate of speed of the object using at least one subsequent frame buffer representing the field of view.

15. The system of claim 14, wherein the scene inspector estimates the location of a predefined sub-area of the object in a subsequent frame of the field of view, and the programmable lookup table is dynamically modified to increase resolution in an area of the field of view which corresponds to the estimated location of the sub-area in the subsequent frame.

16. The system of claim 15, wherein the linearly moving object is a car, and the predefined sub-are corresponds to a license plate of the car.

17. The system of claim 9, further comprising:
    a buffer for receiving and storing the non-uniformly distributed subset of the plurality of the digital representations; and,
    a communication interface for allowing modification of the lookup table and for providing an interface to read data stored in the buffer.

18. The system of claim 17, wherein the communication interface is accessible via a communication link, whereby the plurality of digital representations stored in the buffer can be remotely read and the lookup table can be remotely modified.

19. A method of acquiring a digital image with a non-uniform resolution, the method comprising the steps of:
    providing an array comprising uniformly spaced photoelectric sensor cells, the spacing of the sensor cells representing the inverse of a maximum resolution of the array;
    exposing the array, causing the array to provide a frame having a digital representation for each of the uniformly spaced photoelectric sensor cells;
    selecting from a first region of the array a first subset of the digital representations for the sensor cells within the first region, wherein the first subset has a first average resolution over the first region that is less than the maximum resolution;
    selecting from a second region of the array a second subset of the digital representations for the sensor cells within the second region, wherein the second subset has a second average resolution over the second region, and wherein the first average resolution is not equal to the second average resolution;

wherein a single acquired digital image includes the first subset of digital representations and the second subset of digital representations; and wherein the selecting of the first and second subsets of digital representations is made according to a determination that is made before the array provides the digital representations.

20. A method of acquiring a digital image with a non-uniform resolution using a moving element and a linear array comprising a plurality of uniformly spaced photoelectric sensor cells, the array adapted to provide a digital representation of light incident upon each sensor cell, the method comprising the steps of:

moving the moving element, thereby causing a field of view to become incident on the linear array over time;

acquiring a frame made of a plurality of sets of values from the array while the element is moving and causing the field of view to become incident on the linear array, each set of values comprising a quantity of digital representations which is less than the number of uniformly spaced photoelectric sensor cells of the linear array; and wherein at least two of the plurality of sets of values from the array comprise digital representations of light incident upon different sets of sensors and the at least two of the plurality of sets of values are elements of the same digital image, which has a non-uniform resolution; and wherein the sets of values acquired from the array are acquired according to a determination that is made before the acquisition begins.

21. The method of claim 20, further comprising a light projector for casting an illumination line upon a portion of the field of view as it becomes incident on the linear array.

22. The method of claim 20, wherein each of the plurality of sets of values from the array contains the same number of values.

23. The method of claim 22, wherein a lookup table is used in the step of acquiring the plurality of sets of values.

24. A method of displaying the digital image acquired in claim 23 on a digital display having uniformly spaced pixels, the method comprising mapping each value in the digital image on the digital display, thereby causing each value to be displayed on the digital display in a position substantially corresponding to its original position the field of view.

25. The method of displaying a digital image of claim 24, wherein the step of mapping each value in the digital image on the digital display comprises using at least the lookup table to position each value in the digital image on the digital display.

26. The method of claim 20, wherein the moving element is a mirror and the step of moving the element comprises rotating the mirror.

27. The method of claim 26, further comprising a light projector for casting an illumination line upon a portion of the field of view as it becomes incident on the linear array, and wherein the illumination line is reflected on the mirror to be cast upon the portion of the field of view.

28. A method of acquiring a digital image with a non-uniform resolution using a two dimensional array comprising a plurality of uniformly spaced photoelectric sensor cells in each of a plurality of columns and in each of a plurality of rows, the method comprising:

reading from the array a representation of light incident upon each photoelectric sensor cell;

digitizing each of the representations of light to make a digital frame; and selecting from the digital representations before they are ever stored, a set of values representative of a field of view, the set of values comprising a quantity of digital representations which is less than the number of uniformly spaced photoelectric sensor cells of the two dimensional array, wherein the set of values contains a digital representation of at least one sensor cell in a given one of the plurality of columns and a given one of the plurality of rows, and wherein the set of values does not contain a digital representation of at least one sensor cell in the given one of the plurality of columns in a different one of the plurality of rows; and wherein the selecting of the set of values representative of a field of view is made according to a determination that is made before the reading from the array.

29. A digital camera comprising:

at least one sensor adapted to provide a digital representation of a portion of a field of view;

an optical system causing a plurality of locations within the field of view to become incident on the at least one sensor, the plurality of locations being distributed uniformly;

a mask having a programmable value corresponding to each of the plurality of locations, wherein the value may be programmed to be an accept value or a reject value;

a selector adapted to accept a digital representation if the value corresponding to the location is programmed to be an accept value, and to reject a digital representation before it is ever stored if the value corresponding to the location is programmed to be a reject value; and a buffer for storing each accepted digital representation, wherein the accepted digital representations represent locations within the field of view that are not uniformly spaced from each other;

wherein the values in the mask are programmed before the at least one sensor provides the digital representation.

30. The digital camera of claim 29, further comprising a communication interface for allowing modification of the mask and for providing an interface to read data stored in the buffer.

31. The digital camera of claim 30, wherein the communication interface is accessible via a communication link, whereby the data stored in the buffer can be remotely read and the mask can be remotely modified.

32. The digital camera of claim 29, wherein the optical system comprises at least one imaging lens positioned to image the field of view onto the at least one sensor.

* * * * *